United States Patent [19]
Hara et al.

[11] Patent Number: 5,300,757
[45] Date of Patent: Apr. 5, 1994

[54] COOKING APPARATUS PROVIDING ACCURATE CONTROL OF COOKING PROCESS AND CAPABILITY FOR SPECIFYING HARDNESS DEGREE OF COOKED FOOD

[75] Inventors: Yumiko Hara; Shinji Kondoh, both of Osaka; Shuji Abe, Kakogawa; Haruo Terai, Osaka; Machiko Azuma, Hyogo, all of Japan

[73] Assignee: Matsushita Electric Industrial Co., Ltd., Osaka, Japan

[21] Appl. No.: 721,337

[22] Filed: Jul. 1, 1991

[30] Foreign Application Priority Data

Jun. 29, 1990 [JP] Japan ................ 2-173413
Jul. 24, 1990 [JP] Japan ................ 2-196606
Nov. 5, 1990 [JP] Japan ................ 2-300825

[51] Int. Cl.$^5$ .............................. H05B 1/02
[52] U.S. Cl. ................... 219/497; 219/492; 219/491; 219/506; 340/589
[58] Field of Search ............ 219/494, 497, 499, 501, 219/506, 508; 340/588, 589; 236/91 C; 364/477

[56] References Cited

U.S. PATENT DOCUMENTS

| | | | |
|---|---|---|---|
| 4,803,344 | 2/1989 | Wolf et al. | 219/497 |
| 4,914,924 | 4/1990 | Takahashi | 219/497 |
| 4,962,299 | 10/1990 | Duborper et al. | 219/492 |
| 4,994,652 | 2/1991 | Wolf et al. | 219/497 |
| 5,155,339 | 10/1992 | An | 219/492 |
| 5,173,224 | 12/1992 | Nakamura | 264/476 |

FOREIGN PATENT DOCUMENTS

| | | |
|---|---|---|
| 1-319619 | 12/1989 | Japan . |
| 2-57628 | 2/1990 | Japan . |
| 2-138420 | 5/1990 | Japan . |
| 2-208280 | 8/1990 | Japan . |
| 3-016600 | 1/1991 | Japan . |
| 3-30626 | 2/1991 | Japan . |
| 3-121190 | 5/1991 | Japan . |
| 2229831 | 10/1990 | United Kingdom . |

*Primary Examiner*—Mark H. Paschall
*Attorney, Agent, or Firm*—Lowe, Price, LeBlanc & Becker

[57] ABSTRACT

A cooking apparatus such as a rice cooker includes means for obtaining a value or a combination of values indicative of an amount of food that is to be cooked, and a fuzzy inference section for operating on that value or combination of values to determine a level of heating power to be supplied to a heater element of the apparatus, during at least one part of the cooking process. The amount-indicating value can be obtained for example as a rate of change of temperature of the food while it is being heated to boiling point. The apparatus can further be configured to determine a plurality of cooking control parameters, by fuzzy inference operation, based on a specified degree of final hardness of the cooked food, which can be selectively inputted by the user.

23 Claims, 76 Drawing Sheets

| MEASURED CONDUCTION FACTOR | SMALL | NORMAL | LARGE |
|---|---|---|---|
| OUTPUT CONDUCTION FACTOR | SMALL | NORMAL | LARGE |

| TEMPERATURE GRADIENT OF LID | SMALL | NORMAL | LARGE |
|---|---|---|---|
| OUTPUT CONDUCTION FACTOR | SMALL | NORMAL | LARGE |

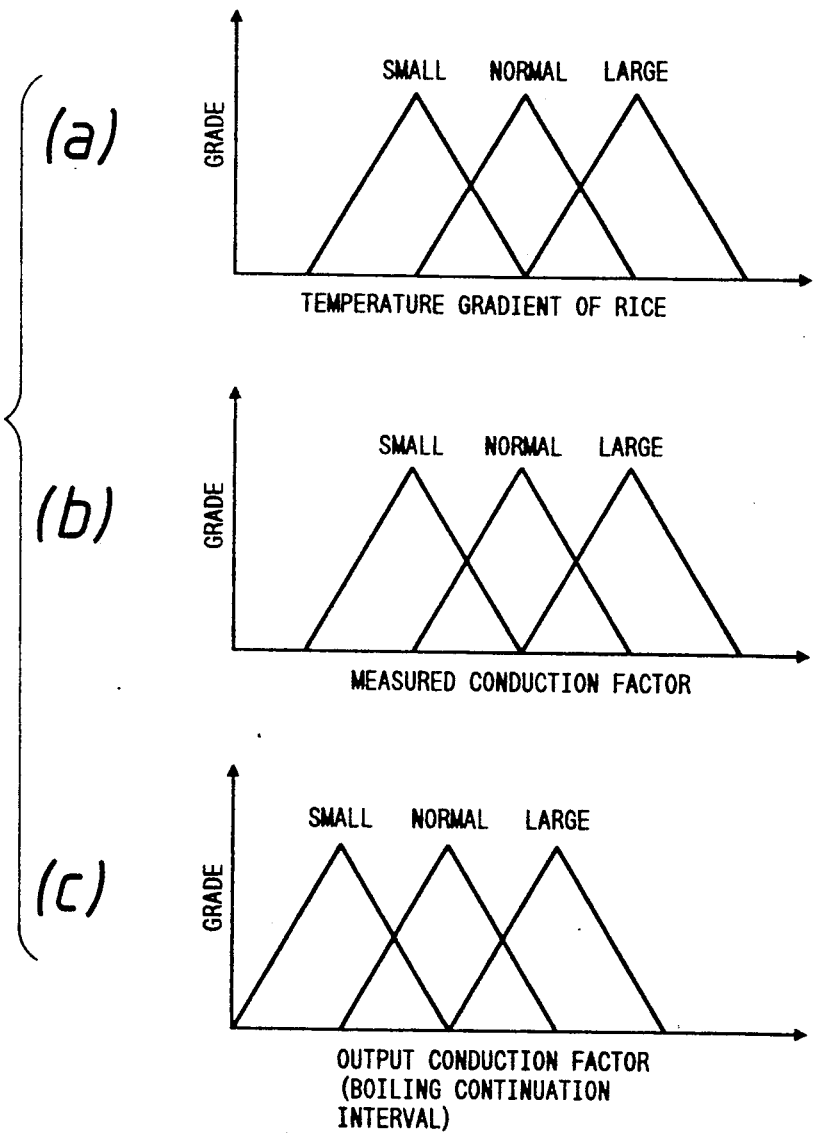

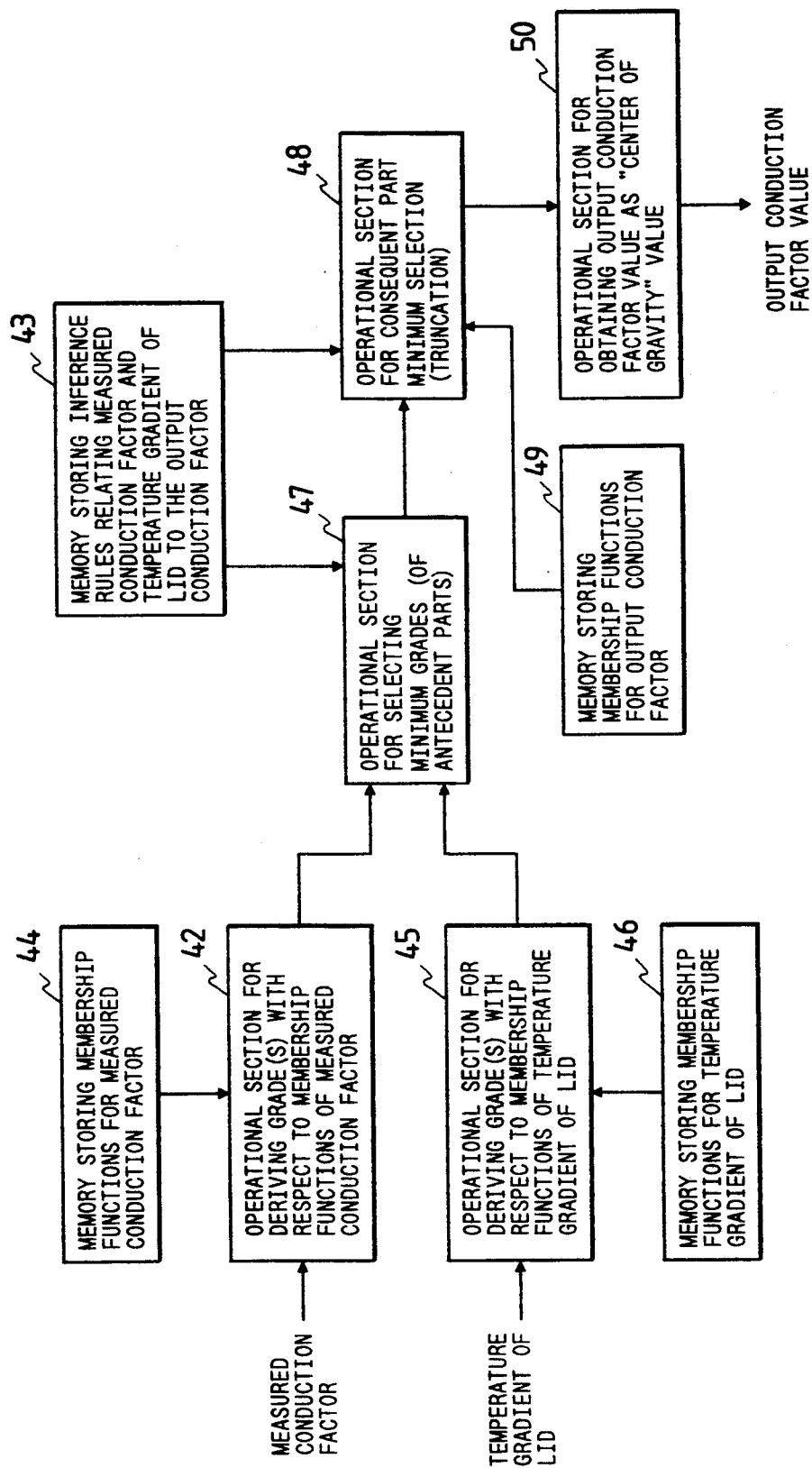

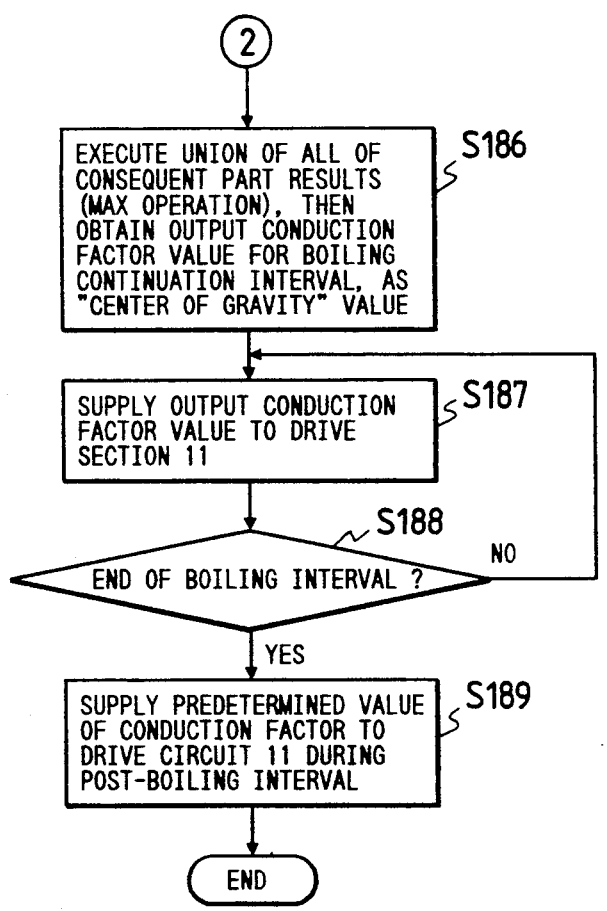

FIG. 32
OUTPUT CONDUCTION FACTOR
| TEMPERATURE GRADIENT OF LID \ TEMPERATURE GRADIENT OF RICE | LARGE | NORMAL | SMALL |
|---|---|---|---|
| SMALL | SMALL | SMALL | |
| NORMAL | SMALL | NORMAL | LARGE |
| LARGE | | LARGE | LARGE |
FIG. 33
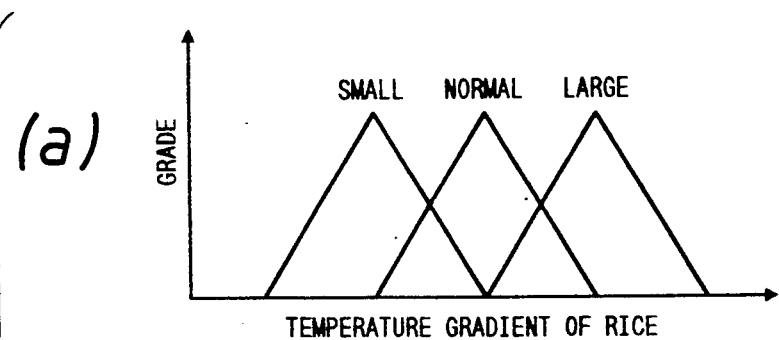
(a)
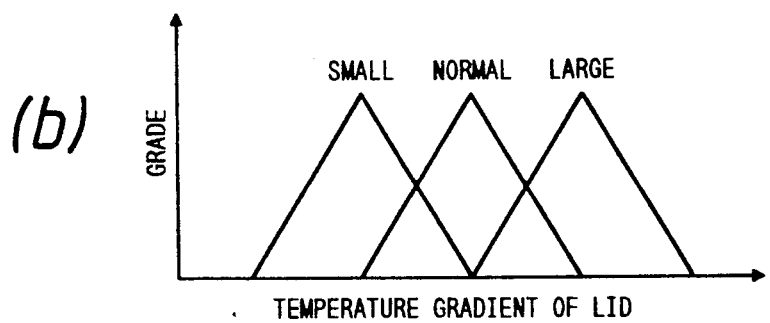
(b)
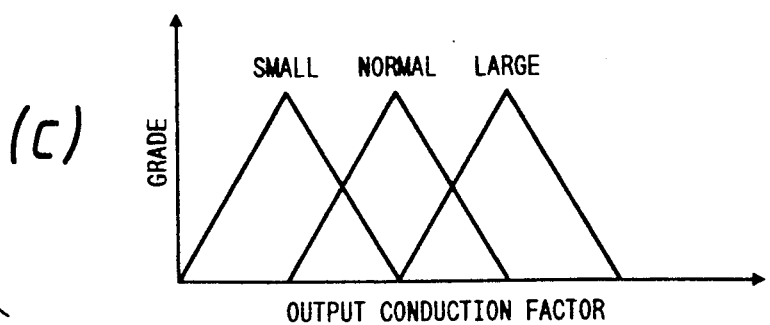
(c)

FIG. 38A

WHEN LID TEMPERATURE GRADIENT IS WITHIN "LARGE" SET

| MEASURED CONDUCTION FACTOR \ TEMPERATURE GRADIENT OF RICE | LARGE | NORMAL | SMALL |
|---|---|---|---|
| SMALL | SMALL | SMALL | |
| NORMAL | SMALL | NORMAL | |
| LARGE | | | |

FIG. 38B

WHEN LID TEMPERATURE GRADIENT IS WITHIN "NORMAL" SET

| MEASURED CONDUCTION FACTOR \ TEMPERATURE GRADIENT OF RICE | LARGE | NORMAL | SMALL |
|---|---|---|---|
| SMALL | SMALL | SMALL | |
| NORMAL | SMALL | NORMAL | LARGE |
| LARGE | | LARGE | LARGE |

FIG. 38C

WHEN LID TEMPERATURE GRADIENT IS WITHIN "SMALL" SET

| MEASURED CONDUCTION FACTOR \ TEMPERATURE GRADIENT OF RICE | LARGE | NORMAL | SMALL |
|---|---|---|---|
| SMALL | | | |
| NORMAL | | NORMAL | LARGE |
| LARGE | | LARGE | LARGE |

| CONTROLLED VARIABLE / HARDNESS | SOFT | NORMAL | HARD |
|---|---|---|---|
| PRE-BOILING TEMPERATURE | LOW | NORMAL | HIGH |
| PRE-BOILING INTERVAL DURATION | SHORT | NORMAL | LONG |
| TEMPERATURE INCREASE POWER LEVEL | LOW | NORMAL | HIGH |
| BOILING CONTINUATION POWER LEVEL | HIGH | NORMAL | LOW |

| CONTROLLED VARIABLE \ HARDNESS | SOFT | NORMAL | HARD |
|---|---|---|---|
| PRE-BOILING TEMPERATURE | LOW | NORMAL | HIGH |

(b)

| CONTROLLED VARIABLE \ HARDNESS | SOFT | NORMAL | HARD |
|---|---|---|---|
| PRE-BOILING INTERVAL DURATION | SHORT | NORMAL | LONG |

(c)

| CONTROLLED VARIABLE \ HARDNESS | SOFT | NORMAL | HARD |
|---|---|---|---|
| TEMPERATURE INCREASE POWER LEVEL | LOW | NORMAL | HIGH |

(d)

| CONTROLLED VARIABLE \ HARDNESS | SOFT | NORMAL | HARD |
|---|---|---|---|
| BOILING CONTINUATION POWER LEVEL | HIGH | NORMAL | LOW |

BOILING CONTINUATION POWER LEVEL

| RICE TEMPERATURE GRADIENT \ HARDNESS | SOFT | NORMAL | HARD |
|---|---|---|---|
| SMALL | HIGH | MODERATELY HIGH | NORMAL |
| NORMAL | MODERATELY HIGH | NORMAL | MODERATELY LOW |
| LARGE | NORMAL | MODERATELY LOW | LOW |

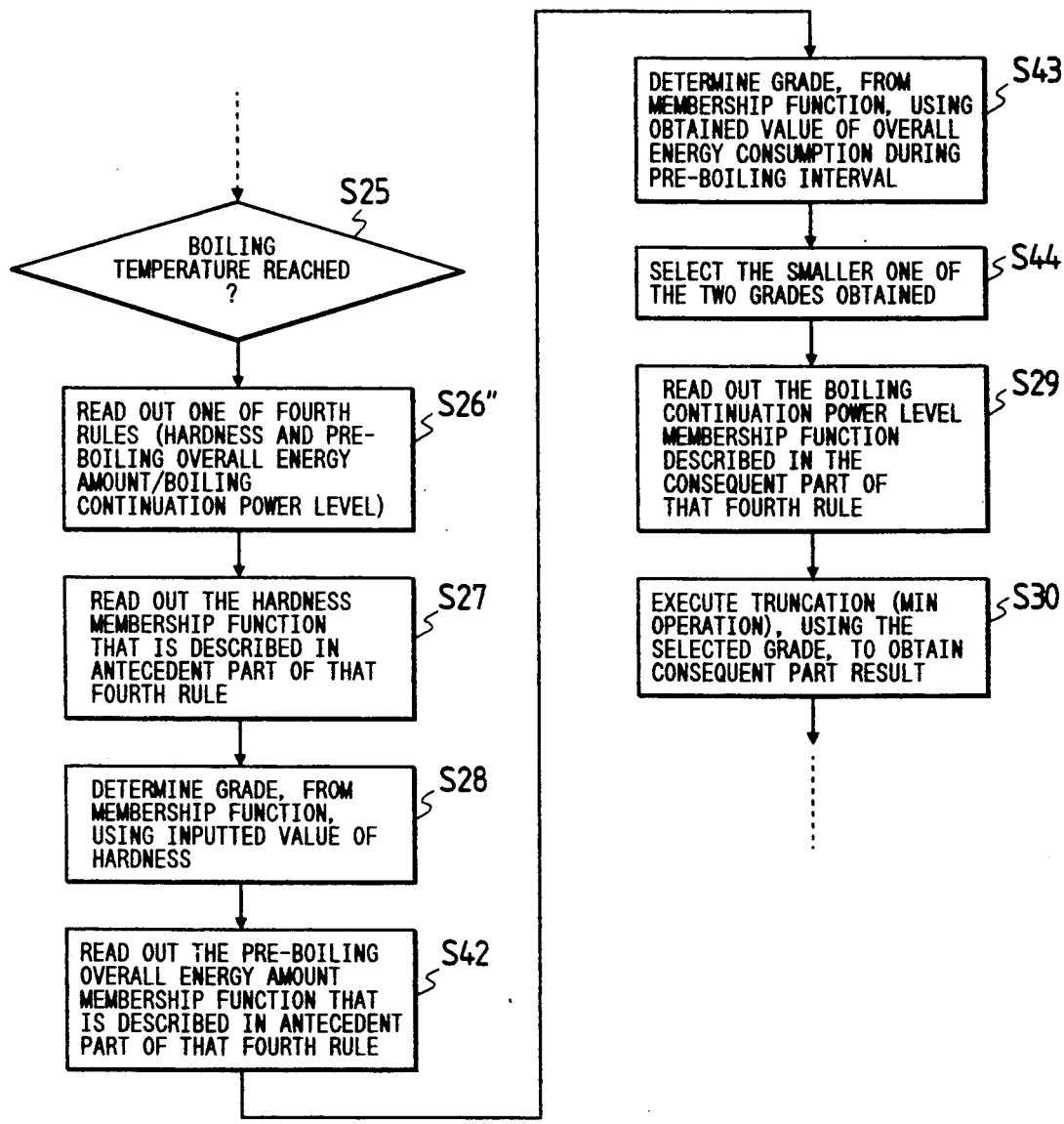

FIG. 70

(a) WHEN PRE-BOILING OVERALL ENERGY QUANTITY IS "HIGH"

| TEMPERATURE GRADIENT \ HARDNESS | SOFT | NORMAL | HARD |
|---|---|---|---|
| LOW | HIGH | MODERATELY HIGH | NORMAL |
| NORMAL | MODERATELY HIGH | NORMAL | MODERATELY LOW |
| HIGH | NORMAL | NORMAL | NORMAL |

(b) WHEN PRE-BOILING OVERALL ENERGY QUANTITY IS "NORMAL"

| TEMPERATURE GRADIENT \ HARDNESS | SOFT | NORMAL | HARD |
|---|---|---|---|
| LOW | HIGH | MODERATELY HIGH | NORMAL |
| NORMAL | MODERATELY HIGH | NORMAL | MODERATELY LOW |
| HIGH | NORMAL | MODERATELY LOW | LOW |

(c) WHEN PRE-BOILING OVERALL ENERGY QUANTITY IS "SMALL"

| TEMPERATURE GRADIENT \ HARDNESS | SOFT | NORMAL | HARD |
|---|---|---|---|
| LOW | NORMAL | NORMAL | NORMAL |
| NORMAL | MODERATELY HIGH | NORMAL | MODERATELY LOW |
| HIGH | NORMAL | MODERATELY LOW | LOW | ized by a switch (such as a thyristor), which is alternately set in a conducting and non-conducting state for supplying and cutting off a supply voltage to the heater element. The conduction factor of the heater element (i.e. the ratio of the duration of each interval for which the switch is set in the ON state to the period of successive OFF-to-ON state transitions) determines the level of heating power that is generated by the heater element, and the value of conduction factor that is to be utilized in the cooking process is determined as follows. The rice cooking apparatus is provided with a temperature sensor for detecting the temperature of the food material. Firstly, the conduction factor is set to 100% in the first part of a cooking interval in which the food material (i.e. mixture of rice and water, in this case) is rapidly heated to be brought to the boiling point, and is thereafter maintained at the boiling point for a certain time. That cooking interval, extending from the start of the rapid temperature increase, will be referred to in the following as the boiling interval. During that first part of the boiling interval, the conduction factor is held at 100% until the food material attains the boiling temperature. Thereafter, the conduction factor is set to a value that is determined as follows. Designating the value of conduction factor that is to be used thereafter in the cooking process as $\alpha$, and designating the temperature gradient of the food material prior to reaching the boiling temperature as $\theta$ (where temperature gradient here signifies the rate of change of temperature of the food material with respect to time), the value of is obtained from the following linear equation:

COOKING APPARATUS PROVIDING ACCURATE CONTROL OF COOKING PROCESS AND CAPABILITY FOR SPECIFYING HARDNESS DEGREE OF COOKED FOOD

BACKGROUND OF THE INVENTION

1. Field of the Invention

The present invention relates to a cooking apparatus whereby optimum control of a cooking process can be automatically achieved, in accordance with factors such as an amount of food that is to be cooked, a specific degree of hardness of the finally cooked food, etc.

The invention moreover relates to a cooking apparatus whereby a degree of hardness of the food resulting from the cooking process can be freely adjusted to a desired value by the user.

2. Description of the Related Art

Although the present invention is applicable to various types of cooking apparatus, for use with various types of food material, embodiments of the invention will be described which are designed for cooking rice by heating the rice together with water.

With a usual prior art type of rice cooking apparatus, heating power for the cooking process is generated by a heater element, with the level of heating power being controlled by a switch (such as a thyristor), which is alternately set in a conducting and non-conducting state for supplying and cutting off a supply voltage to the heater element. The conduction factor of the heater element (i.e. the ratio of the duration of each interval for which the switch is set in the ON state to the period of successive OFF-to-ON state transitions) determines the level of heating power that is generated by the heater element, and the value of conduction factor that is to be utilized in the cooking process is determined as follows. The rice cooking apparatus is provided with a temperature sensor for detecting the temperature of the food material. Firstly, the conduction factor is set to 100% in the first part of a cooking interval in which the food material (i.e. mixture of rice and water, in this case) is rapidly heated to be brought to the boiling point, and is thereafter maintained at the boiling point for a certain time. That cooking interval, extending from the start of the rapid temperature increase, will be referred to in the following as the boiling interval. During that first part of the boiling interval, the conduction factor is held at 100% until the food material attains the boiling temperature. Thereafter, the conduction factor is set to a value that is determined as follows. Designating the value of conduction factor that is to be used thereafter in the cooking process as $\alpha$, and designating the temperature gradient of the food material prior to reaching the boiling temperature as $\theta$ (where temperature gradient here signifies the rate of change of temperature of the food material with respect to time), the value of is obtained from the following linear equation:

$$\alpha = a \times \theta + b \qquad (1)$$

Where "a" is a negative constant, and "b" is a positive constant.

The value determined for the temperature gradient provides an estimate of the quantity of food material that is to be cooked. That is to say, the smaller the amount of food material, the greater will be the value of the temperature gradient, and conversely the greater the amount of food material the smaller will be the value of temperature gradient.

With another type of prior art rice cooking apparatus, the apparatus includes a microcomputer, which controls the apparatus to execute a cooking process that has been previously judged by the manufacturer as being optimum. Thus the cooking is fixedly executed in accordance with that process.

However in the case of a rice cooking apparatus which utilizes the method of equation (1) above, the result obtained from such a linear equation is only theoretically valid. In actual practice, such linear relationships do not exist in such a cooking process, due to the effects of such factors as the characteristic of the temperature sensor that is used to obtain the temperature gradient, etc. Thus it has not been possible for a prior art rice cooking apparatus to set the conduction factor of the heater element such as to reliably provide optimum results.

In the case of a rice cooking apparatus which is controlled by a microcomputer in accordance with a predetermined program, since the operation is fixedly predetermined, it will not be capable of compensating for the effects of variable factors such as variations in the amount of food that is to be cooked, etc.

Moreover, with certain types of cooking apparatus such as a rice cooking apparatus, it is desirable to have a capability for cooking the food to a desired degree of hardness, in accordance with the particular requirements of different users. However with a prior art rice cooker, that can only be achieved through the user changing the ratio of the amount of water to the amount of rice, prior to the start of the cooking process. In addition to being inconvenient, such a method has the disadvantage that it is difficult for the user to accurately correctly judge the required amount of water that must be used, in order to achieve the desired degree of hardness in the finally cooked rice.

Although the above prior art problems have been described only for the case of a rice cooking apparatus, such problems will also arise with other types of cooking apparatus, which operate on the basis of fixedly predetermined linear equations or computer programs, such as a cooking apparatus for cooking stewed meat, for example.

SUMMARY OF THE INVENTION

It is an objective of the present invention to provide a cooking apparatus which overcomes the various problems of the prior art described above.

Specifically, it is a first objective of the invention to provide a cooking apparatus which is controlled to provide an optimum level of heating power in the cooking process. That is basically achieved by deriving a fuzzy inference grade value which provides an indication of the quantity of food material that is to be cooked, and determining an appropriate level of heating power in accordance with that grade, by executing fuzzy inference operations to obtain an output value specifying that level of heating power.

It is a second objective of the present invention to provide a cooking apparatus wherein means are provided for enabling a user to specify a desired degree of hardness of the finally cooked food, and means for controlling the cooking process in accordance with that specified degree of hardness, by using that specified degree of hardness in fuzzy inference operations to obtain an output value which specifies a value of at least one control parameter of the cooking process.

To achieve the first objective set out above, the invention provides a cooking apparatus for executing cooking processing of a quantity of a food material, comprising:

means for applying power for heating the food material;

control means for controlling a level of the heating power;

quantity indication means for producing a value indicative of the quantity of the food material; and fuzzy inference means for deriving a requisite level of the heating power, based upon the quantity indicating value, and for producing an output value indicative of the requisite level and supplying the output value to the control means for thereby determining a subsequent level of the heating power.

Such a cooking apparatus may include means for applying heating power to maintain the food material at a predetermined temperature during an interval of predetermined duration in an initial part of the cooking process in which the food material is maintained at a fixed elevated temperature (below boiling point), with the quantity indication means comprises means for obtaining an average level of heating power that is applied to the food material during the interval, and with that average level of heating power constituting the quantity indication value.

Alternatively, the cooking apparatus may comprise means for obtaining a value of temperature gradient of a lid of the apparatus, covering the food material, during an initial temperature increase interval of the cooking process in which the food material is rapidly increased in temperature, with the temperature gradient of the lid provides the quantity indication value.

As a further alternative, the average level of heating power and the temperature gradient of the lid, which in combination are indicative of the quantity of food material to be cooked, can be supplied to the fuzzy inference means for thereby determining the level of heating power that is generated following the temperature increase interval.

It is moreover also possible to supply to the fuzzy inference means the aforementioned average level of heating power together with the lid temperature gradient and the temperature gradient of the food material, which in combination are indicative of the quantity of food material that is to be cooked, for thereby determining the level of heating power that is to be generated following the temperature increase interval.

To achieve the second objective set out above, the present invention provides a cooking apparatus comprising heater means for heating a food material, input means operable by a user for inputting a value indicating a specified degree of hardness of finally cooked food material, fuzzy inference means responsive to that hardness specifying value for producing a plurality of values for determining respective control parameters of the cooking process, and control means responsive to these values produced from the fuzzy inference means for supplying power to the heating means during the cooking process in accordance with these control parameters.

More specifically, according to a first aspect the present invention provides a cooking apparatus for cooking a food material, comprising:

heater means for heating said food material;

heating power control means for controlling a level of heating power generated by said heater means;

temperature sensor means for detecting a level of temperature of said food material;

temperature adjustment means responsive to detection values produced from said temperature sensor means for producing heating power control values suitable for maintaining said food material at a predetermined temperature, and for supplying said heating power control values to said heating power control means during an initial cooking interval of fixed duration;

computing means for computing a value representing an average value of heating power supplied to said heater means during said initial interval; and fuzzy inference means responsive to said average heating power value for deriving a value representing a suitable level of heating power for a cooking interval subsequent to said initial interval, and for supplying said level-representing value to said heating power control means.

According to a second aspect, the invention provides a cooking apparatus for cooking a food material, comprising:

a lid for covering said food material;

heater means for heating said food material;

heating power control means for controlling a level of heating power generated by said heater means;

temperature sensor means for detecting a level of temperature of said lid;

temperature gradient computing means responsive to temperature detection values produced from said temperature sensor means during a temperature increase cooking interval in which a fixed level heating power is applied to rapidly heat said food material, for obtaining a value of temperature gradient of said lid; and fuzzy inference means responsive to said temperature gradient value for deriving a value representing a suitable level of heating power for a cooking interval subsequent to said temperature increase interval, and for supplying said level-representing value to said heating power control means.

According to a third aspect, the invention provides a cooking apparatus for cooking a food material, comprising:

heater means for heating said food material;

heating power control means for controlling a level of heating power generated by said heater means;

temperature sensor means for detecting a level of temperature of said food material;

temperature adjustment means responsive to detection values produced from said temperature sensor means for producing heating power control values suitable for maintaining said food material at a predetermined temperature, and for supplying said heating power control values to said heating power control means during an initial cooking interval of fixed duration, and for supplying a predetermined fixed value to said heating power control means during a temperature increase interval immediately subsequent to said initial interval;

computing means for computing a value representing an average level of heating power supplied to said heater means during said initial interval;

temperature gradient computing means responsive to detection values produced from said temperature sensor means during said temperature increase interval for obtaining a value of temperature gradient of said food material during said temperature increase interval;

fuzzy inference means responsive to said average heating power value and temperature gradient value in combination, for deriving a value representing a suitable level of heating power for a cooking interval subsequent to said temperature increase interval, and for supplying said level-representing value to said heating power control means.

According to a fourth aspect, the invention provides a cooking apparatus for cooking a food material, comprising:

a lid for covering said food material;

heater means for heating said food material;

heating power control means for controlling a level of heating power generated by said heater means;

food material temperature sensor means for detecting a level of temperature of said food material;

temperature adjustment means responsive to detection values produced from said food material temperature sensor means for producing heating power control values suitable for maintaining said food material at a predetermined temperature, and for supplying said heating power control values to said heating power control means during an initial cooking interval of fixed duration, and for supplying a predetermined fixed value to said heating power control means during a temperature increase interval immediately subsequent to said initial interval;

computing means for computing a value representing an average value of heating power supplied to said heater means during said initial interval;

lid temperature sensor means for detecting a level of temperature of said lid;

lid temperature gradient computing means responsive to detection values produced from said lid temperature sensor means during said temperature increase interval for obtaining a value of temperature gradient of said lid during said temperature increase interval;

fuzzy inference means responsive to said average heating power value and lid temperature gradient value in combination, for deriving a value representing a suitable level of heating power for a cooking interval subsequent to said temperature increase interval, and for supplying said level-representing value to said heating power control means.

According to a fifth aspect, the invention provides a cooking apparatus for cooking a food material, comprising:

a lid for covering said food material;

heater means for heating said food material;

heating power control means for controlling a level of heating power generated by said heater means;

food material temperature sensor means for detecting a level of temperature of said food material;

food material temperature gradient computing means responsive to detection values produced from said food material temperature sensor means during a temperature increase cooking interval in which a fixed level heating power is applied to rapidly heat said food material, for obtaining a value of temperature gradient of said food material in said temperature increase interval;

lid temperature sensor means for detecting a level of temperature of said lid;

lid temperature gradient computing means responsive to detection values produced from said lid temperature sensor means during said temperature increase interval for obtaining a value of temperature gradient of said lid during said temperature increase interval;

fuzzy inference means responsive to said food material temperature gradient and lid temperature gradient value in combination, for deriving a value representing a suitable level of heating power for a cooking interval subsequent to said temperature increase interval, and for supplying said level-representing value to said heating power control means.

According to a sixth aspect, the invention provides a cooking apparatus for cooking a food material, comprising:

a lid for covering said food material;

heater means for heating said food material;

heating power control means for controlling a level of heating power generated by said heater means;

food material temperature sensor means for detecting a level of temperature of said food material;

temperature adjustment means responsive to detection values produced from said temperature sensor means for producing heating power control values suitable for maintaining said food material at a predetermined temperature, and for supplying said heating power control values to said heating power control means during an initial cooking interval of fixed duration;

computing means for computing a value representing an average value of heating power supplied to said heater means during said initial interval; and food material temperature gradient computing means responsive to detection values produced from said food material temperature sensor means during said temperature increase interval, for obtaining a value of temperature gradient of said food material in said temperature increase interval;

lid temperature sensor means for detecting a level of temperature of said lid;

lid temperature gradient computing means responsive to detection values produced from said lid temperature sensor means for obtaining a value of temperature gradient of said lid during said temperature increase interval;

fuzzy inference means responsive to said average power value, food material temperature gradient value and lid temperature gradient value in combination, for deriving a value representing a suitable level of heating power for a cooking interval subsequent to said temperature increase interval, and for supplying said level-representing value to said heating power control means.

According to a seventh aspect, the invention provides a cooking apparatus for cooking a food material, comprising:

heater means for heating said food material;

control means for controlling said heater means in accordance with a plurality of cooking control parameters, during a cooking process executed by said apparatus;

temperature sensor means for detecting a level of temperature of said food material;

input means operable for inputting a hardness specifying value, specifying a desired degree of hardness of said food material resulting from said cooking process;

fuzzy inference means responsive to said hardness specifying value for deriving respective values for determining said control parameters, and for supplying said values to said control means.

With such a cooking apparatus, said control means may function to maintain said food material at a specific preboiling temperature which is lower than a boiling temperature, during a preboiling interval of specific duration, with said control parameters including said preboiling temperature and said pre-boiling interval duration.

Moreover with a cooking apparatus in accordance with the seventh aspect, said control means may further function to produce rapid heating of said food material to a boiling temperature, during a temperature increase interval which immediately follows said preboiling interval, with said control parameters further including a level of power that is supplied to said heater means during said temperature increase interval.

Further with a cooking apparatus in accordance with the seventh aspect, said control means may further function to maintain said food material in a boiling condition, during a boiling continuation interval which immediately follows said temperature increase interval, with said control parameters further including a level of power that is supplied to said heater means during said boiling continuation interval.

In addition, with a cooking apparatus in accordance with the seventh aspect, said fuzzy inference means may operate based upon respective predetermined sets of fuzzy set membership functions for said control parameters and a single set of predetermined fuzzy set membership functions for said hardness specifying value, which are applied in common to all of said control parameters.

Alternatively, with such an apparatus in accordance with the seventh aspect, said fuzzy inference means may operate based upon respective predetermined sets of fuzzy set membership functions for said control parameters and a plurality of sets of fuzzy set membership functions for said hardness specifying value, which are separately applied to respective ones of said control parameters.

Further, with a cooking apparatus in accordance with the seventh aspect, said control means may function to derive a value of temperature gradient of said food material during said temperature increase interval, based upon detected temperature values obtained by said temperature sensor means, with said fuzzy inference means deriving a value for determining said boiling continuation power level parameter based upon a combination of said hardness specifying value and said temperature gradient value.

Further, with a cooking apparatus in accordance with the seventh aspect, said control means may function to derive a value of temperature gradient of said food material during said temperature increase interval, based upon detected temperature values obtained by said temperature sensor means, with said fuzzy inference means deriving a value for determining said temperature increase interval power level parameter based upon a combination of said hardness specifying value and said temperature gradient value.

Moreover, with a cooking apparatus in accordance with the seventh aspect, said control means may function to derive a value of overall amount of energy supplied to said heater means during said preboiling interval, and to derive a value of temperature gradient of said food material during said temperature increase interval, based upon detected temperature values obtained by said temperature sensor means, with said fuzzy inference means deriving a value for determining said boiling continuation power level parameter based upon a combination of said hardness specifying value, said energy amount value, and said temperature gradient value.

Further, with a cooking apparatus in accordance with the seventh aspect, said control means may function to derive a value of overall amount of energy supplied to said heater means during said preboiling interval, with said fuzzy inference means derives a value for determining said boiling continuation power level parameter based upon a combination of said hardness specifying value and said energy amount value.

According to an eighth aspect, the invention provides a cooking apparatus for executing cooking processing of a quantity of a food material, comprising:

heating means for applying power for heating said food material;

input means operable for inputting a hardness specifying value, specifying a desired degree of hardness of said food material resulting from said cooking process; and control means for controlling a level of said heating power generated by said heating means, and for setting a duration of an initial preboiling period of said cooking process in which said food material is maintained at a temperature below boiling temperature, to a value expressed as:

$$T = d \times k + e$$

where T denotes said duration, k denotes said specified degree of hardness, and d and e are predetermined constants, and wherein said control means further sets a level of heating power supplied to said heating means during a temperature increase interval that is immediately subsequent to said preboiling interval in said cooking process, to a value expressed as:

$$Pt = a \times k^2 + b \times k + c$$

where Pt denotes said level of heating power, and a, b and c are predetermined constants.

BRIEF DESCRIPTION OF THE DRAWINGS

FIG. 19 is a table showing the fuzzy inference rules for the third embodiment;

FIG. 20 shows the fuzzy set membership functions corresponding to the rules of FIG. 19;

FIG. 28 is a block diagram for assistance in describing the operation of a fuzzy inference section in the fourth embodiment;

FIGS. 29A, 29B are a flow diagram for assistance in describing the operation of a cooking process controller in the fourth embodiment;

FIG. 32 is a table showing the fuzzy inference rules for the fifth embodiment;

FIG. 33 shows the fuzzy set membership functions corresponding to the rules of FIG. 32;

FIGS. 38A, 38B, 38C are tables showing the fuzzy inference rules for the sixth embodiment;

FIG. 50 is a table showing the fuzzy inference rules for the eighth embodiment;

FIGS. 67A, 67B are partial flow diagrams, for assistance in describing how the tenth embodiment differs from the eighth embodiment;

FIGS. 69 and 70 are tables showing the fuzzy inference rules for the eleventh embodiment;

DESCRIPTION OF PREFERRED EMBODIMENTS

Figure 1A:
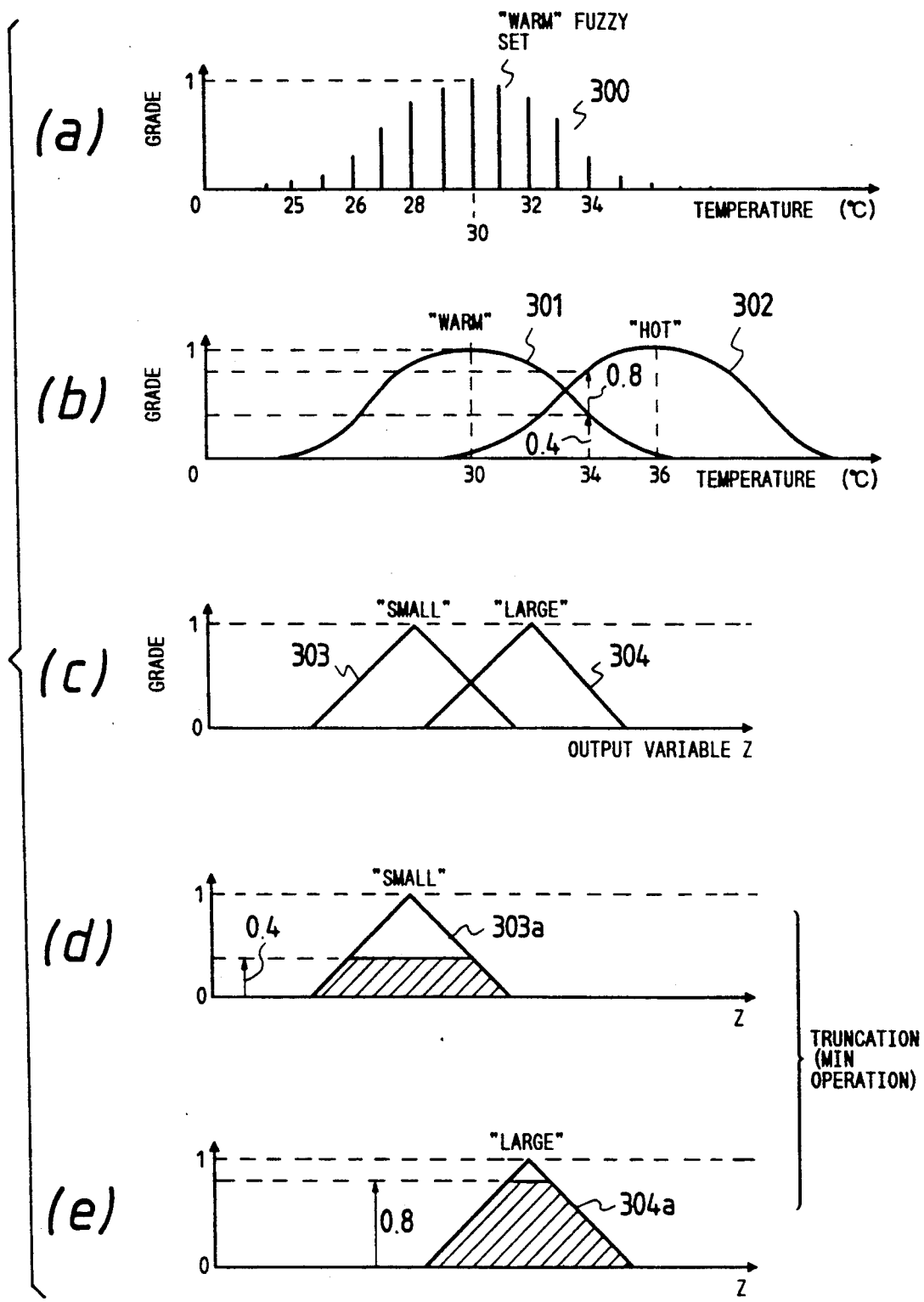
FIGS. 1A, 1B are diagrams for assistance in describing a process of fuzzy inference operation used with embodiments of the present invention.

Before describing embodiments of the present invention, a summary will be given of fuzzy inference operations that are variously used in the embodiments. Diagram (a) of FIG. 1A shows elements of a fuzzy set 300, in which the elements are temperature values. These temperature values have respective grade values (i.e. respective degrees of conformance to the set) which vary between a minimum of 0 and a maximum grade which will be assumed to be 1. The set is assigned the label "warm", and a temperature of 300° C. has a grade of approximately 1.

The membership function of the set 300 is shown as the function 301 in diagram (b) of FIG. 1A. 302 indicates the membership function of a second fuzzy set, labelled as "hot", in which a temperature value of 360° C. has approximately the maximum grade of 1. As shown, the "warm" and "hot" membership functions overlap, so that some members of the "warm" fuzzy set are also members of the "hot" fuzzy set, but having respectively different grades within these sets. For example a temperature value of 340° C. has a grade of 0.4 with respect to the "warm" membership function, and a grade of 0.8 with respect to the "hot" membership function.

Diagram (c) of FIG. 1A shows fuzzy set membership functions 303, 304 of a control value z, labelled "small" and "large" respectively. It will be assumed that the following fuzzy inference rules relate the fuzzy sets 301, 302 and 303, 304:

R1: If the temperature is warm, then z is small.
R2: If the temperature is hot, then z is large.

The portion "If the temperature is warm" or "If the temperature is hot" in each rule is referred to as the antecedent part, with "warm" or "hot" values being the respective variables of these antecedent part examples, while the "then z is small" or " then z is large" part in each rule is referred to as the consequent part, with z being the variable (output variable) of these consequent part examples.

Based on these rules, an output value for z is obtained as follows, using the antecedent part of rule R1 and taking for example a temperature value of 34° C., that has a grade of 0.4 with respect to the "warm" set. Next, taking the consequent part of rule R1, then as shown in diagram (d) of FIG. 1A, "small" membership function grades that are lower than the grade 0.4 are selected, with the remaining portion 303a of the membership function being truncated as shown. Such a selection operation is known mathematically as a MIN operation, and the result is shown graphically by the hatched-line portion in diagram (d). Then, using the antecedent part of rule R2, it is found that the temperature in question has a grade of 0.8 with respect to the "hot" membership function. Next, taking the consequent part of rule R2, then as shown in diagram (d) of FIG. 1A, "large" membership function grades that are lower than the grade 0.8 are selected, with the remaining portion 304a membership function being truncated as shown.

Figure 1B:
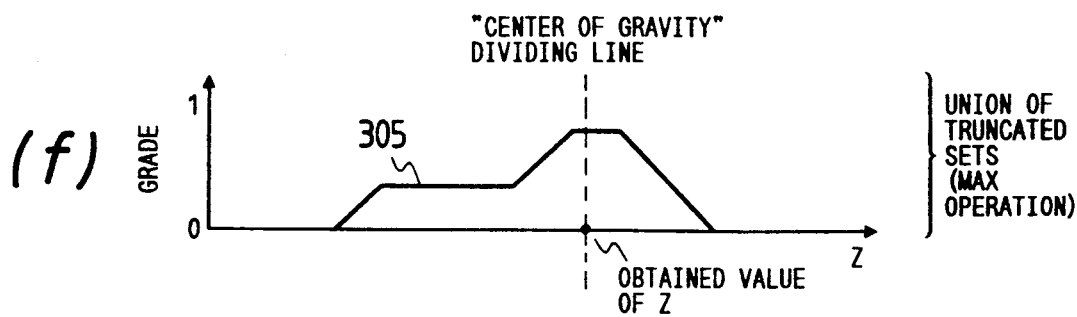

The two truncated membership functions thus obtained are then combined as illustrated in diagram (f) of FIG. 1B, (i.e. by a "union" operation) to obtain a membership function 305. That union operation is be executed, in the case of each value of z in the truncated sets of diagrams (d), (e) which is common to both of these sets, by selecting the higher of the two grades of that value of z, and in the case of each value of z in these sets which is not common to the combined truncated sets, by using the grade value unchanged. Such an operation is known as a MAX operation.

In order to then obtain the final output value of z that corresponds to the input temperature value of 34° C., a "center-of-gravity" value for the combined set 305 is derived. Graphically expressed, this is equivalent to finding a value of z for which the total area to the left of that value, within the region representing the combined membership function 305, is substantially identical to the total area to the right side of that value of z. That value of z is then outputted as the final result of the fuzzy inference operation.

In the above description it is assumed that in the consequent part of each of the rules Ri and R2, a fuzzy set membership function (i.e. the "small" or "large". set of diagram (c) in FIG. 1A) is recited. However in order to simplify the application of fuzzy inference to an actual apparatus, e.g. a domestic-use rice cooker, it may be preferable to use discrete values in the consequent part of each rule in place of these fuzzy set membership functions. In that case for example, as shown in diagram (a) of FIG. 1C, the "small" and "large" membership functions would be replaced by respective single values of the output variable z, designated as $z_1$ and $z_2$, each having a grade of 1.

Figure 1C:
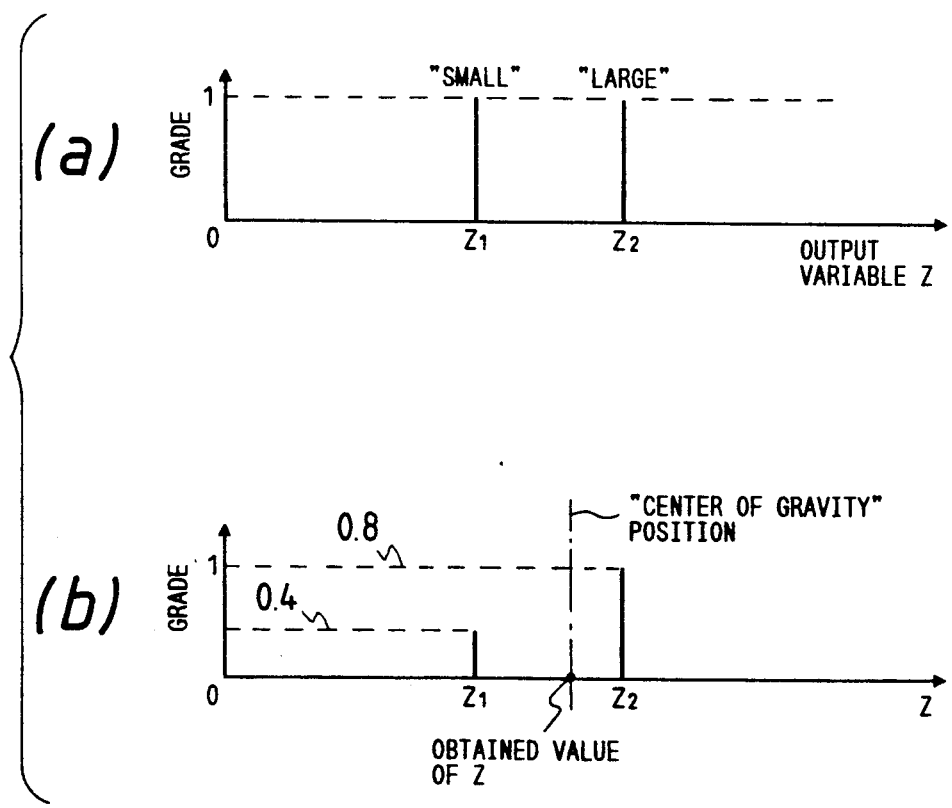
FIG. 1C is a diagram for describing a modification of the process shown in FIGS. 1A, 1B, whereby single values are used in place of fuzzy sets in the consequent part of each fuzzy inference rule.

In that case for example, the result of the truncation operation shown in diagrams (d), (e) of FIG. 1A would become as shown in diagram (b) of FIG. 1C, i.e. in place of the two truncated membership functions, respective grades of 0.4 and 0.8 would be assigned to these single values $z_1$, $z_2$. These can then be combined to obtain the final output value of the variable z, by assuming that each of the vertical lines representing the grade values of $z_1$ and $z_2$ have weight in proportion to length, and finding a position along the z-axis at which these weights would balance, i.e. finding a "center of gravity" value.

Furthermore it has also been assumed in the above that these discrete values $z_1$, $z_2$ that can be used in place of these membership functions as described above, are fixed in position along the control value (z) axis. However improved accuracy can be obtained by varying these positions in accordance with the value of the input variable (e.g. temperature T). That is to say, instead of the values $z_1$ and $z_2$ in diagram (a) of FIG. 1C being respectively fixed, each of these can be determined as a function of the value of the input variable, in accordance with a predetermined equation, and respectively different equations can be used for each of the fuzzy inference rules. Thus for example it would be possible to establish the values of $z_1$ and $z_2$ as:

$$z_1 = aT$$

(for use when rule R1 above is applied), and $$z_2 = bT$$

(for use when rule R2 above is applied). In the above, T is the value of the input variable that is recited in the antecedent part of the rule (for example the value 34° C. of temperature shown in diagram (b) of FIG. 1A), and "a" and "b" are arbitrary constants.

Alternatively, the values of $z_1$ and $z_2$ could be established by linear equations of the form:

$$z_1 = aT + c$$

(for use when rule R1 above is applied), and $$z_2 = bT + d$$

(for use when rule R2 above is applied), where c and d are constants which have been arrived at through experiment, for example.

Figure 2A:
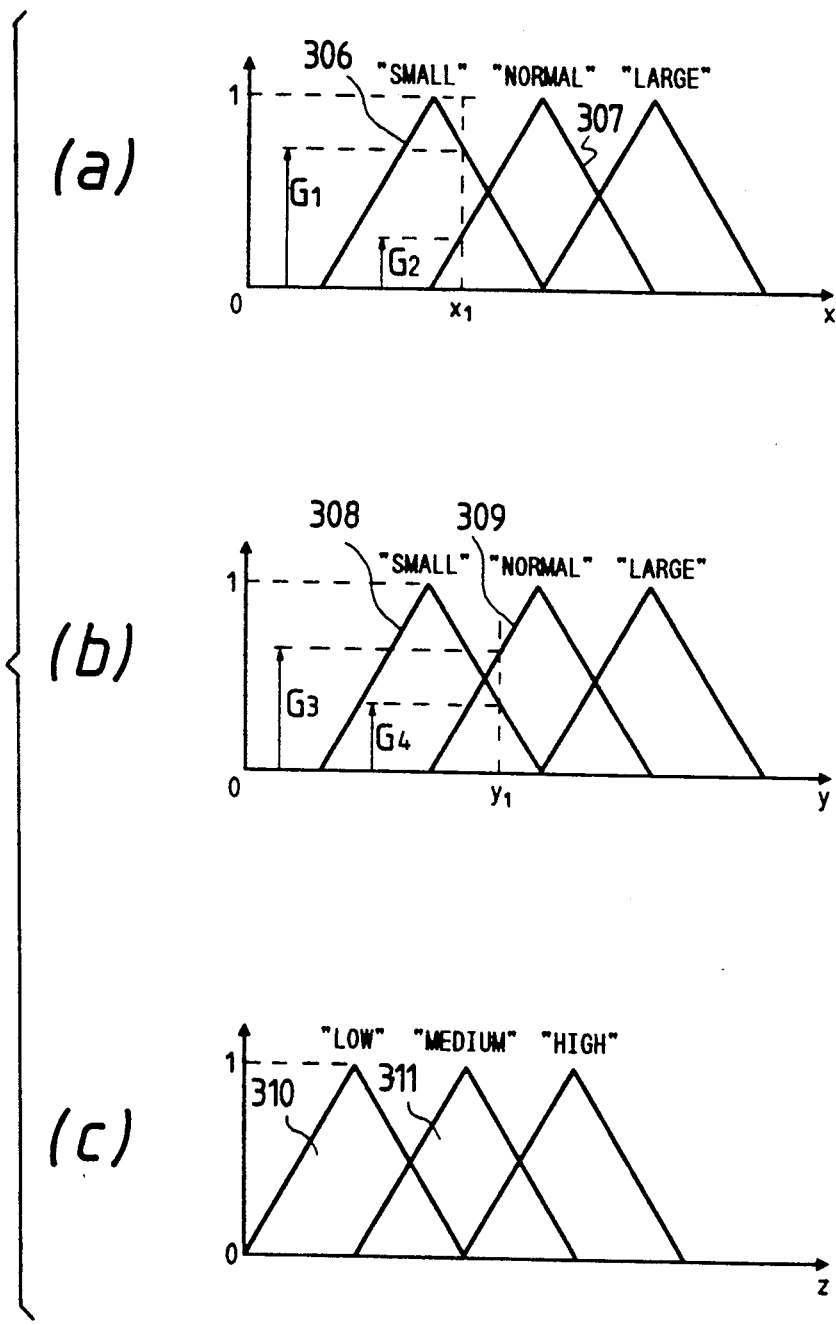
FIGS. 2A, 2B are diagrams for describing how the process of FIGS. 1A, 1B is modified when there are two variables in the consequent part of each fuzzy inference rule.

The case of a fuzzy inference operation in which there are two input variables, designated as x and y and one output variable, designated as z, will be considered referring to diagrams (a) to (c) in FIG. 2A. Here it is assumed that each of the input variables x and y has three fuzzy set membership functions, respectively labelled as "small", "normal" and "large". The output variable z has three fuzzy set membership functions, labelled respectively "low", "high" and "medium". For simplicity of description, only the following two fuzzy inference rules will be considered:

R1: If x is small and y is small, then z is low.
R1: If x is normal and y is normal, then z is medium.

Figure 2B:
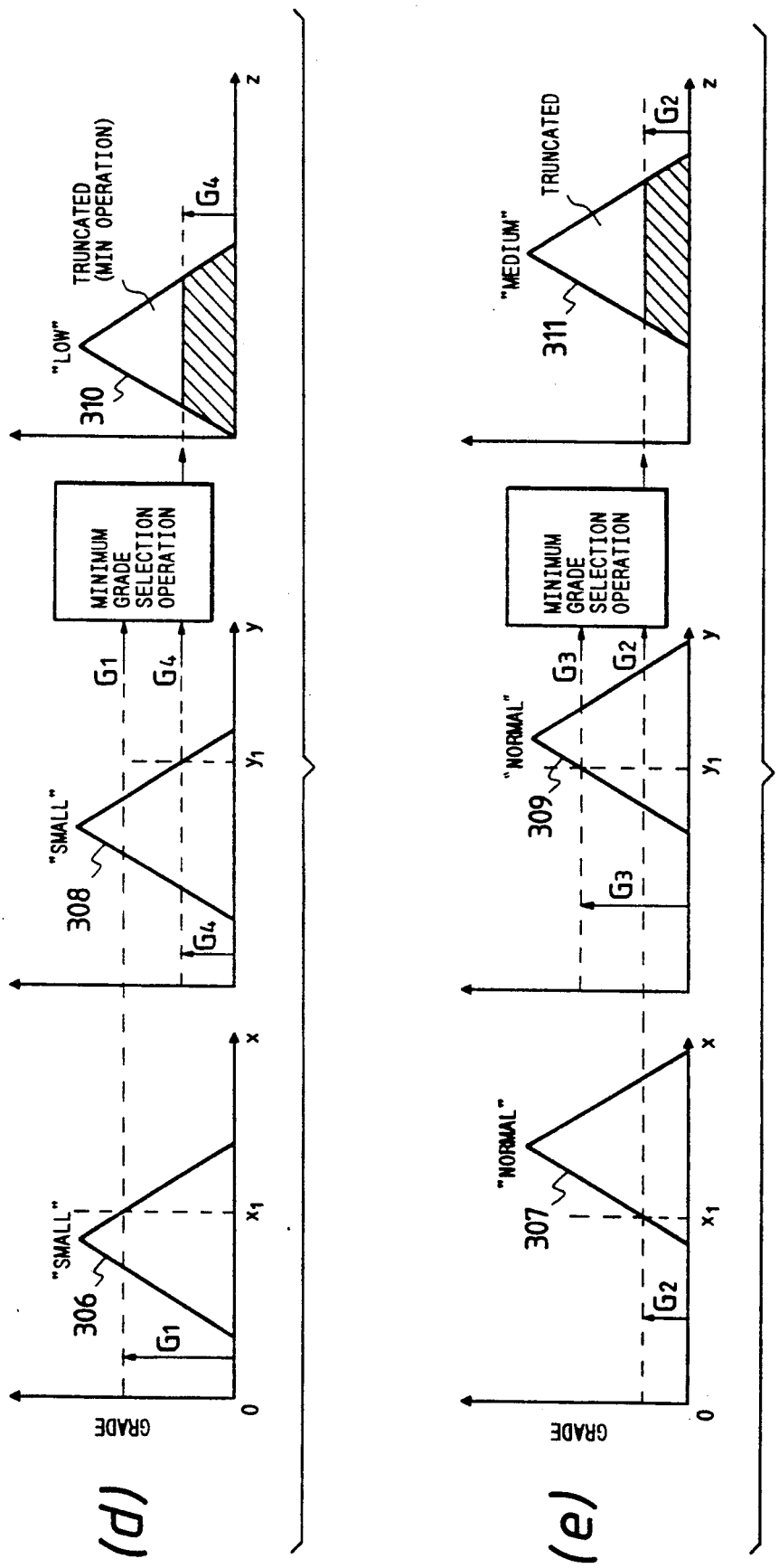

It will be assumed that the input variables x, y take respective values $x_1$ and $y_1$ as shown, which have grades of G1, G2 with respect to the "small", "normal" membership functions 306, 307 and grades G3, G4 with respect to the "small", "normal" membership functions 308, 309 respectively. Diagrams (d) and (e) of FIG. 2B illustrate how, in accordance with the "and" stipulation in the antecedent part of each of the above rules, the smaller of the two grades G1, G4 obtained for the "small" sets of the variables x and y is selected, i.e. G4 is selected, by a minimum grade selection operation. A truncation operation, i.e. by a MIN operation, is then executed as described hereinabove, to obtain a truncated membership function from the "low" of the output variable z, as shown by the hatched-line region. Similarly, of the two grades G3, G2 obtained with respect to the "normal" membership functions of the x and y variables respectively, the smaller of these (i.e. G2) is selected, and then MIN operation is executed to derive the hatched-line membership function from the "medium" membership function 311 of the output variable z. These truncated membership functions are then combined by the aforementioned MAX operation. The "center of gravity" value of the output variable z with respect to the resultant combined membership function is then derived as described hereinabove, to obtain the required output value of z that corresponds to the combination of input values $x_1$ and $y_1$.

The above operation can be extended to the case in which each of the fuzzy inference rules has an antecedent part containing three or more variables. In each case, the resultant three or more truncated membership functions are united by a MAX operation, and the "center of gravity" value of the output variable is then obtained.

It will be apparent that a similar procedure can be used for the case in which discrete values are used in the consequent parts of the rules, rather than fuzzy sets, as described hereinabove referring to FIG. 1C.

In a practical apparatus in accordance with the present invention, in which each fuzzy set membership function can be represented by a relatively small number of sample values, it is preferable to store each of the various fuzzy set membership functions in a table memory as a set of values (i.e. a set of grade values stored in correspondence with respective values of a variable such as temperature gradient). However if a large number of values is used to represent each membership function, it may be preferable to generate each membership function when required, by using a predetermined equation.

Fuzzy inference control, as applied to a cooking apparatus, has the basic advantage that the shapes and ranges of the various transfer functions can be arbitrarily determined, based on actual human experience of past operation of such types of cooking apparatus, or based on the results of practical experiments, such as to provide results from the fuzzy inference control that are close to optimum, even although there are various factors affecting the control operation which vary in a non-linear manner or in a manner which cannot be easily expressed mathematically.

Figure 3:
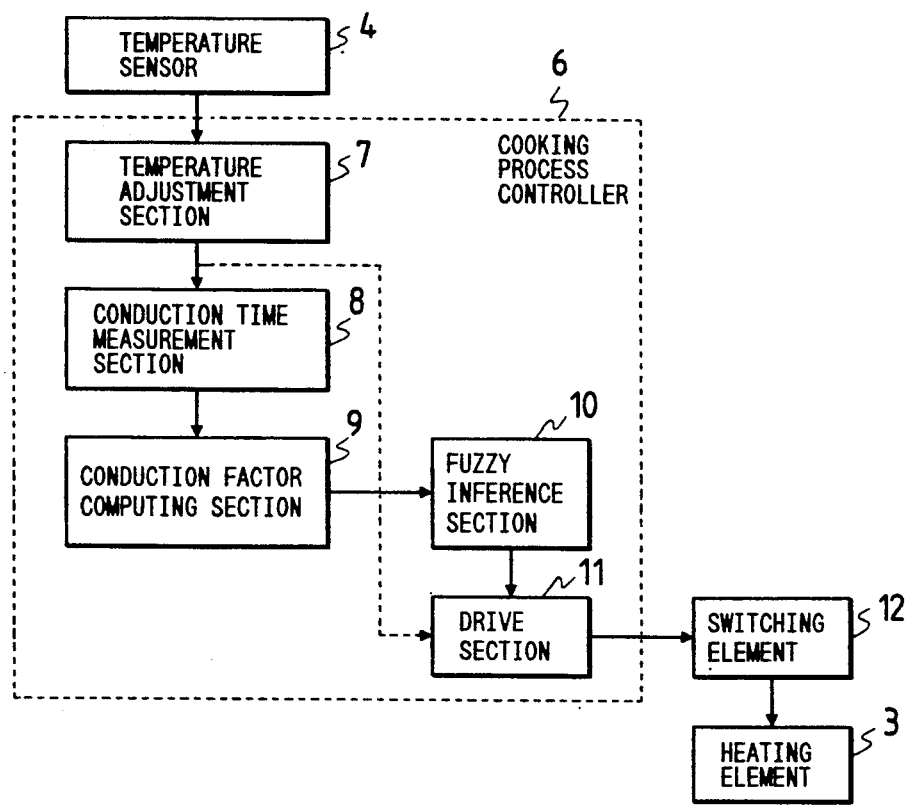
FIG. 3 is a general system block diagram of a first embodiment of a rice cooking apparatus according to the present invention, in which heating power is controlled in accordance with a measured average value of conduction factor.

A first embodiment of a cooking apparatus according to the present invention, which is a rice cooking apparatus, will be described referring first to FIGS. 3 to 5.

Figures 5, 6:
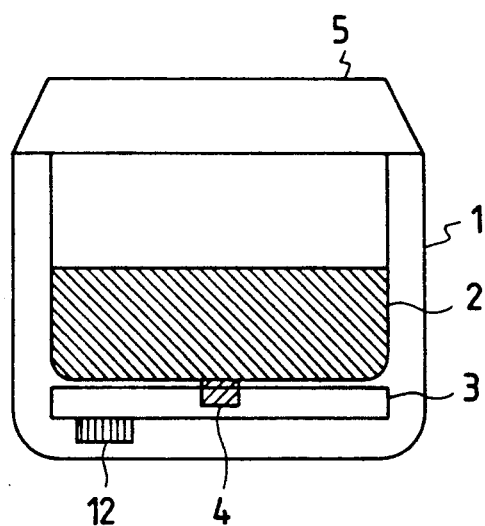
FIG. 5 shows the physical configuration of the rice cooking apparatus of the first embodiment.
FIG. 6 is a table showing the fuzzy inference rules for the first embodiment.

FIG. 5 is a simplified cross-sectional view showing the main components of the embodiment, which is made up of a body 1 having a heater element 3 mounted within the body. The heater element 3 can for example be a resistive heater element, and is disposed near the base of the body 1, for heating a vessel 2 which contains the food material (i.e. a mixture of rice and water) that is to be cooked, with the vessel 2 being covered by a lid 5 to prevent escape of heat. Numeral 4 denotes a temperature sensor such as a thermistor, and 12 denotes a controlled switching element such as a thyristor, for switching a supply of power to the heater element 3 on and off. The temperature sensor 4 is mounted as shown at the base of the vessel 2, for producing an output signal indicating the temperature of the food material within the vessel 2.

The cooking apparatus is provided with a control section 6 for controlling the operation of the heater element 3, which will be described referring to FIG. 3. The functions of ttie cooking process controller 6 are preferably implemented by operations of a microcomputer, however for simplicity of description these functions will be described as if they were implemented by respectively separate system sections. As shown, the cooking process controller 6 is made up of a temperature adjustment section 7 which, during a preliminary time interval as described hereinafter, compares the level of a temperature detection output signal produced from the temperature sensor 4 with a predetermined threshold value, and produces an output signal that is applied through the drive section 11 to the switching element 12 for controlling ON/OFF switching of the switching element 12 to control the heating power produced from the heater element 3 such as to maintain the food material close to a constant temperature value, which is determined by the aforementioned threshold value. The total amount of time for which the switching element 12 is set in the ON state during the aforementioned time interval is calculated by a conduction time measurement section 8. Based on that total amount of time, a conduction factor computing section 9 computes the average conduction factor of the heater element 3 during that predetermined interval. That value of conduction factor provides an indication of the quantity of the food material that is to be cooked, i.e. the greater the amount of food material the higher will be that average value of conduction factor, and conversely the smaller the amount of food material the smaller will be the conduction factor.

Figure 4:
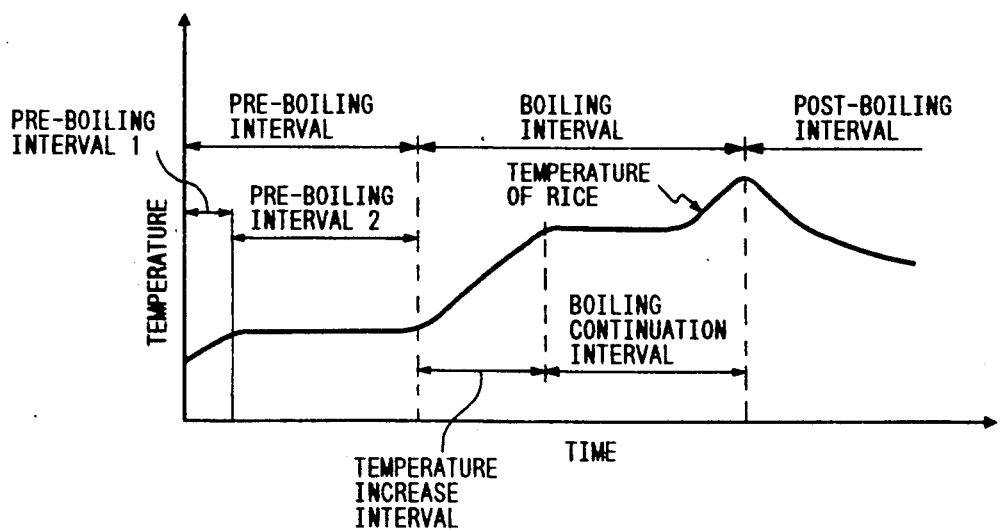
FIG. 4 is a graph illustrating the relationship between temperature and time with respect to the cooking process.

FIG. 4 shows the changes in temperature of the food material (i.e. mixture of rice and water) that occur during the cooking process. In the following, that mixture of rice and water that is being cooked will be simply referred to as the rice, for brevity of expression. The temperature is initially raised to a value that is warm, but below boiling point, during a first part (designated as pre-boiling interval 1) of a pre-boiling interval. The rice is then maintained at that temperature during the interval designated as pre-boiling interval 2, which constitutes the aforementioned preliminary predetermined interval of this embodiment, in which the switching element 12 is controlled by the output signal from the temperature adjustment section 7 and the average conduction factor of the heater element 3 in that interval (referred to in the following as the measured conduction factor) is derived. At the end of the pre-boiling interval, a fuzzy inference operation is executed using the obtained value of measured conduction factor, to obtain a value of conduction factor that is to be used during an interval in which the temperature of the rice is quickly raised to the boiling point. That interval will be referred to in the following as the temperature increase interval. In the following, any value of conduction factor that is outputted from a fuzzy inference section, for controlling the level of heating power of a heater element, will be referred to as an output conduction factor value. At the end of that temperature increase interval, a boiling continuation interval begins, in which the rice is maintained in a boiling condition until the end of that interval, using a second value of output conduction factor that is derived by a fuzzy inference operation based on the aforementioned measured conduction factor. The combination of the temperature increase interval and the boiling continuation interval will be referred to as the boiling interval. When almost all of the water has been boiled off, at the end of the boiling interval, the temperature of the rice rapidly begins to increase, and power to the heater element 3 is then reduced, to begin a subsequent interval which will be referred to as the post-boiling interval.

The operation of this embodiment will be described in greater detail referring to FIGS. 7 and 8. With this embodiment, based on the obtained value of measured conduction factor, a first value of output conduction factor (referred to in the following as output conduction factor 1) is obtained by fuzzy inference operation, for use during the temperature increase interval, and a second value of output conduction factor (referred to as output conduction factor 2) is obtained, also by fuzzy inference operation, for use during the boiling continuation interval (in which a lower level of power is to be generated by the heater element 3 than during the temperature increase interval). The operation of the fuzzy inference section 10 is based on the following fuzzy inference rules which are used both in deriving the output conduction factor 1 and also in deriving the output conduction factor 2, and which are expressed in the form of a table in FIG. 3:

If the measured conduction factor is small, then the output conduction factor is small.

If the measured conduction factor is normal, then the output conduction factor is normal.

If the measured conduction factor is large, then the output conduction factor is large.

Figure 7:
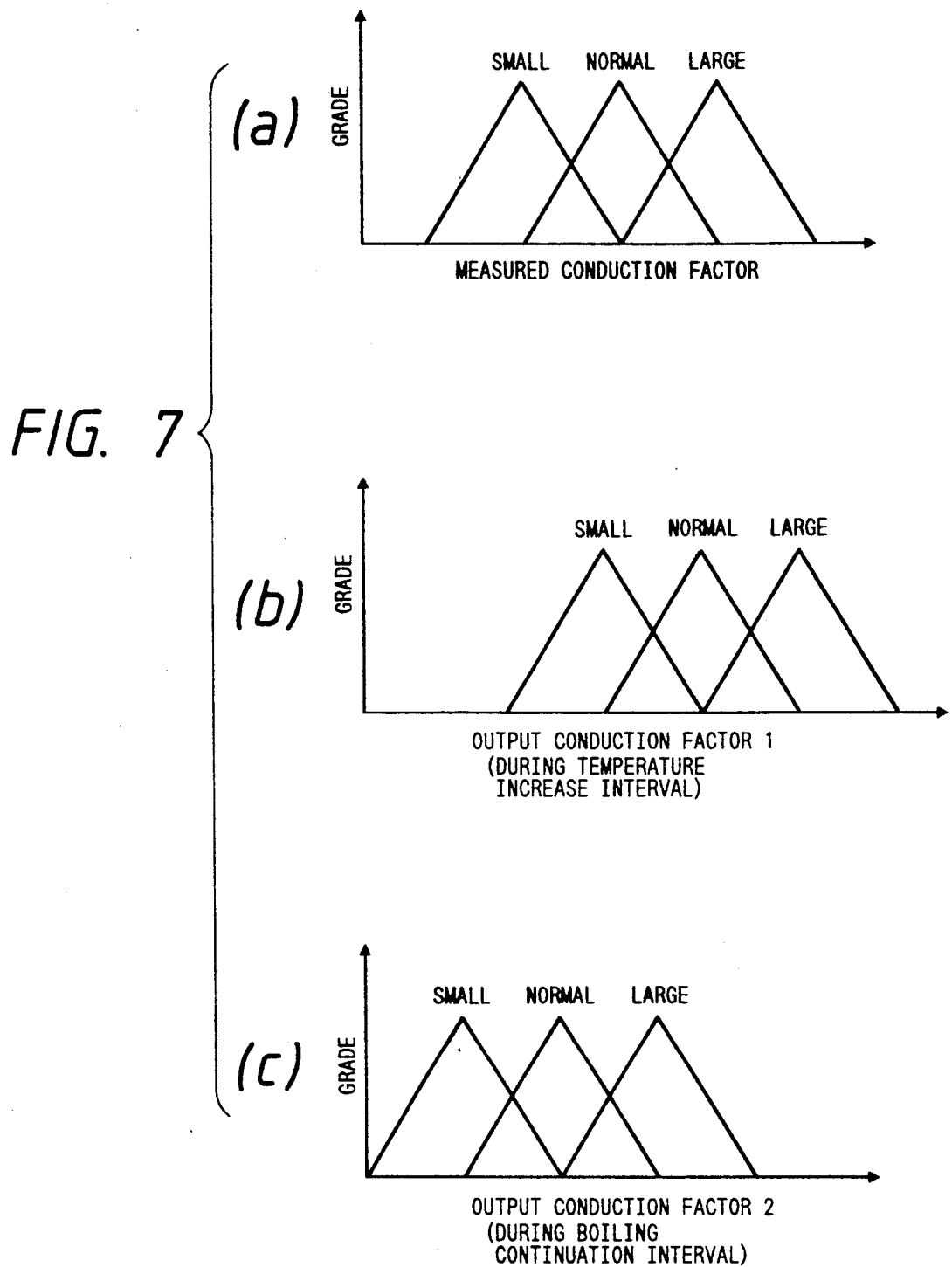
FIG. 7 shows the fuzzy set membership functions corresponding to the rules of FIG. 6.
Figure 8:
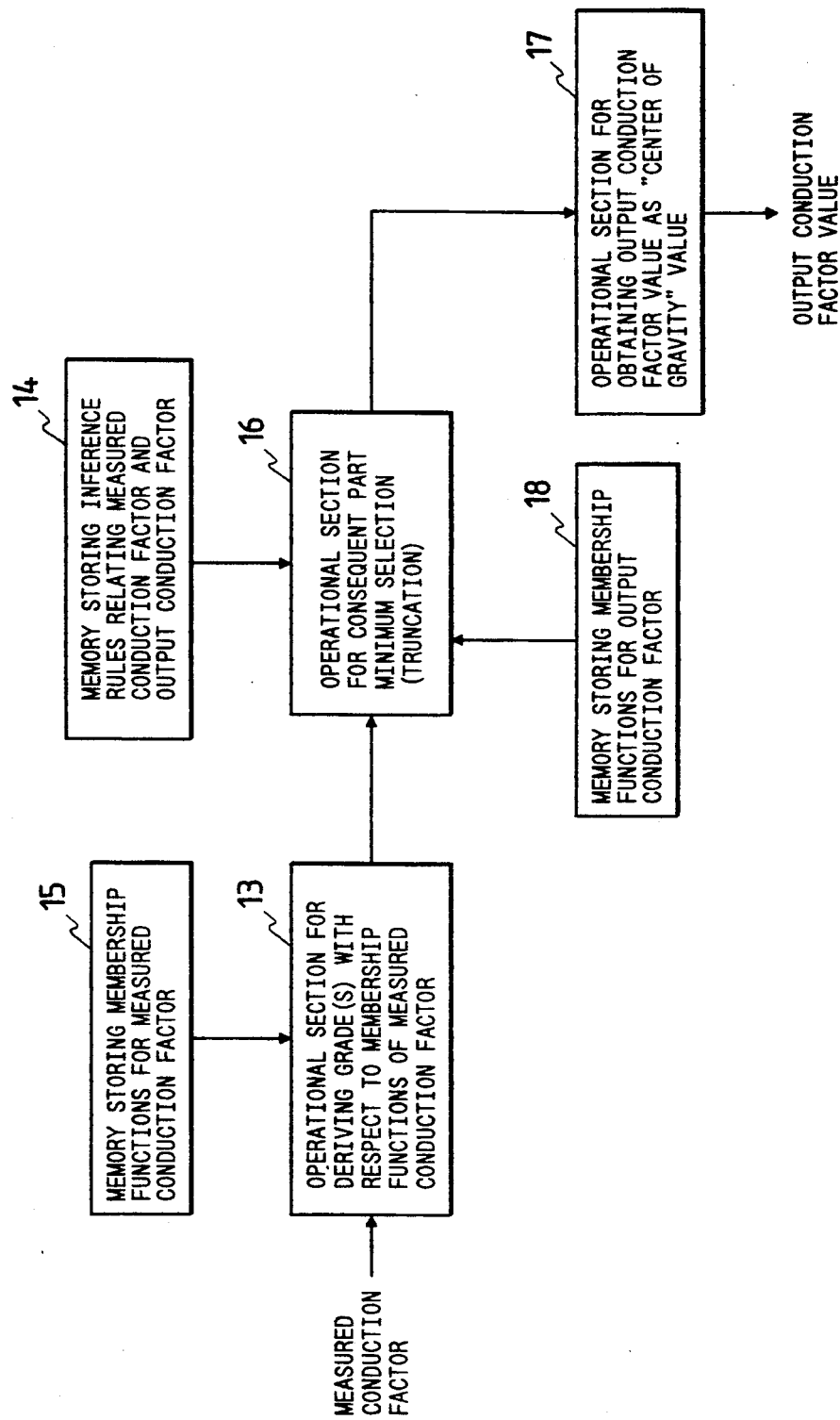
FIG. 8 is a block diagram for assistance in describing the operation of a fuzzy inference section in the first embodiment.

The "small", "normal" and "large" fuzzy set membership functions of the measured conduction factor are shown in diagram (a) in FIG. 7, while the "small", "normal" and "large" membership functions of the output conduction factor I that are to be used to obtain the value of output conduction factor 1 that will be used during the temperature increase interval are shown in diagram (b), and the "small", "normal" and "large" membership functions of the output conduction factor 2 that are to be used to obtain the value of output conduction factor 2 that will be used during the boiling continuation interval are shown in diagram (c). The fuzzy inference rules and the membership relations can be established on the basis of past experience, or as a result of experiments.

The method of deriving a specific value of output conduction factor 1 based on an obtained value of measured conduction factor is as described hereinabove referring to FIGS. 1A and 1B. The functions executed by the fuzzy inference section 10 are shown conceptually in FIG. 8 in the form of respective "operational sections", for executing the various fuzzy inference operations described referring to FIGS. 1A and 1B. A memory 15 stored the membership functions for the measured conduction factor, while a memory 18 similarly stores the membership functions for the output conduction factor. An operational section 13 derives respective grades of the measured conduction factor with respect to the membership functions of the measured conduction factor. A memory 14 stores the fuzzy inference rules described above. An operational section 16 acts on the grades supplied by the operational section 13 and the membership functions supplied from the memory 18 in accordance with the rules to execute the aforementioned truncation operations, with the resultant truncated membership functions being united by an operational section 17 (i.e. by a MAX operation), and with the "center of gravity" value of the result being obtained and outputted as the desired value of output conduction factor.

Figure 9A:
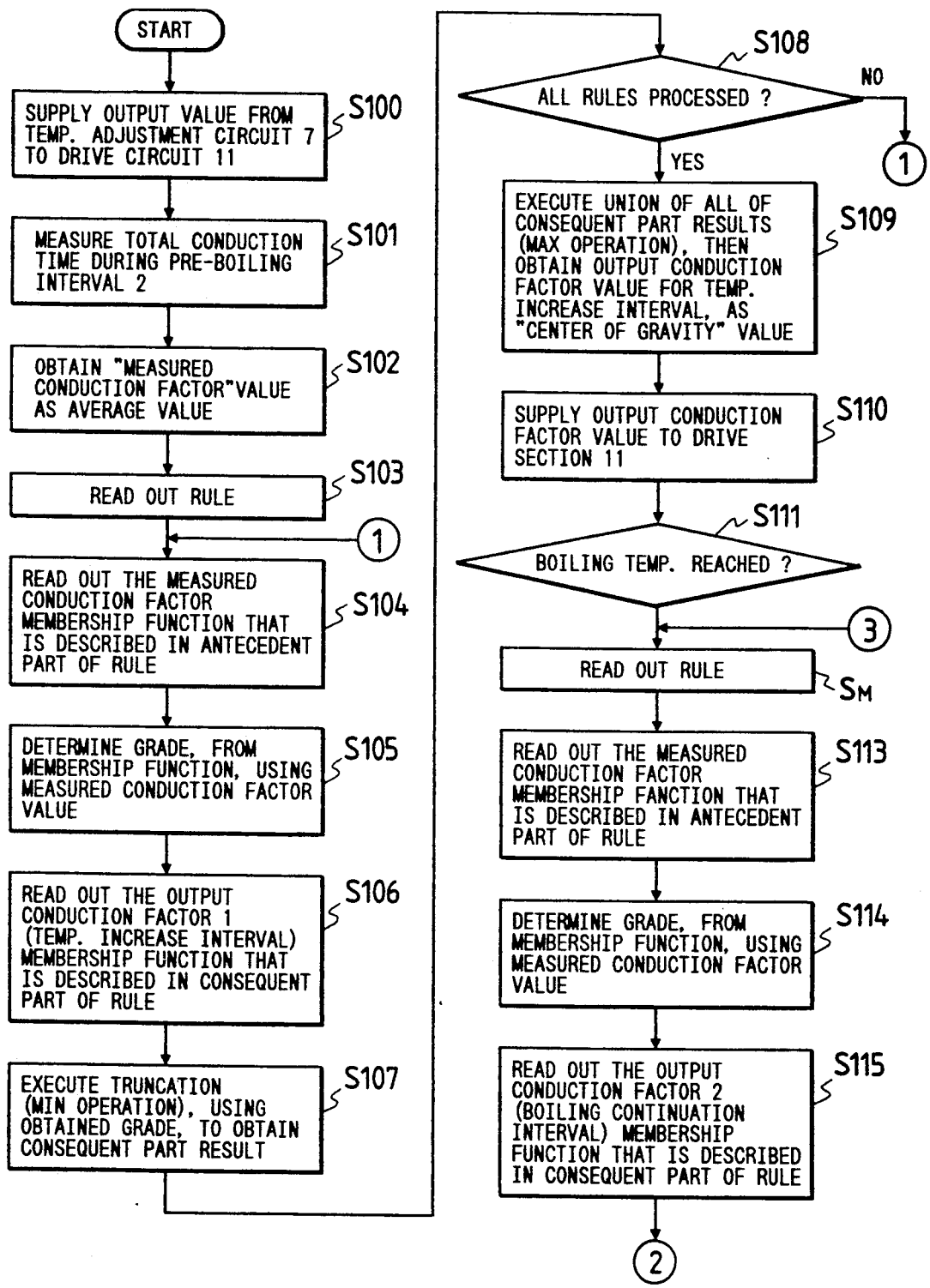
FIGS. 9A, 9B are a flow diagram for assistance in describing the operation of a cooking process controller in the first embodiment.
Figure 9B:
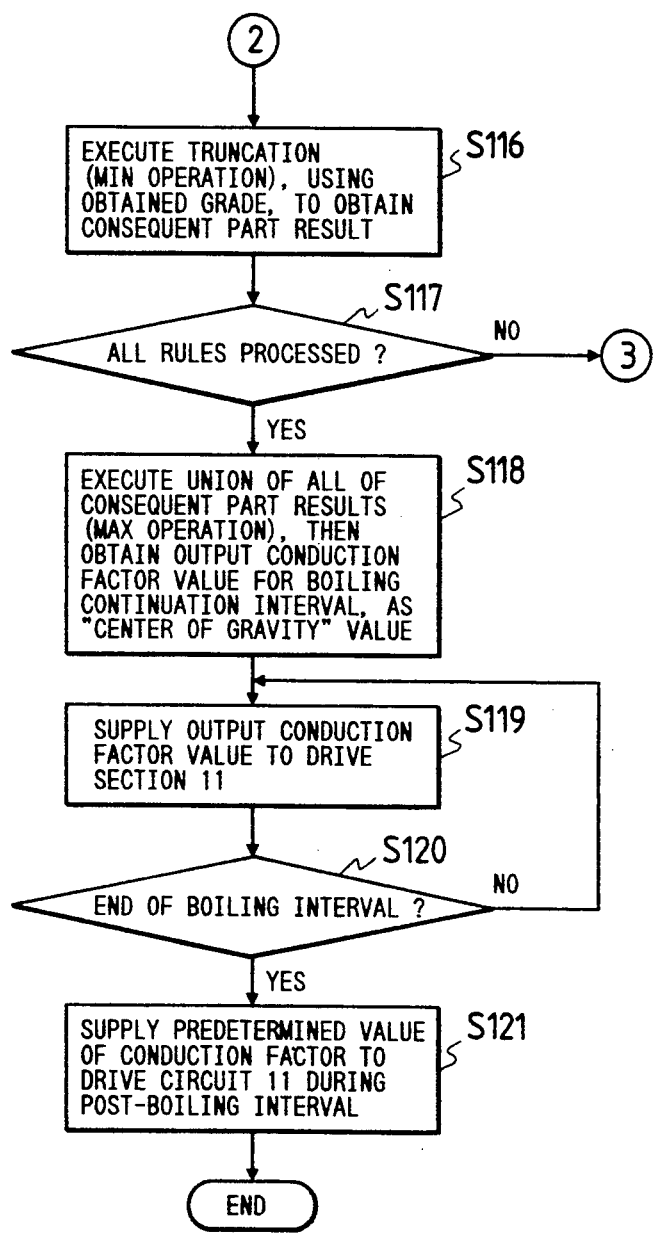

The overall sequence of operations executed by the cooking process controller 6 during the cooking process are shown in the form of a flow diagram in FIGS. 9A, 9B. Firstly, as shown by the broken-line connection in FIG. 3, the output signal from the temperature adjustment section 7 is directly supplied to the drive section 11, for controlling the switching element 12 such as to maintain the aforementioned constant temperature of the rice during the pre-boiling interval. During the pre-boiling interval, the total of all of the successive intervals in which the switching element 12 is set in the ON state is obtained, as the total conduction time, and at the end of the pre-boiling interval (step S102), the measured conduction factor is obtained as the average value of conduction factor during the pre-boiling interval (more precisely, during the portion designated as pre-boiling interval 2 in FIG. 4, after the temperature of the rice has stabilized following the start of the pre-boiling interval).

Next the fuzzy inference operation to obtain a value of output conduction factor I for use during the temperature increase interval is started, with step S103 in which one of the set of fuzzy inference rules described above is read out. The operations previously described for obtaining a truncated membership function are then executed, in steps S105, S106, S107, then a second one of the rules is read out, and these steps are repeated. Specifically, in step S104 the membership function (i.e. "small", "normal" or "large") recited in the antecedent part of a rule is read out of memory, then the grade of the measured conduction factor with respect to that membership function is obtained, then the membership function of the output conduction factor 1 that is recited in the consequent part of that rule is read out, and is subjected to the truncation operation (MIN operation) in accordance with the aforementioned grade. When all of the rules have been processed (in this example only two of the rules, at most, will actually be applicable), the truncated membership functions that have been obtained are united by a MAX operation, and the "center of gravity" value of the result is obtained (step S109). The value of factor that has thus been obtained is then supplied to the drive section 11 in place of the output value from the temperature adjustment section 7, so that the heater element 3 now generates a level of heating power that is determined by that output conduction factor 1 value, and the temperature increase interval therefore begins.

When it is detected that the rice has reached a boiling condition (i.e. based on the output signal from the temperature sensor 4, then a first one of the fuzzy inference rules is again read out (step S112), to begin operations to obtain a value of output conduction factor 2 for use during the boiling continuation interval. A sequence of steps S113 to S118 is then executed to obtain a value of output conduction factor 2 for use during the boiling continuation interval, in a similar manner to that in which the value of output conduction factor 1 was derive. However in this case, a different set of output conduction factor membership functions are utilized, i.e. the set shown in diagram (c) of FIG. 7, such that although the fuzzy inference operation is based upon the same value of measured conduction factor as for the case of deriving output conduction factor 1, a lower value will be obtained for output conduction factor 2 than for output conduction factor 1.

The value of output conduction factor 2 that has thus been derived is then supplied to the drive section 11 to determine the level of heating power generated by the heater element 3 during the boiling continuation interval.

When the end of the boiling continuation interval is detected (e.g. detected based on the aforementioned increase in temperature that occurs at the end of that interval), a predetermined value of output conduction factor is supplied to the drive section 11 in place of the output conduction factor value 2 from the fuzzy inference section 10, during the post-boiling interval.

It should be noted however that it would be equally possible to use a similar fuzzy inference operation to those described for deriving the output conduction factor 1 and output conduction factor 1 values, to determine a suitable value of output conduction factor to be supplied to the drive section 11 during the post-boiling interval.

It has been found that the average conduction factor of the switching element 12 during the pre-boiling interval 2 provides a reliable indication of the amount of food material that is to be cooked. Hence, by using fuzzy inference control of heating power based upon that average conduction factor (i.e. the "measured conduction factor" value) the above embodiment enables suitable values of heating power applied to the food material during the temperature increase interval and the boiling continuation interval to be reliably established in accordance with the amount of food that is to be cooked, so that the cooking process can provide results that are close to optimum.

Figure 10:
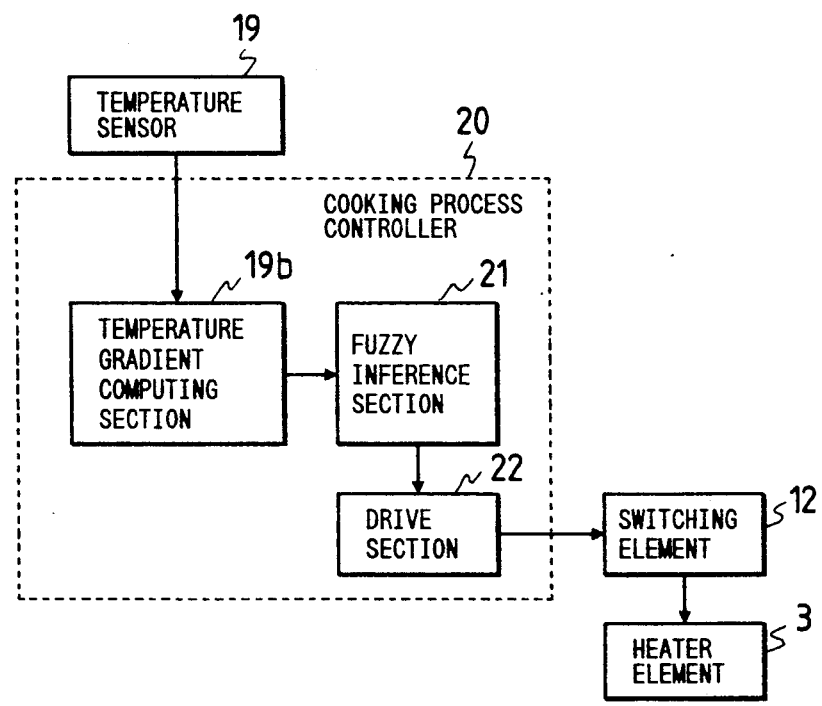
FIG. 10 is a general system block diagram of a second embodiment of a rice cooking apparatus according to the present invention, in which heating power is controlled in accordance with a measured temperature gradient of the lid of the cooking apparatus.
Figure 11:
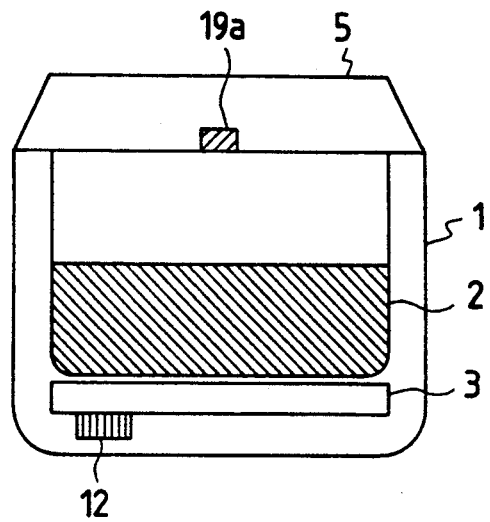
FIG. 11 shows the physical configuration of the rice cooking apparatus of the second embodiment.

A second embodiment of a rice cooking apparatus according to the present invention will be described, referring first to FIGS. 10 to 13. FIG. 11 is a simplified cross-sectional view showing the main components of the embodiment which, as for the first embodiment, is made up of a body 1 having a heater element 3 mounted within the body near the base, for heating a vessel 2 which contains the rice that is to be cooked. This embodiment differs from the first embodiment in that a temperature sensor 19 such as a thermistor is mounted in the lid 5, for detecting the temperature of the lid. A switching element 12 controls the level of power generated to heat the rice, by repetitively switching the power to the heater element 3 on and off in accordance with a value of output conduction factor that is inputted to a drive section 22, as for the first embodiment, with the drive section 22 being coupled to control the switching element 12. As shown in FIG. 10, a cooking process controller 20 (whose functions can be implemented by operations of a microcomputer) includes a temperature gradient computing section 19b, a fuzzy inference section 21 and a drive section 22. Section 19b is used to obtain a value of lid temperature gradient (i.e. rate of change of temperature, as measured by the lid-mounted temperature sensor 19a, with respect to time) during the temperature increase interval, as described hereinafter. That temperature gradient provides an indication of the amount of food that is to be cooked (i.e. the smaller the value of lid temperature gradient, the greater is the amount of food), and fuzzy inference control of the heating power level used in the cooking process can therefore be executed based upon the temperature gradient. The fuzzy inference section 21 serves to derive a value of output conduction factor based on that value of temperature gradient, and supplies that output conduction factor value to the drive section 22, for thereby controlling the level of heating power generated by the heater element 3 during the boiling continuation interval of the cooking process, by controlling the switching operation of the switching element 12.

Figure 12:
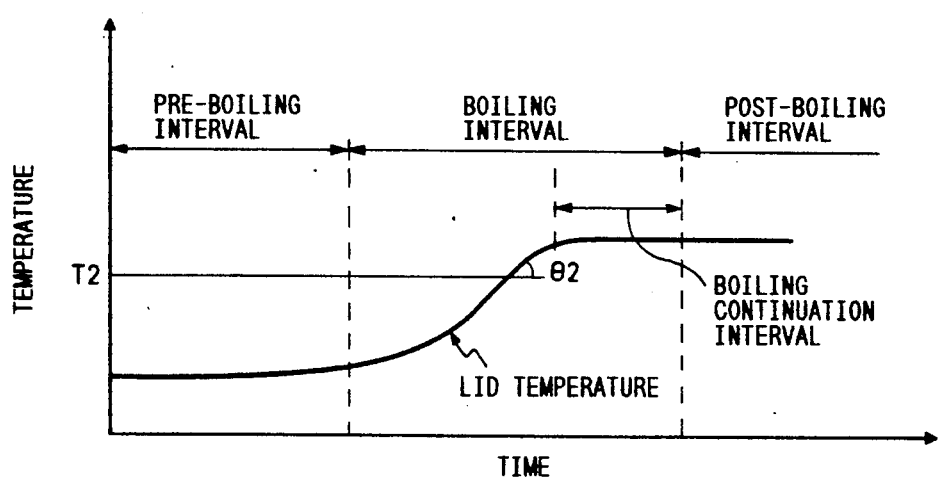
FIG. 12 shows the variation with time of the lid temperature during the cooking process.

The operation of this embodiment is as follows. During the pre-boiling interval, it will be assumed that a predetermined value of output conduction factor is supplied to the drive section 22 (i.e. supplied by means other than the fuzzy inference section 21, which are not shown in FIG. 10), although it would be equally possible to provide feedback control of temperature during that interval as is done with the first embodiment. After a predetermined duration of pre-boiling interval has elapsed, the temperature increase interval begins, at the start of the boiling interval. During the temperature increase interval, an output conduction factor of 100% is supplied to the drive section 22, so that the heater element 3 is held in the continuously ON state. Thus the temperature of the lid 5 as measured by the temperature sensor 19a rapidly increases, as shown in FIG. 12. When the lid temperature has attained a predetermined value T2, the temperature gradient up to that point is measured by the temperature gradient computing section 19b. That is to say, the rate of change of lid temperature with respect to time over a time interval, extending for example from the end of the pre-boiling interval up to the point at which the temperature value T2 is detected, is computed, i.e. the differential with respect to time of the successive temperature values produced from the sensor 19 is obtained. That value of lid temperature gradient is then supplied to the fuzzy inference section 21. When the rice thereafter reaches boiling temperature, i.e. when the boiling continuation interval is to begin, the drive section 22 derives a value of output conduction factor based on the supplied value of lid temperature gradient, and supplies that output conduction factor value to the drive section 22, to determine the level of heating power that will be generated by the heater element 3 during the boiling continuation interval.

Figures 13, 14:
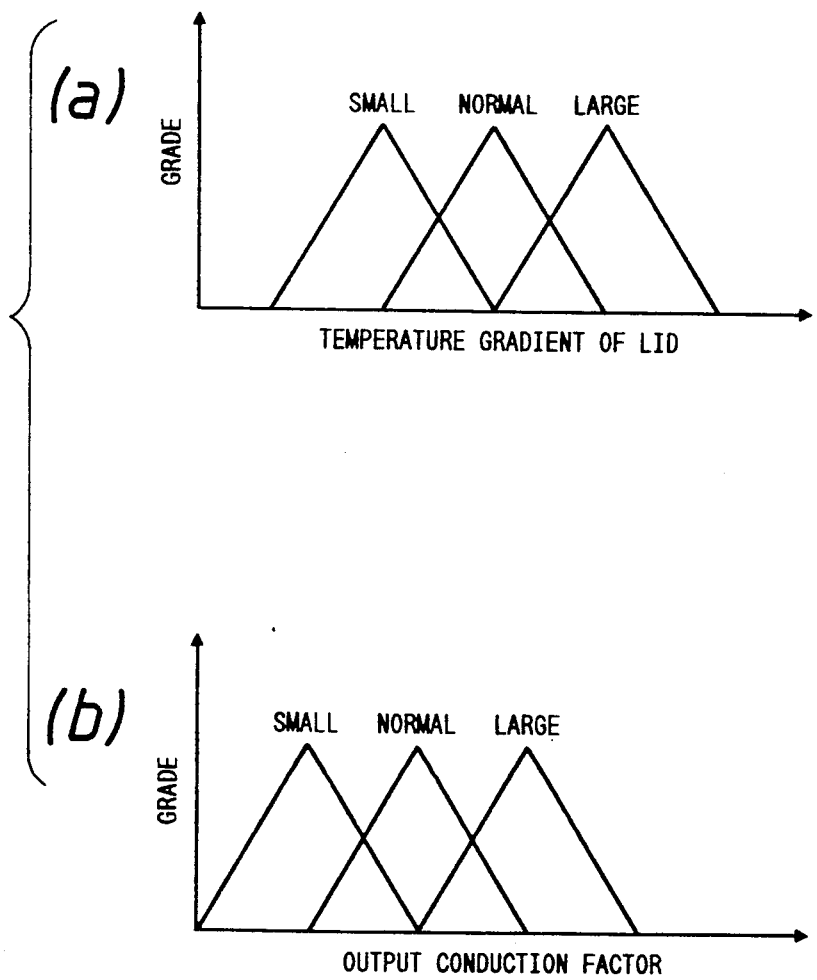
FIG. 13 is a table showing the fuzzy inference rules for the second embodiment.
FIG. 14 shows the fuzzy set membership functions corresponding to the rules of FIG. 13.
Figure 15:
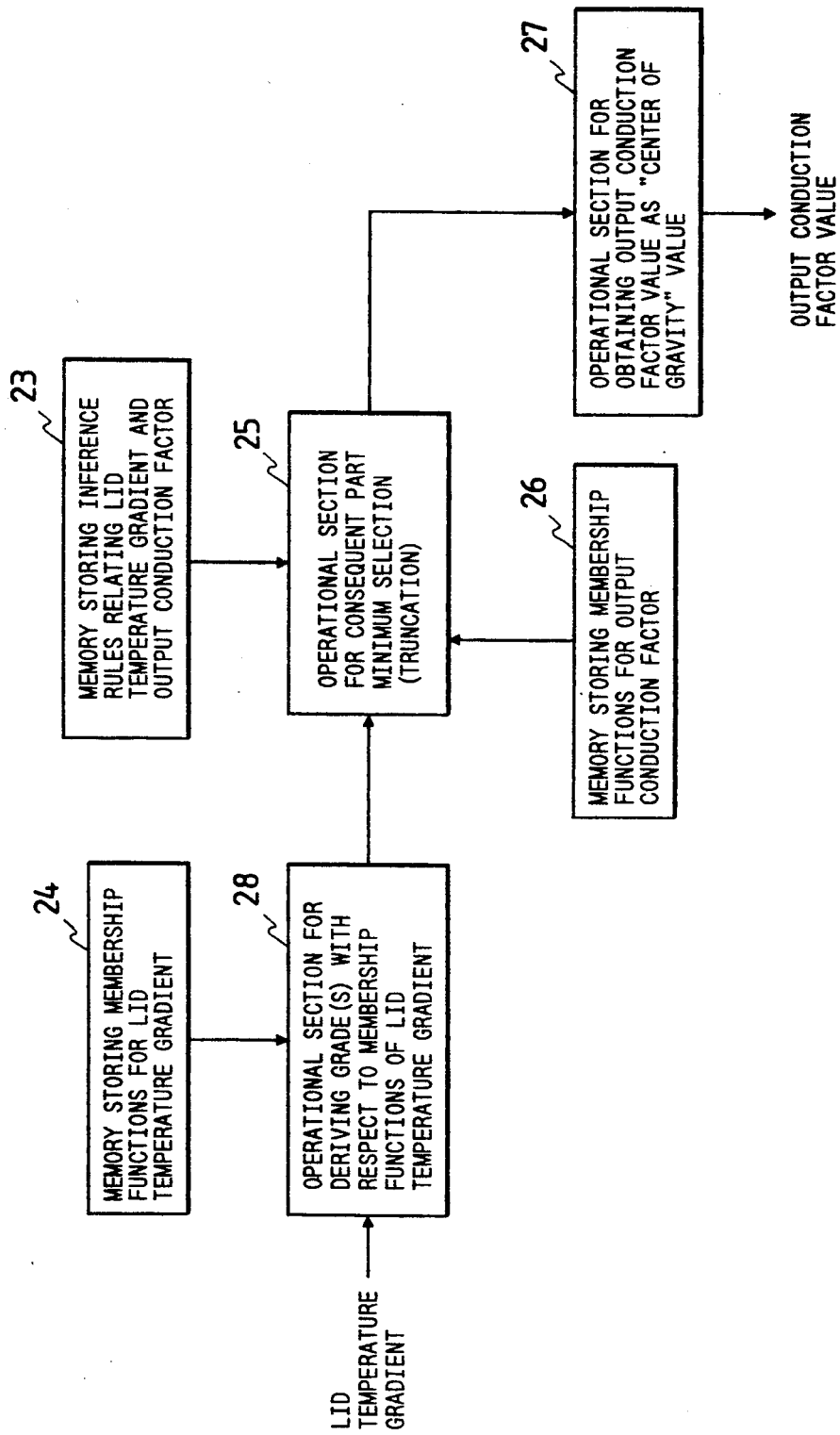
FIG. 15 is a block diagram for assistance in describing the operation of a fuzzy inference section in the second embodiment.

The operation of the fuzzy inference section 21 will be described referring to FIGS. 13 to 16. FIG. 13 shows the fuzzy inference rules which relate the lid temperature gradient to the output conduction factor, while FIG. 14 shows the membership functions for the lid temperature gradient (diagram (al)) and for the output conduction factor (diagram (b)). FIG. 15 illustrates the functions executed by the fuzzy inference section 21, as respective "operational sections". A memory 24 stored the membership functions for the lid temperature gradient while a memory 26 similarly stores the membership functions for the output conduction factor. An operational section 28 derives respective grades of the lid temperature gradient with respect to the membership functions of that temperature gradient. A memory 14 stores the fuzzy inference rules described above. An operational section 25 acts on the grades supplied by the operational section 28 and the membership functions supplied from the memory 26 in accordance with the rules supplied from the memory 23, to execute the aforementioned truncation (MIN) operations, with the resultant truncated membership functions being united by an operational section 17 (i.e. by a MAX operation), and with the "center of gravity" value of the result being obtained and outputted as the desired value of output conduction factor.

Figure 16A:
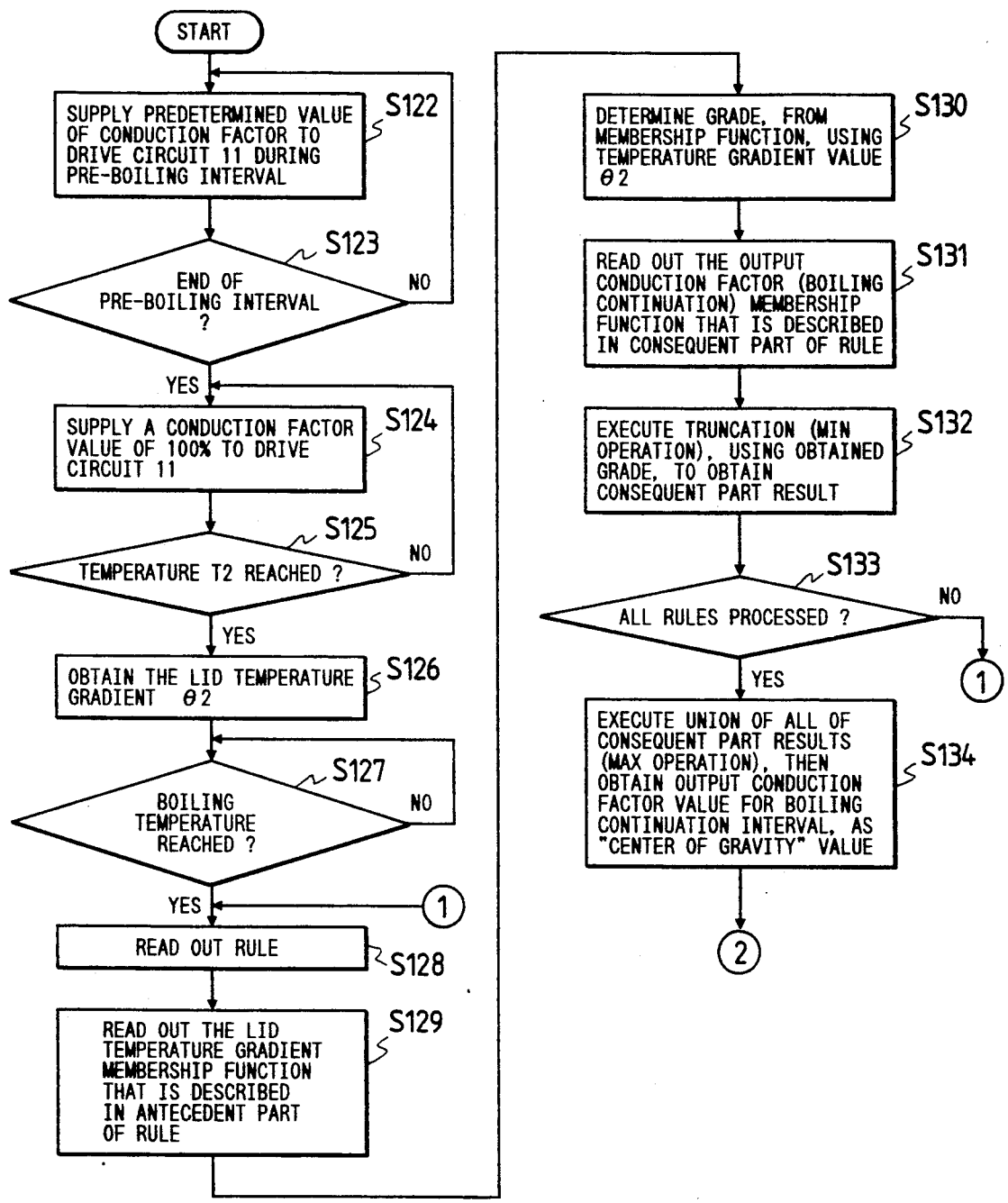
FIGS. 16A, 16B are a flow diagram for assistance in describing the operation of a cooking process controller in the second embodiment.
Figure 16B:
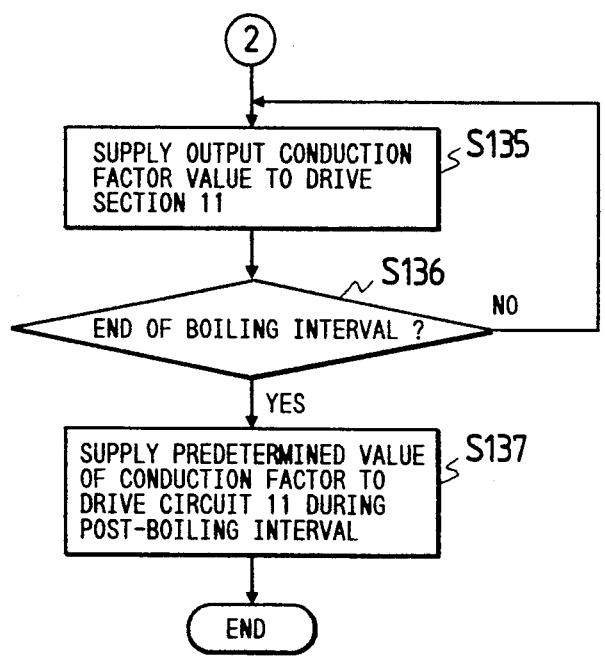

The operation of the fuzzy inference section 21 is illustrated in the flow diagram of FIGS. 16A, 16B. When the end of the pre-boiling interval is detected (step S123), the conduction factor of 100% is supplied to the drive section 22, to begin the temperature increase interval. When the predetermined temperature T2 is determined (step S125), the lid temperature gradient is obtained, and thereafter when the boiling temperature is reached (step S127), the fuzzy inference section 21 executes steps (S128 to S134) for obtaining a value of output conduction factor to be used during the boiling continuation interval, with that output conduction factor value being obtained as a "center of gravity" value in step S134, as described hereinabove. That value is supplied to the drive section 22, and thereafter the operation is similar to that of the first embodiment described above. However with the second embodiment, since the rate of temperature increase of the lid is delayed with respect to that of the rice which is being cooked, it nay not be possible to obtain an accurate value of lid temperature gradient until after boiling of the rice has begun. In that case, the level of heating power generated by the heater element 3 will be controlled by the output conduction factor value derived by the fuzzy inference section 21 during the remaining part of the boiling continuation interval after the lid temperature gradient has been derived and used to obtain that output conduction factor value.

Figure 17:
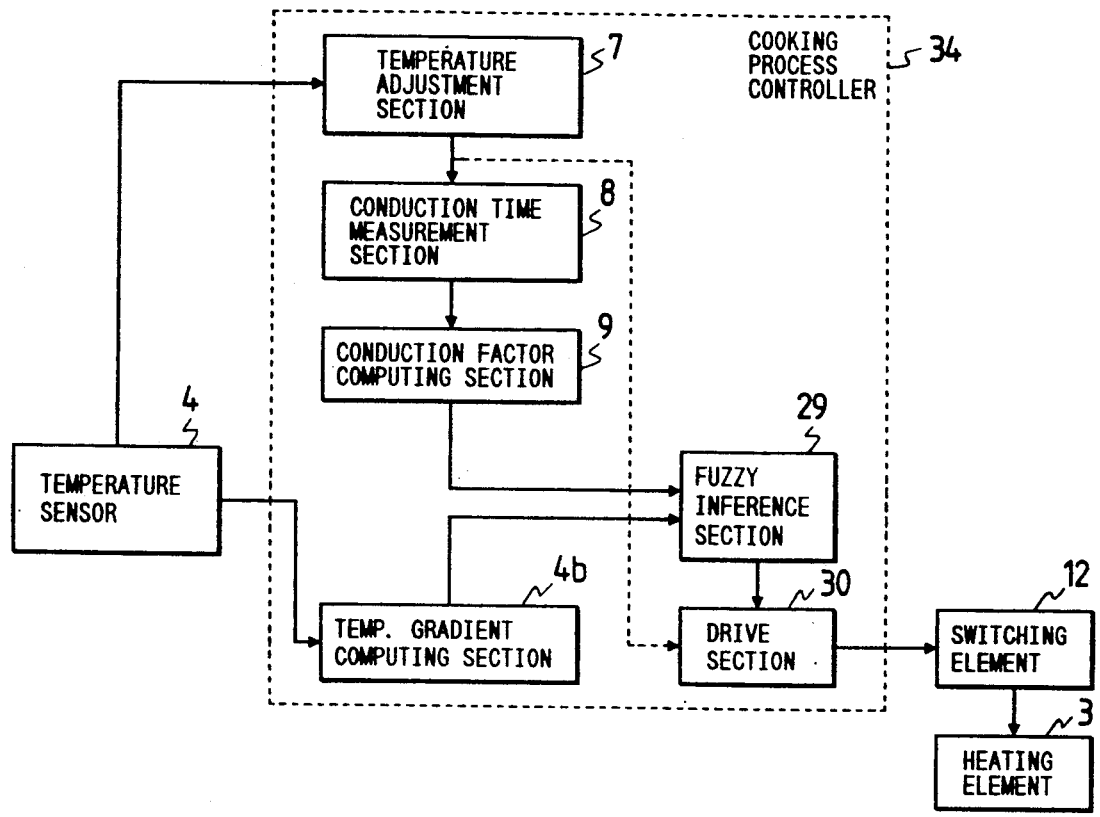
FIG. 17 is a general system block diagram of a third embodiment of a rice cooking apparatus according to the present invention, in which heating power is controlled in accordance with a measured average conduction factor and a measured temperature gradient of the rice.

A third embodiment of a rice cooking apparatus according to the present invention will be described, referring first to FIGS. 17 and 18. The physical configuration of this embodiment is similar to that of the first embodiment described hereinabove referring to FIG. 5, i.e. a temperature sensor 4 is provided at the base of the cooking vessel 2 containing the rice, for obtaining temperature values of the rice during the cooking process. However as shown in FIG. 17, the cooking process controller 34 of this embodiment differs from the first embodiment in further including a temperature gradient computing section 4b, for obtaining a value of rice temperature gradient. This embodiment further differs from the first embodiment in that the value of measured conduction factor obtained at the end of the pre-boiling interval is not used to determine the level of heating power generated during the temperature increase interval.

Figure 18:
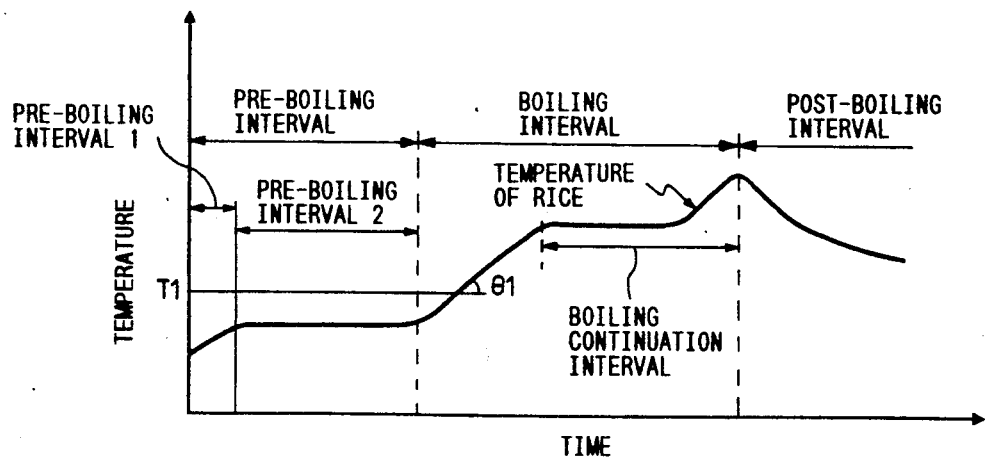
FIG. 18 shows the variation with time of the rice temperature during the cooking process.

With this embodiment, the temperature gradient of the rice during the temperature increase interval is used in conjunction with the average value of conduction factor during the pre-boiling interval (i.e. the measured conduction factor value) to provide an indication of the amount of material that is to be cooked, with that indication being applied through fuzzy inference operations to control the level of heating power that is generated by the heater element 3 during the boiling continuation interval shown in FIG. 18.

The operation of this embodiment is as follows. During the pre-boiling interval, the output values produced from the temperature sensor 4 are supplied to the temperature adjustment section 7 and compared with a predetermined temperature value, with an error value obtained from that comparison being supplied (as indicated by the broken-line connection in FIG. 17) to the drive section 22, for determining the level of heating power that is generated by the heater element 3, and thereby holding the temperature of the rice at the predetermined temperature value during the pre-boiling interval. During a predetermined portion of that interval (pre-boiling interval 2) in which the rice temperature has stabilized, the conduction time measurement section 8 obtains the average value of conduction factor of the switching element 12 during pre-boiling interval 2, to be subsequently supplied to the drive section 22 as the measured conduction factor value.

At the end of the pre-boiling interval, a conduction factor value of 100% is supplied to the drive section 22, causing the temperature of the rice to be rapidly increased during the temperature increase interval. When the rice temperature reaches a predetermined value of θ1, the temperature gradient computing section 4b computes the value of the rice temperature gradient. This can be done in a similar manner to that described hereinabove for the lid temperature gradient. Subsequently, when the boiling temperature is reached (as indicated by the output temperature value from the temperature sensor 4), a value of output conduction factor is derived by the fuzzy inference section 29, based on the rice temperature gradient and the measured conduction factor values that were previously obtained, and is supplied to the drive section 22 for determining the level of output power produced from the heater element 3 during the boiling continuation interval.

The operation of the fuzzy inference section 29 is as follows. FIG. 19 shows the fuzzy inference rules in this case, in the form of a table. There is a total of 7 rules, three of which have "the output conduction factor is "small"", three have "the output conduction factor is "large"" and one has "the output conduction factor is "normal"", as the consequent part. For example, one rule is:

If the temperature gradient of the rice is "large" and the measured conduction factor is "small", then the output conduction factor is "small".

Another rule is:

If the temperature gradient of the rice is "normal" and the measured conduction factor is "large", then the output conduction factor is "large".

FIG. 20 shows the corresponding fuzzy inference membership functions, with diagrams (a), (b) and (c) showing the rice temperature gradient membership functions, the measured conduction factor temperature gradients and the output conduction factor temperature gradients, respectively.

Figure 21:
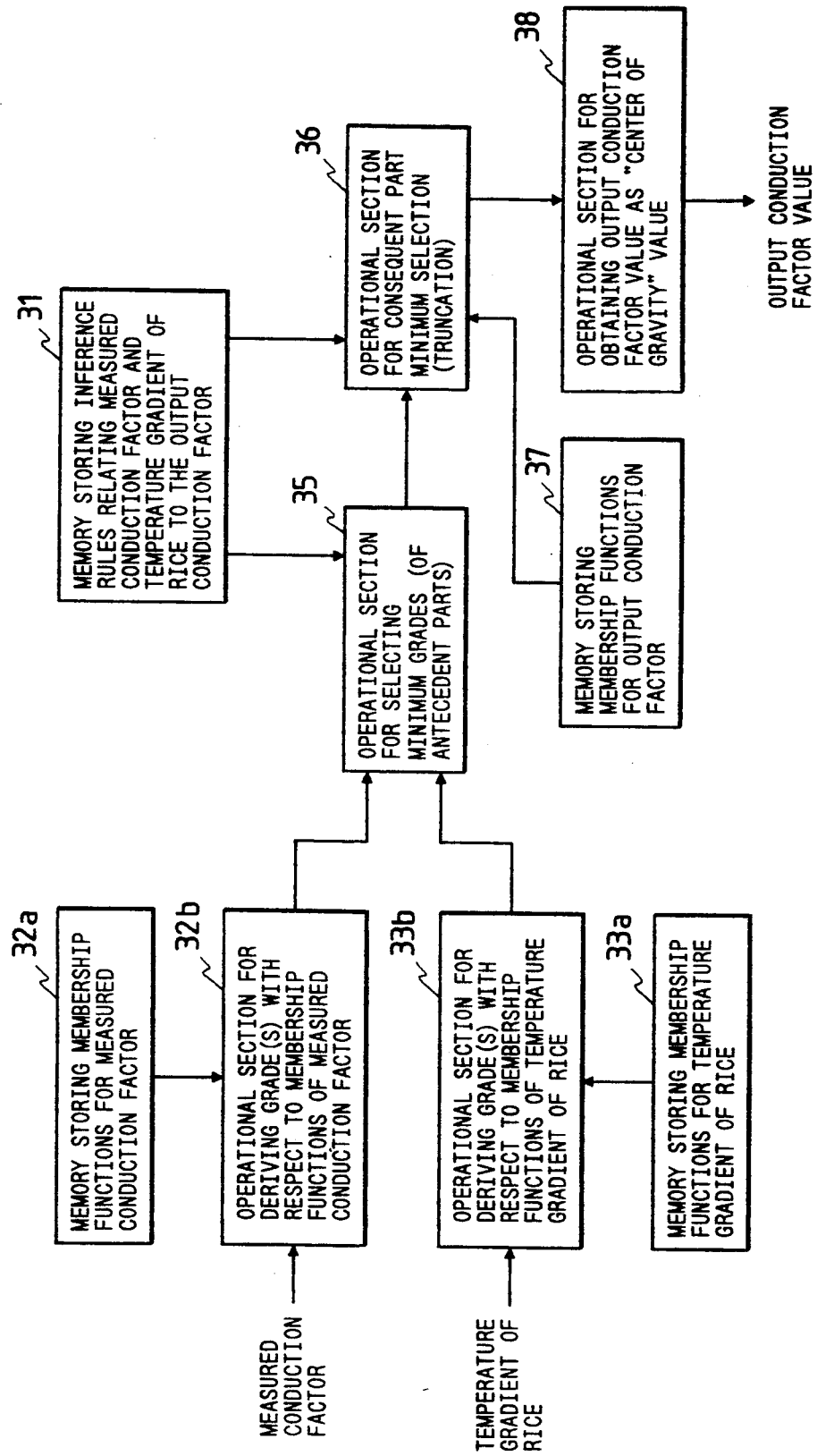
FIG. 21 is a block diagram for assistance in describing the operation of a fuzzy inference section in the third embodiment.

FIG. 21 illustrates the functions executed by the fuzzy inference section 29, shown as respective "operational sections". A memory 33a stored the membership functions for the rice temperature gradient, a memory 32a stores the membership functions for the measured conduction factor, and a memory 37 stores the membership functions for the output conduction factor. An operational section 33b derives respective grades of the rice temperature gradient with respect to the membership functions of that temperature gradient. An operational section 32b derives respective grades of the measured conduction factor with respect to the membership functions of that temperature gradient. A memory 31 stores the fuzzy inference rules described above. An operational section 35 serves to select (for each rule that is applicable) one of the two grades that are obtained by the operational sections 32b and 33b, i.e. executes the selection operation described hereinabove referring to FIG. 2B (illustrated therein as the "minimum grade selection operation"). The operational section 36 acts on the grades selected by the operational section 35 and the membership functions supplied from the memory 37 in accordance with the rules supplied from the memory 31, to execute the aforementioned truncation (MIN) operations, with the resultant truncated membership functions being united by an operational section 38 (i.e. by a MAX operation), and with the "center of gravity" value of the result being obtained and outputted as the desired value of output conduction factor.

Figure 22A:
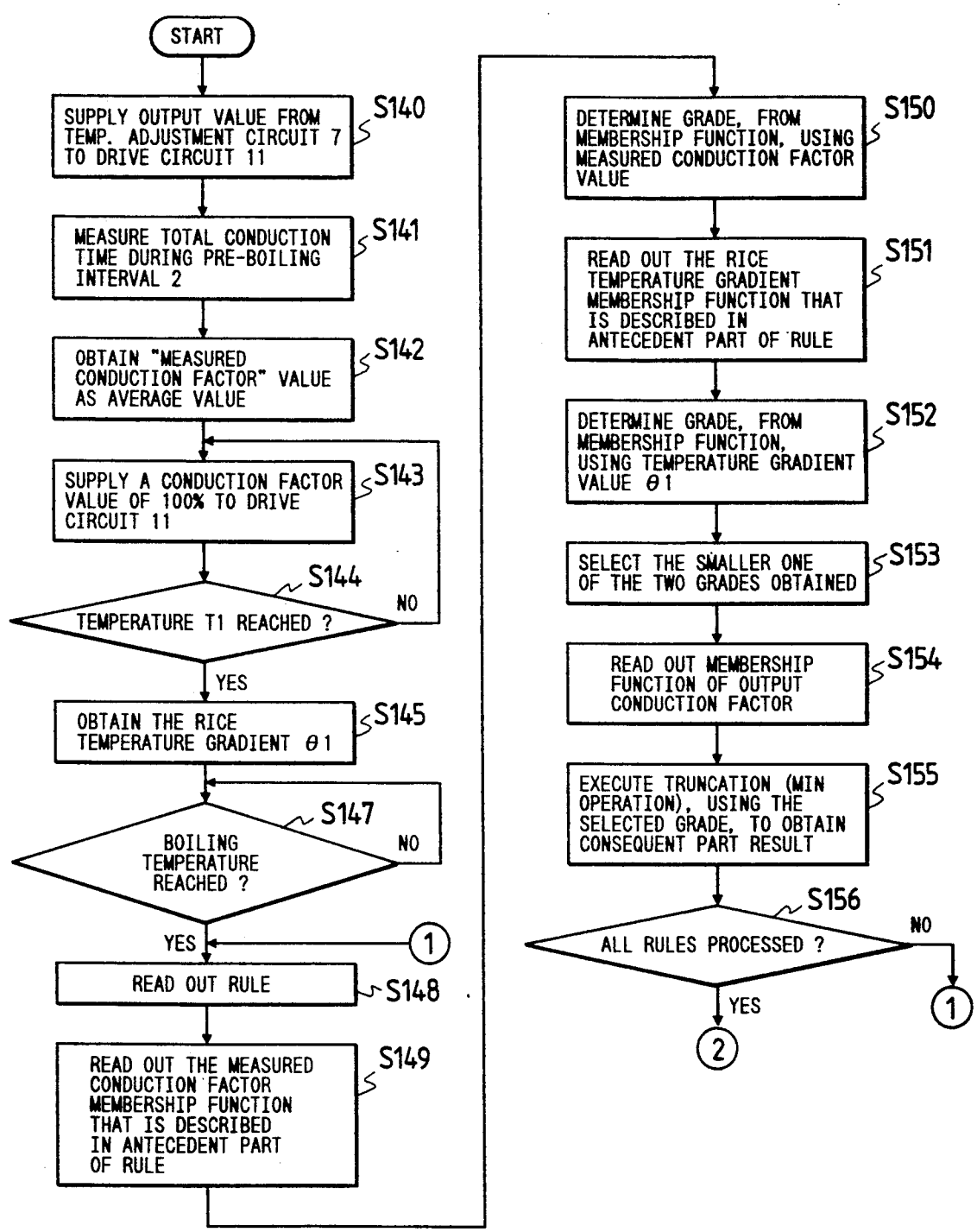
FIGS. 22A, 22B are a flow diagram for assistance in describing the operation of a cooking process controller in the third embodiment.
Figure 22B:
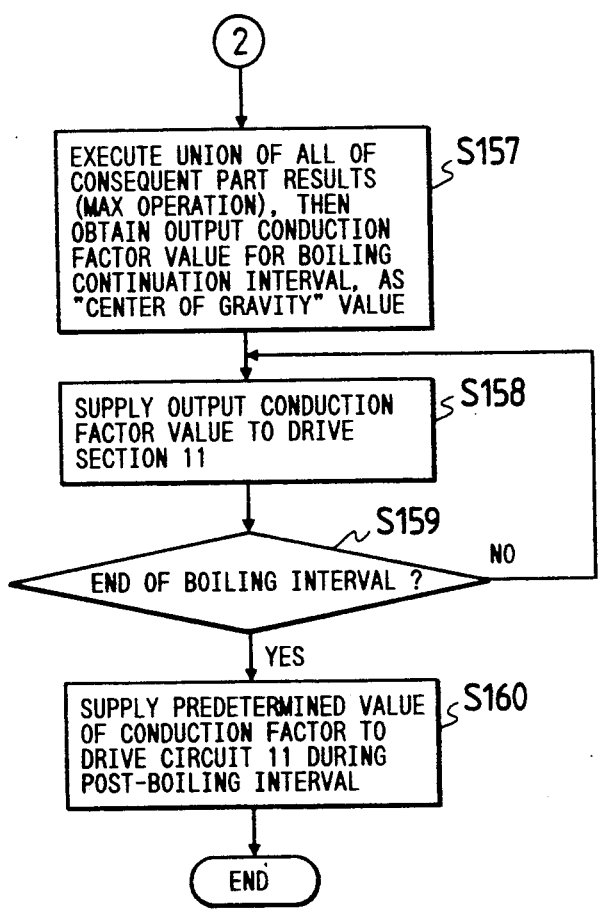

The operation of the cooking process controller 34 of this embodiment is illustrated in the flow diagram of FIGS. 22A, 12B. Steps 140 to 142, for obtaining the measured conduction factor, are as described for steps S100 to S102 in FIG. 9A of the first embodiment.

At the end of the pre-boiling interval, a conduction factor value of 100% is supplied to the drive section 22 (step S143), to begin the temperature increase interval. When the predetermined temperature T1 is determined (step S144), the rice temperature gradient θ1 is obtained, and thereafter when the boiling temperature is reached (step S147), the sequence of steps S148 to S155 is successively executed for each of the rules described above. Processing is then executed for obtaining a value of output conduction factor to be used during the boiling continuation interval, with that output conduction factor value being obtained as a "center of gravity" value in step S157, as described hereinabove. That value is supplied to the drive section 22, and thereafter the operation is similar to that of the first embodiment described above.

Although the third embodiment has been described for the case of a fixed output conduction factor of 100% being used during the temperature increase interval, it should be noted that it would be equally possible to determine the output conduction factor used in the temperature increase interval based upon an average value of conduction factor obtained during the pre-boiling interval, as described for the first embodiment, to further improve the accuracy of control of the cooking process.

Figure 23:
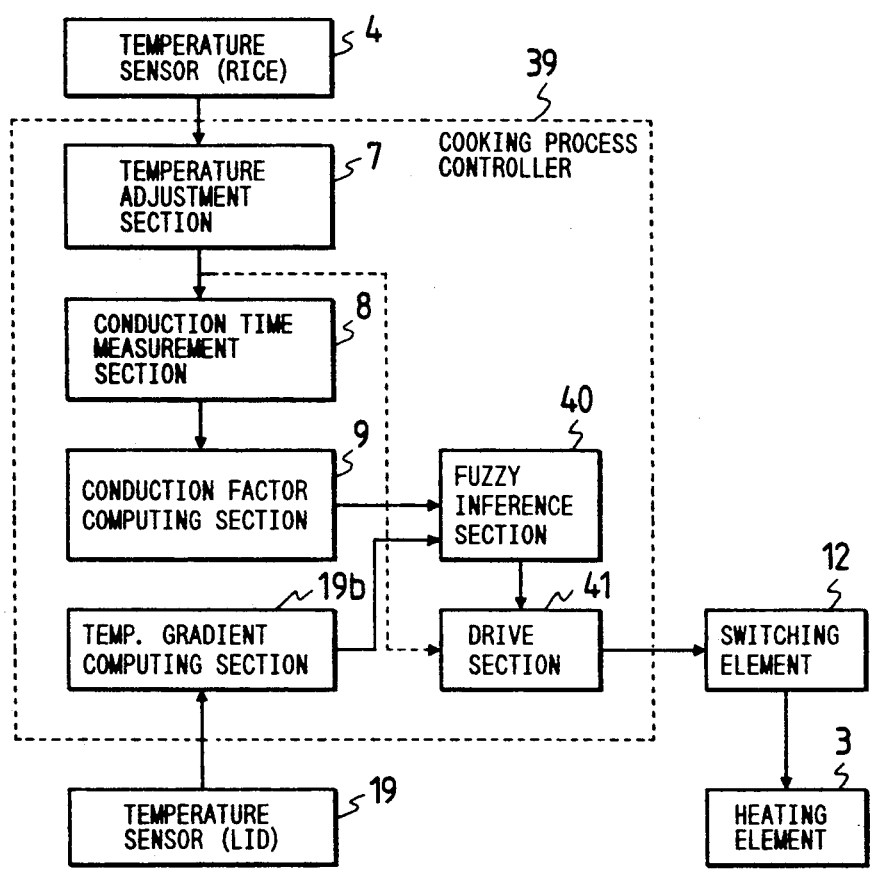
FIG. 23 is a general system block diagram of a fourth embodiment of a rice cooking apparatus according to the present invention, in which heating power is controlled in accordance with a measured average conduction factor and a measured temperature gradient of the lid of the cooking apparatus.
Figure 24:
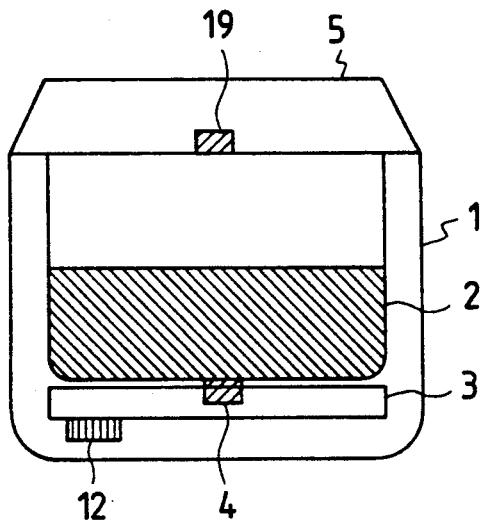
FIG. 24 shows the physical configuration of the rice cooking apparatus of the fourth embodiment.

A fourth embodiment of a rice cooking apparatus according to the present invention will be described, referring first to FIGS. 23 to 25. The physical configuration of this embodiment is shown in the simple cross-sectional view of FIG. 24. This is similar to the configuration of the first embodiment shown in FIG. 5, but differs in that a temperature sensor 19 is provided for obtaining the temperature of the lid 5, in addition to the temperature sensor 4 which is mounted at the base of the vessel 2, for obtaining the temperature of the rice which is being cooked. In addition as shown in FIG. 23, the cooking process controller 39 of this embodiment differs from the first embodiment in further including a temperature gradient computing section 19b, for obtaining a value of lid temperature gradient. As for the first embodiment, an average value of conduction factor for the switching element 12 during a predetermined time interval (the pre-boiling interval 2 in FIG. 25) is obtained, and is subsequently supplied as the measured conduction factor to the fuzzy inference section 40. During the pre-boiling interval, output values produced from the temperature adjustment section 7 are supplied to the drive section 41 for controlling the level of heating power produced by the heater element 3, as indicated by the broken-line connection in FIG. 23.

Figure 25:
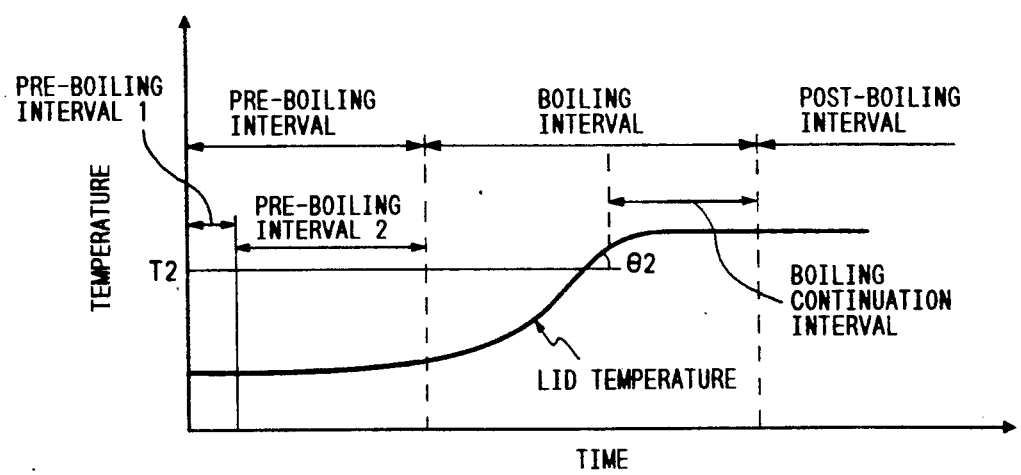
FIG. 25 shows the variation with time of the lid temperature during the cooking process.

With this embodiment, the temperature gradient of the lid 5 during the temperature increase interval is used in conjunction with the average value of conduction factor during the pre-boiling interval (i.e. the measured conduction factor value) to provide an indication of the amount of material that is to be cooked, with that indication being applied through fuzzy inference operations to control the level of heating power that is generated by the heater element 3 during the boiling continuation interval shown in FIG. 25.

The operation of this embodiment is as follows. During the pre-boiling interval, the output values produced from the temperature sensor 4 are supplied to the temperature adjustment section 7 and compared with a predetermined temperature value, with an error value obtained from that comparison being supplied to the drive section 41, to thereby holding the temperature of the rice at the predetermined temperature value during the pre-boiling interval. During a predetermined portion of that interval (pre-boiling interval 2) in which the rice temperature has stabilized, the conduction time measurement section 8 obtains the average value of conduction factor of the switching element 12 during pre-boiling interval 2, to be subsequently supplied to the drive section 41, as the measured conduction factor value.

At the end of the pre-boiling interval, a conduction factor value of 100% is supplied to the drive section 22, causing the temperature of the rice to be rapidly increased during the temperature increase interval. When the lid temperature (as indicated by output values produced from the temperature sensor 19) reaches a predetermined value of $\theta 2$, the temperature gradient computing section 19b computes the value of the lid temperature gradient. Subsequently, when the rice reaches the boiling temperature, a value of output conduction factor is derived by the fuzzy inference section 40, based on the values of lid temperature gradient and measured conduction factor that were previously obtained, and is supplied to the drive section 41 for determining the level of output power produced from the heater element 3 during the boiling continuation interval.

Figures 26, 27:
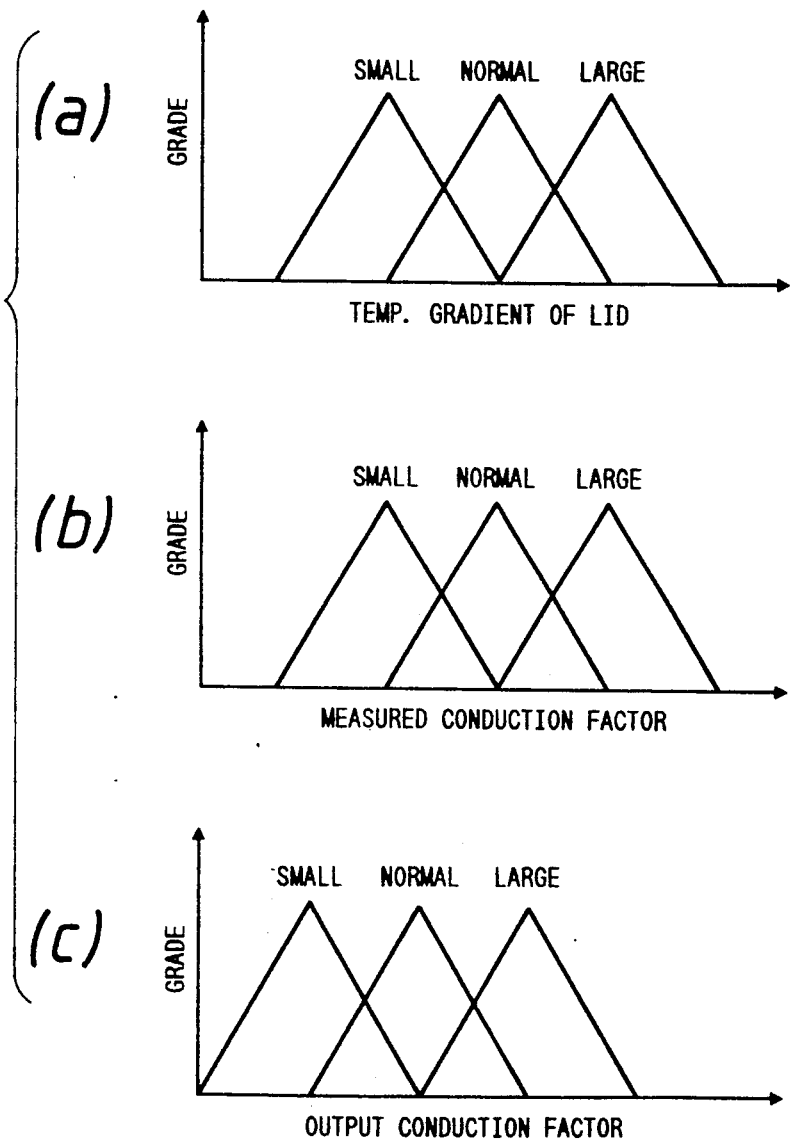
FIG. 26 is a table showing the fuzzy inference rules for the fourth embodiment.
FIG. 27 shows the fuzzy set membership functions corresponding to the rules of FIG. 26.

The operation of the cooking process controller 39 of this embodiment is as follows. FIG. 26 shows the fuzzy inference rules, in the form of a table. As for the third embodiment described above, there is a total of 7 rules. In each rule, the antecedent part has "lid temperature gradient" and "output conduction factor" as variables, while the consequent part has "output conduction factor" as the variable.

FIG. 27 shows the corresponding fuzzy inference membership functions, with diagrams (a), (b) and (c) showing the lid temperature gradient membership functions, the measured conduction factor membership functions and the output conduction factor membership functions, respectively.

FIG. 28 illustrates the functions executed by the fuzzy inference section 40, shown as respective "operational sections". A memory 46 stored the membership functions for the lid temperature gradient, a memory 44 stores the membership functions for the measured conduction factor, and a memory 49 stores the membership functions for the output conduction factor. An operational section 45 derives respective grades of the lid temperature gradient with respect to the membership functions of that temperature gradient. An operational section 42 derives respective grades of the measured conduction factor with respect to the membership functions of that temperature gradient. A memory 43 stores the fuzzy inference rules described above. An operational section 47 serves to select (for each rule that is applicable) one of the two grades that are obtained by the operational sections 32b and 33b. The operational section 48 acts on the grades selected by the operational section 47 and the membership functions supplied from the memory 49 in accordance with the rules supplied from the memory 43, to execute the aforementioned truncation (MIN) operations, with the resultant truncated membership functions being united by an operational section 48 and with the "center of gravity" value of the result being obtained and outputted as the desired value of output conduction factor.

Figure 29A:
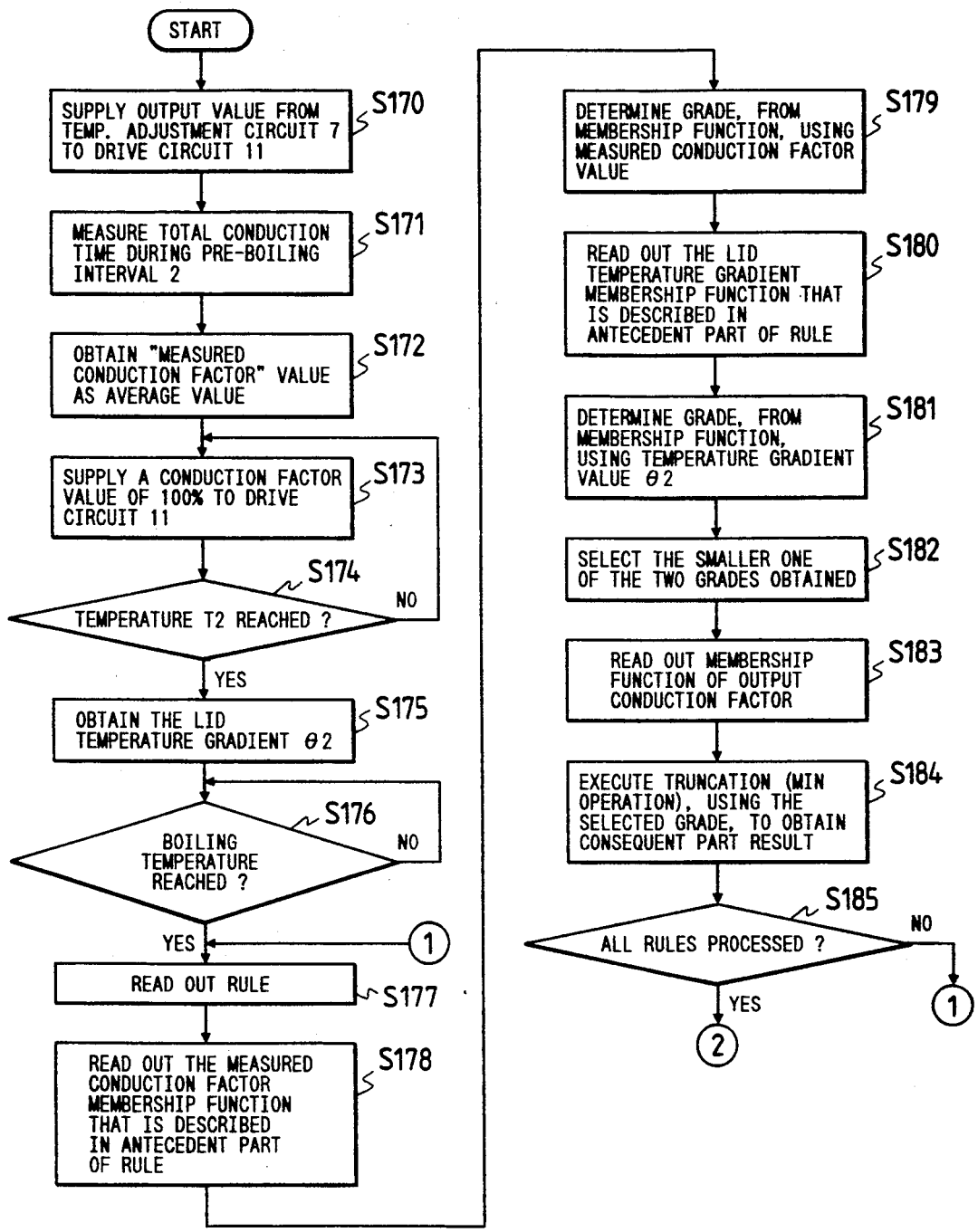

The operation of the cooking process controller 39 of this embodiment is illustrated in the flow diagram of FIGS. 29A, 29B. In steps S170 to S172 the measured conduction factor is obtained during the pre-boiling interval 2. During the pre-boiling interval, the temperature of the rice can be stabilized, as described for the first embodiment, by applying feedback control based on the output values produced from the temperature sensor 4, however for simplicity of description it is assumed here that a fixedly predetermined output conduction factor value is used during the pre-boiling interval. At the end of the pre-boiling interval, a conduction factor value of 100% is supplied to the drive section 41 (step S173), to begin the temperature increase interval. When the predetermined temperature T2 of the lid 5 is determined (step S174), the lid temperature gradient 82 is obtained, and thereafter when the boiling temperature is reached (step S176), the sequence of steps S177 to S184 is successively executed for each of the rules described above. The respective consequent part results that have thus been obtained are then combined (step S186) for obtaining a value of output conduction factor to be used during the boiling continuation interval, with that output conduction factor value being obtained as a "center of gravity" value which is supplied to the drive section 41. Thereafter the operation is similar to that of the embodiments described above. However as described for the second embodiment, since temperature increase of the lid 5 is delayed relative to that of the rice which is being cooked, the lid temperature gradient (and hence the output conduction factor derived by the fuzzy inference section 40) may not be obtained until after the boiling continuation interval has commenced.

Although the fourth embodiment has been described for the case of a fixed output conduction factor of 100% being used during the temperature increase interval, it should be noted that it would be equally possible to determine the output conduction factor used in the temperature increase interval based upon an average value of conduction factor obtained during the pre-boiling interval, as described for the first embodiment, to further improve the accuracy of control of the cooking process.

Figure 30:
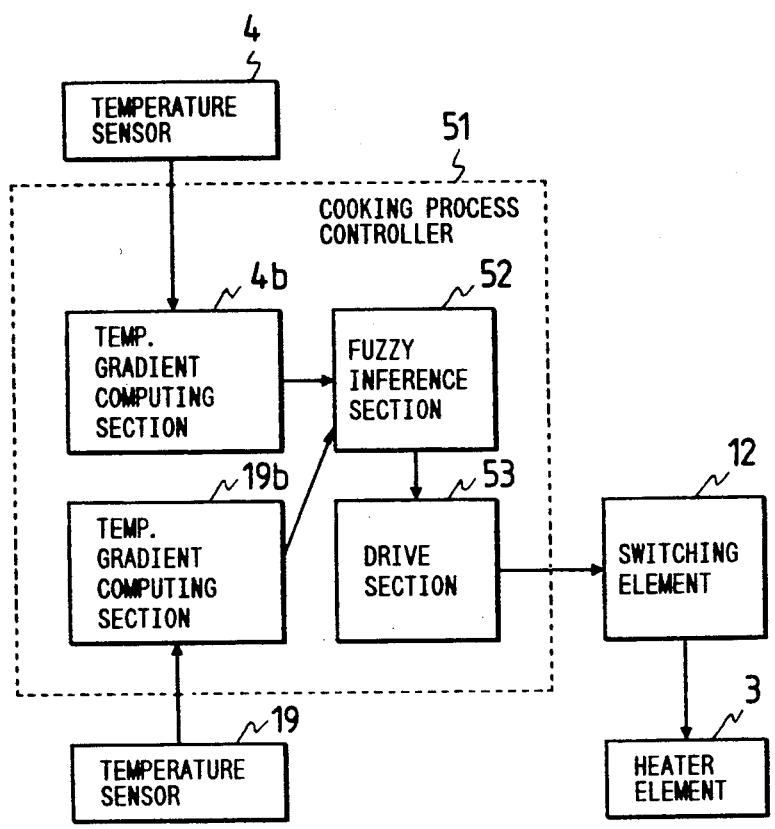
FIG. 30 is a general system block diagram of a fifth embodiment of a rice cooking apparatus according to the present invention, in which heating power is controlled in accordance with measured temperature gradients of the rice and of the lid of the cooking apparatus.
Figure 31:
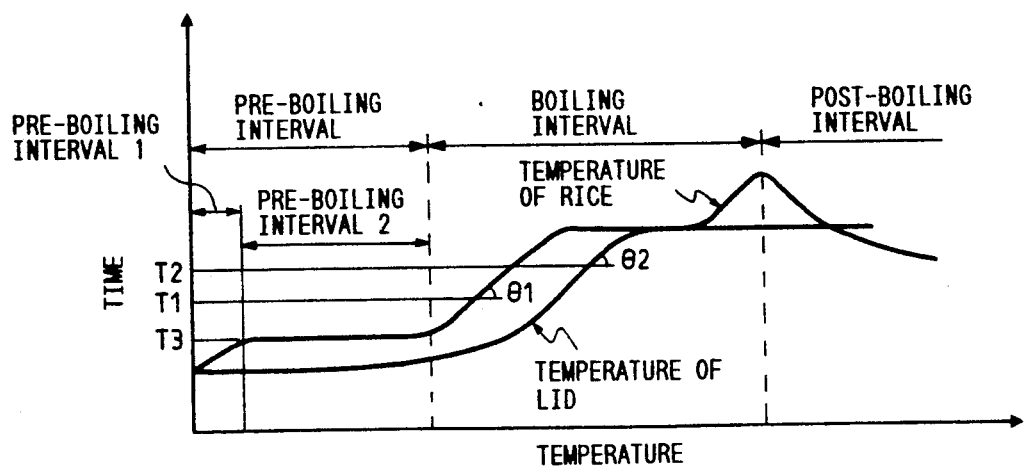
FIG. 31 shows the variation with nine of the lid temperature and rice temperature during the cooking process.

A fifth embodiment of the present invention, which is also a rice cooking apparatus, will be described referring first to FIGS. 30 and 31, which respectively show the system configuration and the manner in which the rice and lid temperatures change with time. The physical configuration of this rice cooking apparatus is similar to that of the 4th embodiment described above, shown in FIG. 24, i.e. having both a temperature sensor 4 for obtaining the temperature of the rice which is being cooked, and also a temperature sensor 19 for obtaining the temperature of the lid 5. With this embodiment, a value of temperature gradient of the lid 5 and a value of temperature gradient of the rice, each obtained during the temperature increase interval, are used in combination to provide an indication of the amount of material that is to be cooked, with that indication being applied through fuzzy inference operations to control the level of heating power that is generated by the heater element 3 during the boiling continuation interval shown in FIG. 25, after the lid temperature gradient has been obtained and a value of output conduction factor derived. As shown in FIG. 30, the cooking process controller 51 of this embodiment includes a temperature gradient computing section 4b which operates on temperature values supplied from the temperature sensor 4 to obtain the temperature gradient of the rice being cooked, and a temperature gradient computing section 19b for similarly obtaining the temperature gradient of the lid 5. These temperature gradient values are supplied to a fuzzy inference section 52, for use in deriving a value of output conduction factor which is then supplied to a drive section 53, which acts through the switching element 12 to control the level of heating power produced by the heater element 3 during the boiling continuation interval.

The operation of the cooking process controller 51 of this embodiment is as follows. FIG. 32 shows the fuzzy inference rules, in the form of a table. There is a total of 7 rules. In each rule, the antecedent part has "temperature gradient of rice" and "temperature gradient of lid" as variables, while the consequent part has "output conduction factor" as the variable.

FIG. 33 shows the corresponding fuzzy inference membership functions, with diagrams (a), (b) and (c) showing the rice temperature gradient membership functions, the lid temperature gradient membership functions, and the output conduction factor membership functions, respectively.

Figure 34:
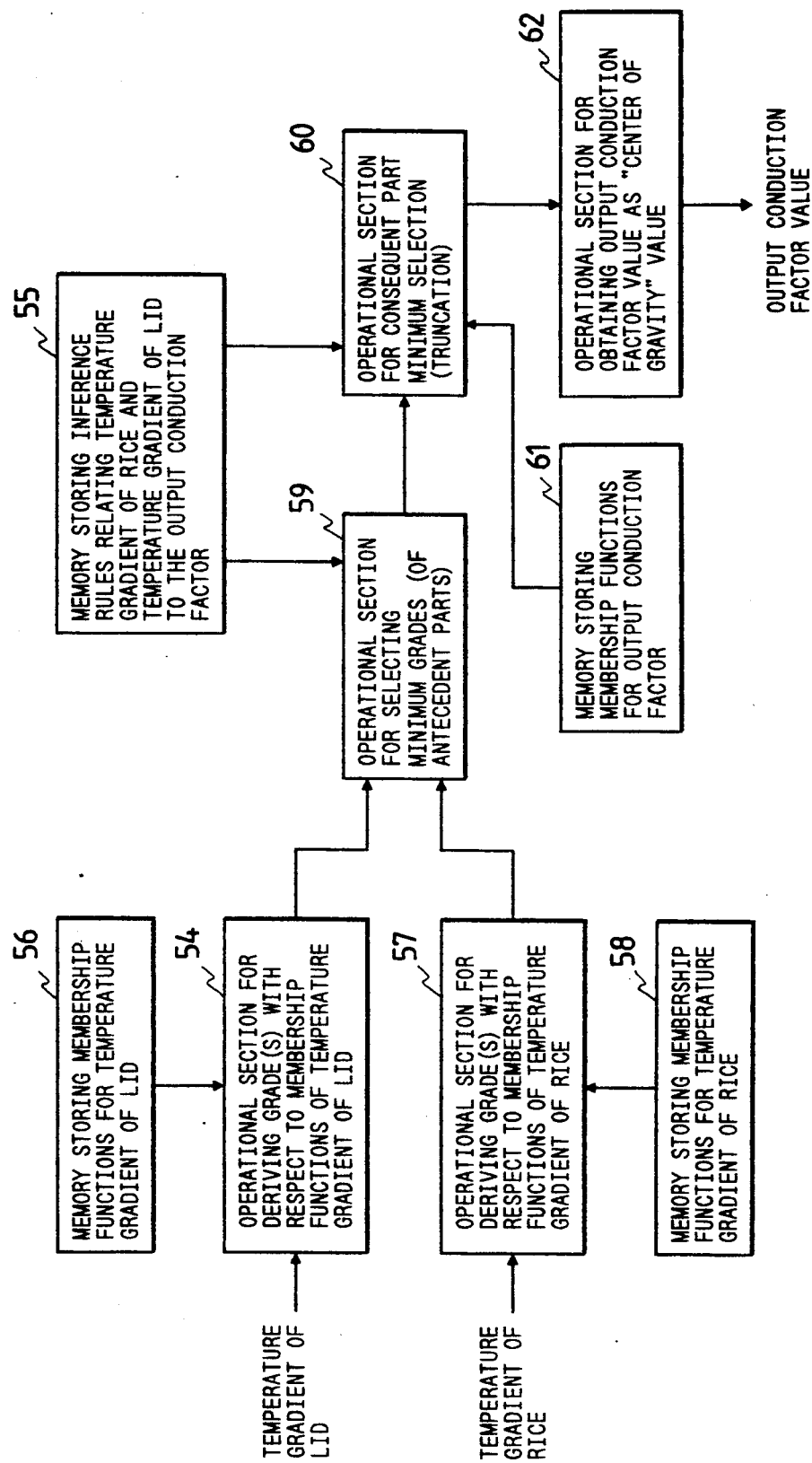
FIG. 34 is a block diagram for assistance in describing the operation of a fuzzy inference section in the fifth embodiment.

FIG. 34 illustrates the functions executed by the fuzzy inference section 52 of this embodiment, shown as respective "operational sections". A memory 56 stored the membership functions for the lid temperature gradient, a memory 57 stores the membership functions for the rice temperature gradient, and a memory 61 stores the membership functions for the output conduction factor. An operational section 54 derives respective grades of the lid temperature gradient with respect to the membership functions of that temperature gradient. An operational section 57 derives respective grades of the measured conduction factor with respect to the membership functions of that temperature gradient. A memory 55 stores the fuzzy inference rules described above. An operational section 59 serves to select (for each rule that is applicable) one of the two grades that are obtained by the operational sections 54 and 57. An operational section 60 acts on the grades selected by the operational section 47 and the membership functions supplied from the memory 61 in accordance with the rules supplied from the memory 55, to execute the aforementioned truncation (MIN) operations, with the resultant truncated membership functions being united by an operational section 62 in which the "center of gravity" value of the result is then obtained, and outputted as the desired value of output conduction factor.

Figure 35A:
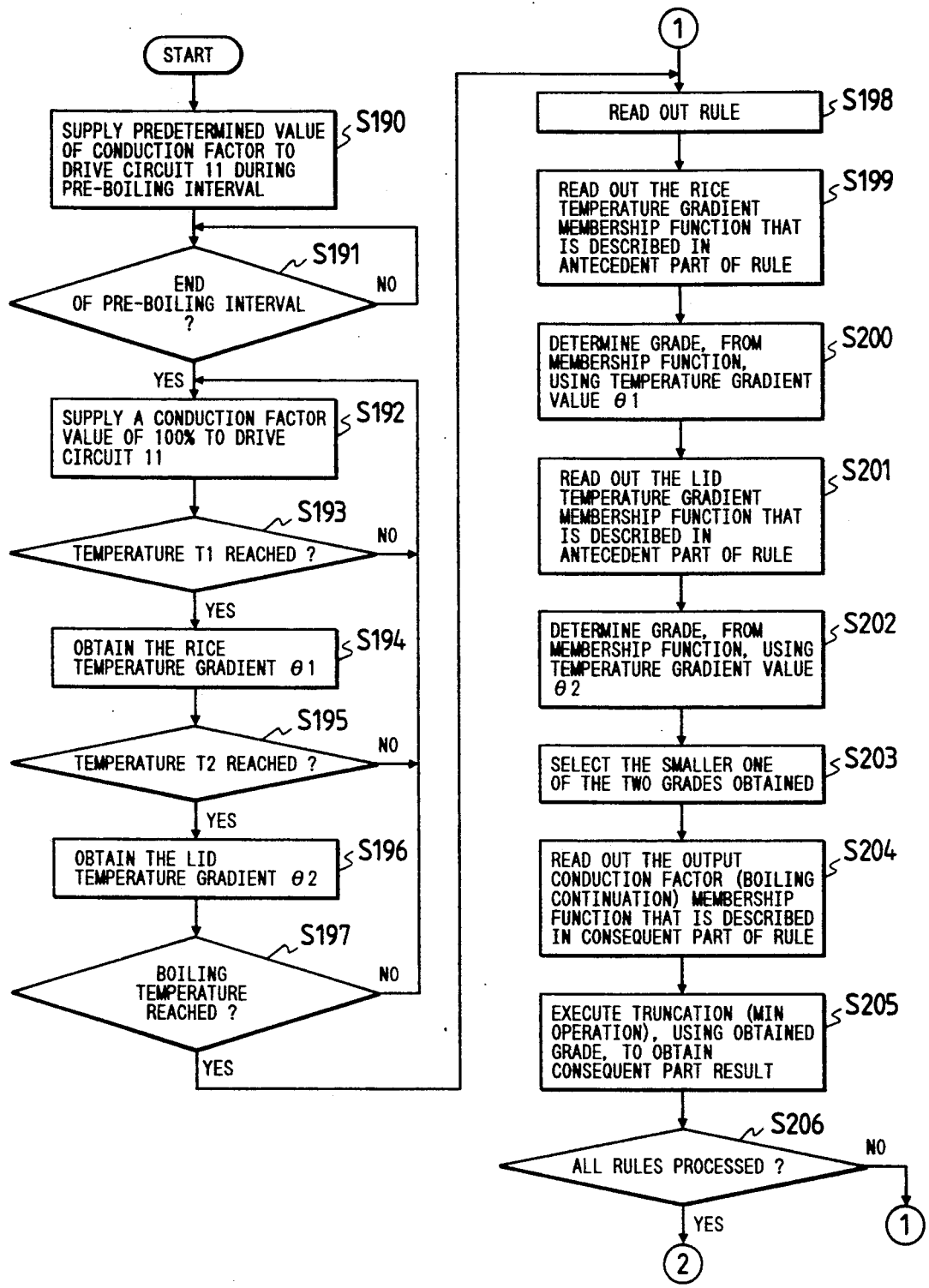
FIGS. 35A, 35B are a flow diagram for assistance in describing the operation of a cooking process controller in the fifth embodiment.
Figure 35B:
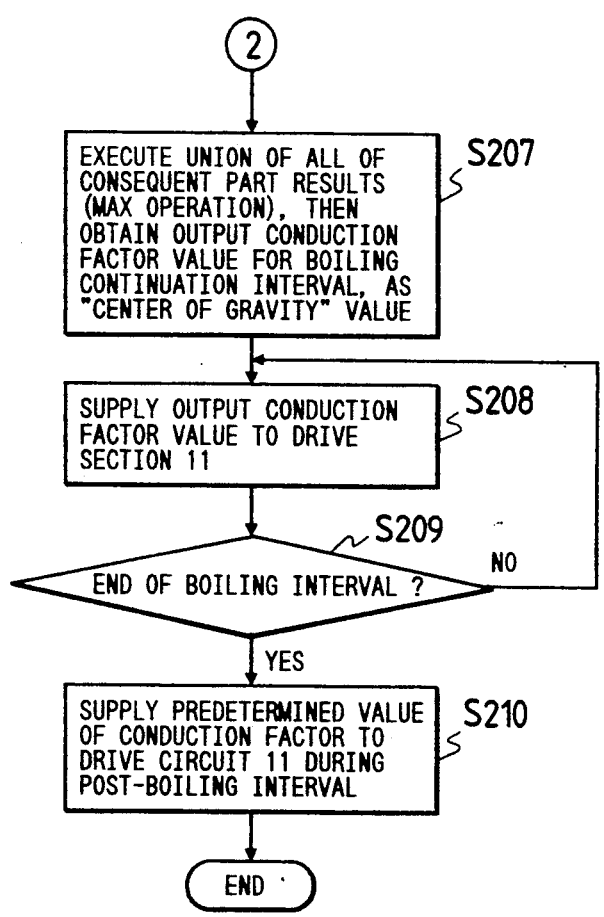

The operation of the cooking process controller 51 of this embodiment is illustrated in the flow diagram of FIGS. 35A, 35B. In step S190 the pre-boiling interval occurs, with the a predetermined level of heating power being used, or with the rice temperature being stabilized by feedback control as described for the first embodiment (by means which are not shown in FIG. 30). that a fixedly predetermined output conduction factor value is used during the pre-boiling interval. At the end of the pre-boiling interval, a conduction factor value of 100% is supplied to the drive section 53 (step S192), to begin the temperature increase interval. When the predetermined temperature T1 of the rice is determined (step S193), the rice temperature gradient 91 is obtained, and subsequently when the predetermined temperature T2 of the lid is detected, the lid temperature gradient $\theta 2$ is similarly obtained. Thereafter when the boiling temperature is reached (step S197), operation moves to step S198, and the sequence of steps S198 to S205 is successively executed for each of the rules described above. The respective consequent part results that have thus been obtained are then combined (step S207) for obtaining a value of output conduction factor to be used during the boiling continuation interval, with that output conduction factor value being obtained as a "center of gravity" value which is supplied to the drive section 53. Thereafter the operation is similar to that of the embodiments described above. However with this embodiment, as described for the second and fourth embodiments above, since the temperature increase of the lid 5 is delayed relative to that of the rice which is being cooked, the lid temperature gradient (and hence the output conduction factor derived by the fuzzy inference section 52 to be then used during the boiling continuation interval) may not be obtained until after the boiling continuation interval has commenced.

With the fifth embodiment described above, since both the temperature gradient of the lid and the temperature gradient of the rice being cooked are used in combination to determine the level of heating power generated during the boiling continuation interval, optimized control of the cooking process can be achieved.

Although the fifth embodiment has been described for the case of a fixed value of output conduction factor of 100% being used during the temperature increase interval, it would be equally possible to determine that output conduction factor value based upon an average value of conduction factor obtained during the pre-boiling interval, e.g. by using fuzzy inference operation as described for the first embodiment, to further improve the accuracy of control of the cooking process.

A sixth embodiment of the present invention, which is also a rice cooking apparatus, will be described referring first to FIGS. 36 and 37, which respectively show the system configuration and the manner in which the rice and lid temperatures change with time. The physical configuration of this rice cooking apparatus is similar to that of the fourth and fifth embodiments described above, i.e. having both a temperature sensor 4 for obtaining the temperature of the rice which is being cooked, and also a temperature sensor 19 for obtaining the temperature of the lid 5. This embodiment differs from the fifth embodiment in that the average value of conduction factor of the switching element 12 during the pre-boiling interval is obtained, and is used in combination with a value of temperature gradient of the lid 5 and a value of temperature gradient of the rice (each obtained during the temperature increase interval as for the fifth embodiment) to provide an indication of the amount of material that is to be cooked, with that indication being applied through fuzzy inference operations as described for the fifth embodiment, to control the level of heating power that is generated by the heater element 3 during the boiling continuation interval.

Figure 36:
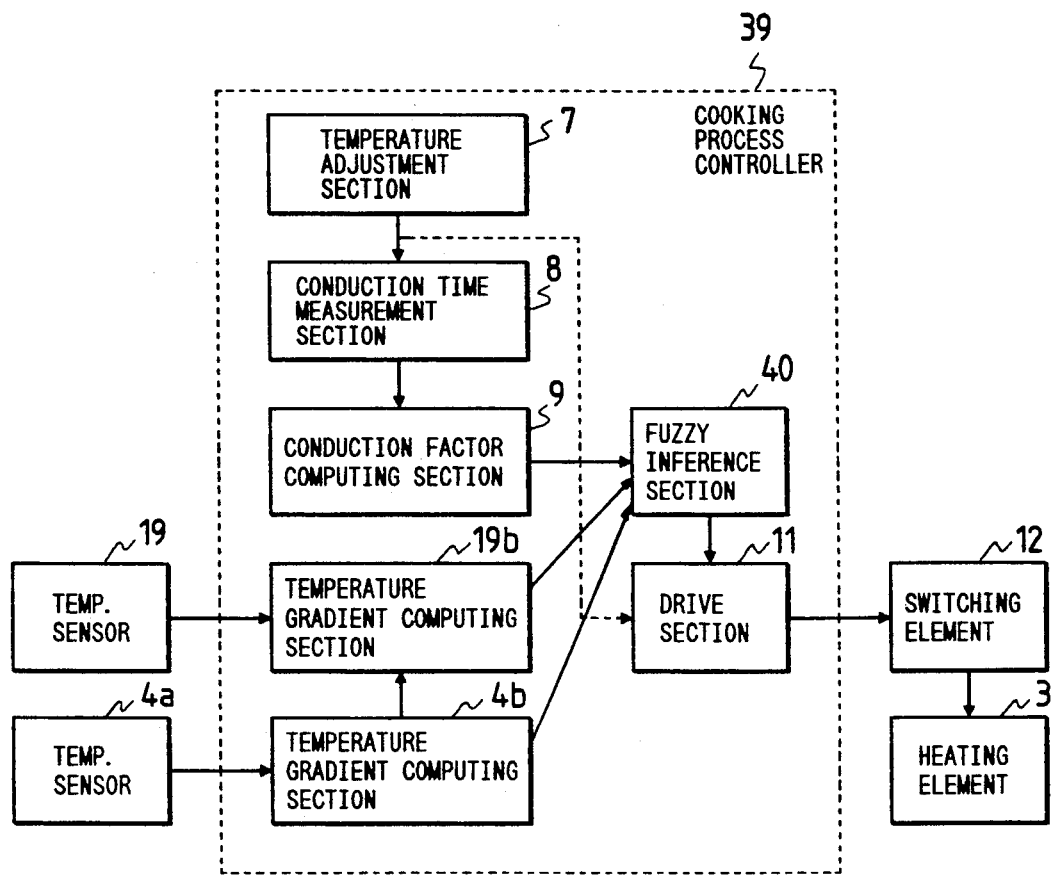
FIG. 36 is a general system block diagram of a sixth embodiment of a rice cooking apparatus according to the present invention, in which heating power is controlled in accordance with a measured average value of conduction factor and temperature gradients of the rice and of the lid of the cooking apparatus.
Figure 37:
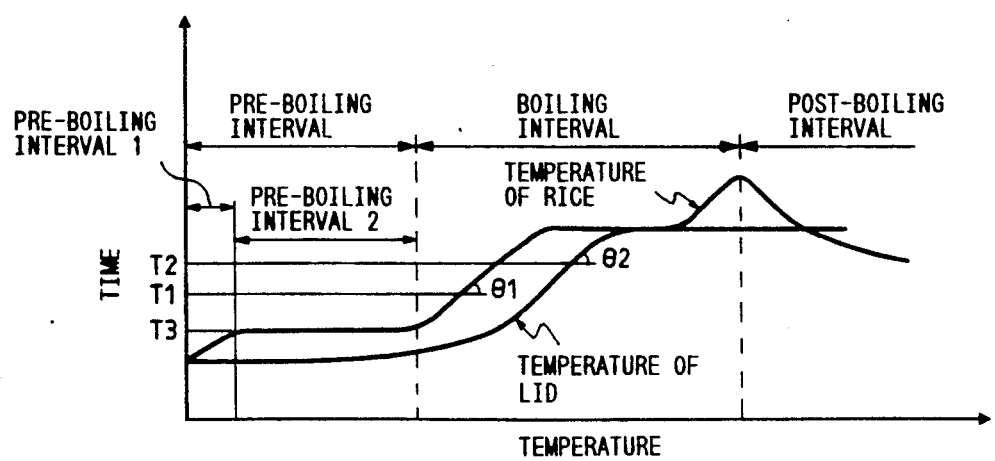
FIG. 37 shows the variation with time of the lid temperature and rice temperature during the cooking process.

As shown in FIG. 36, the cooking process controller 39 of this embodiment includes a temperature gradient computing section 4b for obtaining the rice temperature gradient based on measured values produced from the temperature sensor 4, to obtain the temperature gradient of the rice being cooked, and a temperature gradient computing section 19b for similarly obtaining the temperature gradient of the lid 5, using temperature values produced from the sensor 19. These temperature gradient values are supplied to a fuzzy inference section 40, for use in deriving a value of output conduction factor which is then supplied to a drive section 11, which acts through the switching element 12 to control the level of heating power produced by the heater element 3 until the end of the boiling continuation interval.

The operation of the cooking process controller 39 of this embodiment is as follows. FIGS. 32A, 32B and 32C shows the fuzzy inference rules, set out in the form of three tables respectively corresponding to the "large", "normal" and "small" fuzzy set membership functions, since the antecedent part of each rule has three variables, i.e. lid temperature gradient, rice temperature gradient, and measured conduction factor. The output variable of the consequent part of each rule is output conduction factor. One rule is of the form, for example (obtained from the table of FIG. 38A):

"If the lid temperature gradient is "large", the temperature gradient of the rice is is "large", and the measured conduction factor is "small", then the output conduction factor is "small"".

Figure 39:
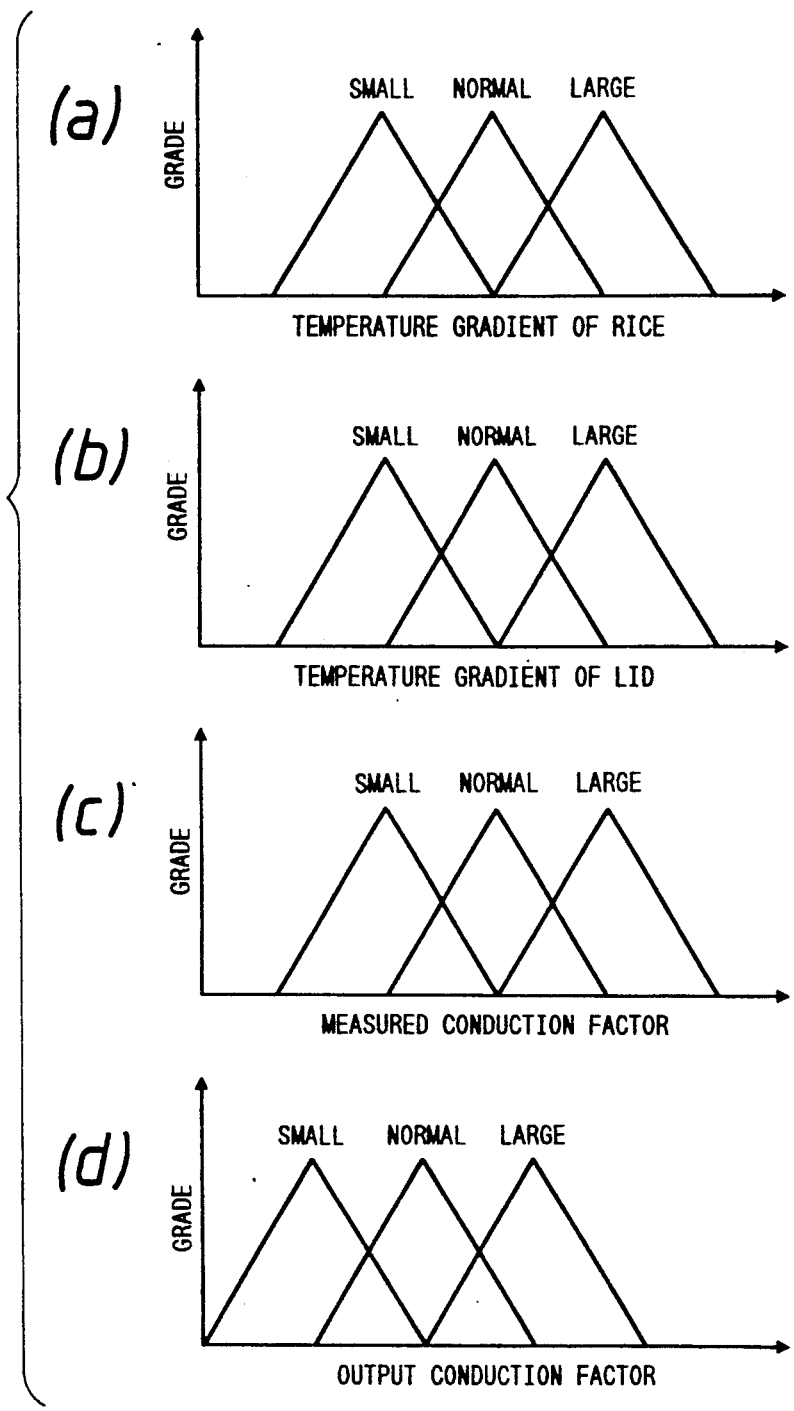
FIG. 39 shows the fuzzy set membership functions corresponding to the rules of FIGS. 38A, 38B, 38C.

The corresponding fuzzy set membership functions are shown in diagrams (a), (b), (c) and (d) of FIG. 39.

Figure 40:
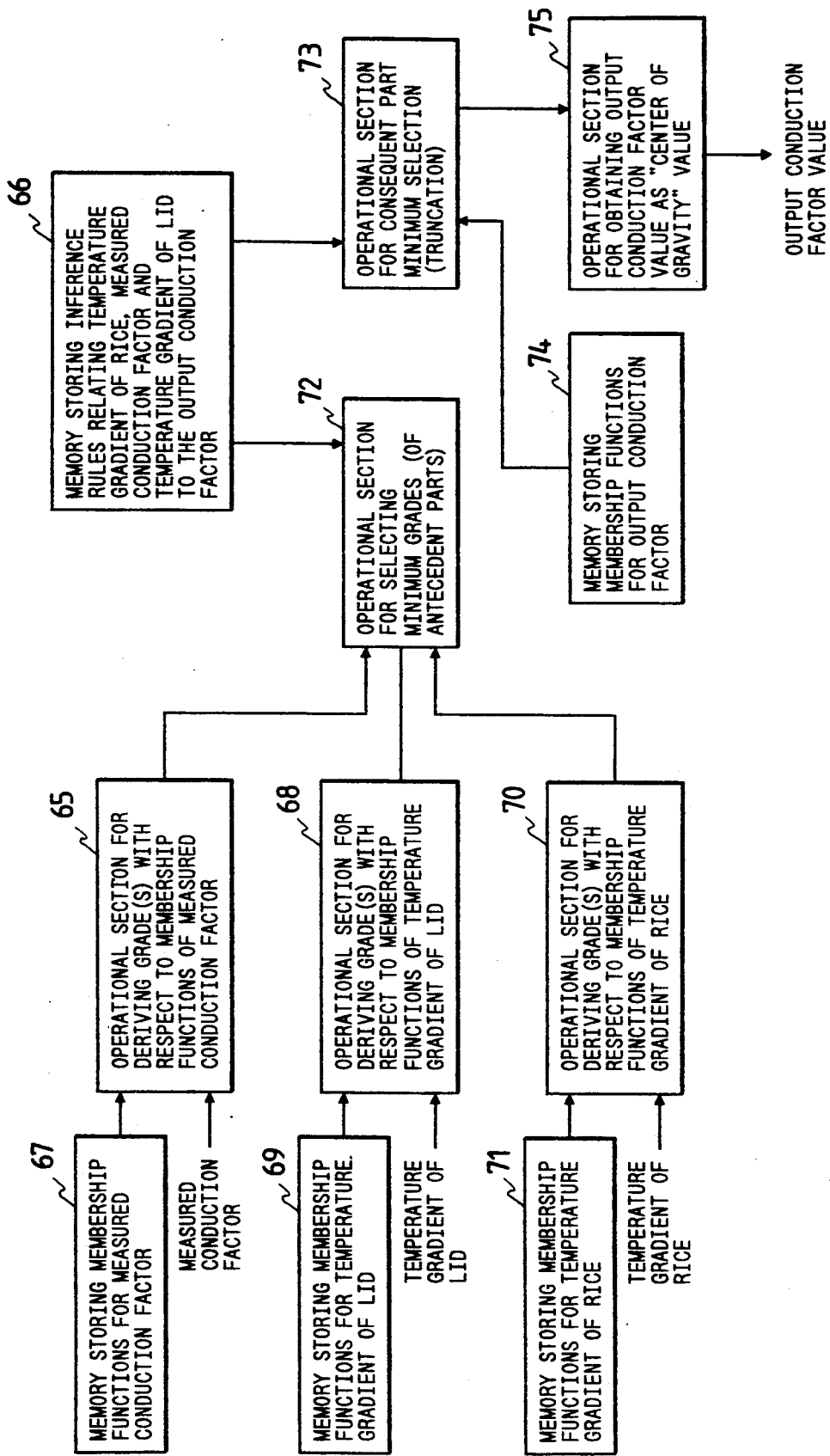
FIG. 40 is a block diagram for assistance in describing the operation of a fuzzy inference section in the sixth embodiment.

FIG. 40 illustrates the functions executed by the fuzzy inference section 40 of this embodiment, shown as respective "operational sections". A memory 69 stored the membership functions for the lid temperature gradient, a memory 71 stores the membership functions for the rice temperature gradient, a memory 67 stores the membership functions for the measured conduction factor, and a memory 74 stores the membership functions for the output conduction factor. An operational section 68 derives respective grades of the lid temperature gradient with respect to the membership functions of that temperature gradient. An operational section 65 derives respective grades of the measured conduction factor with respect to the membership functions of that temperature gradient. A memory 66 stores the fuzzy inference rules described above. An operational section 72 serves to select (for each rule that is applicable) the smallest one of the three grades that are obtained by the operational sections 65, 68 and 70. An operational section 73 acts on the grades selected by the operational section 72 and the membership functions supplied from the memory 74 in accordance with the rules supplied from the memory 66, to execute the aforementioned truncation (MIN) operations, with the resultant truncated membership functions being united by an operational section 75 in which the "center of gravity" value of the result is then obtained, and outputted as the desired value of output conduction factor.

Figure 41A:
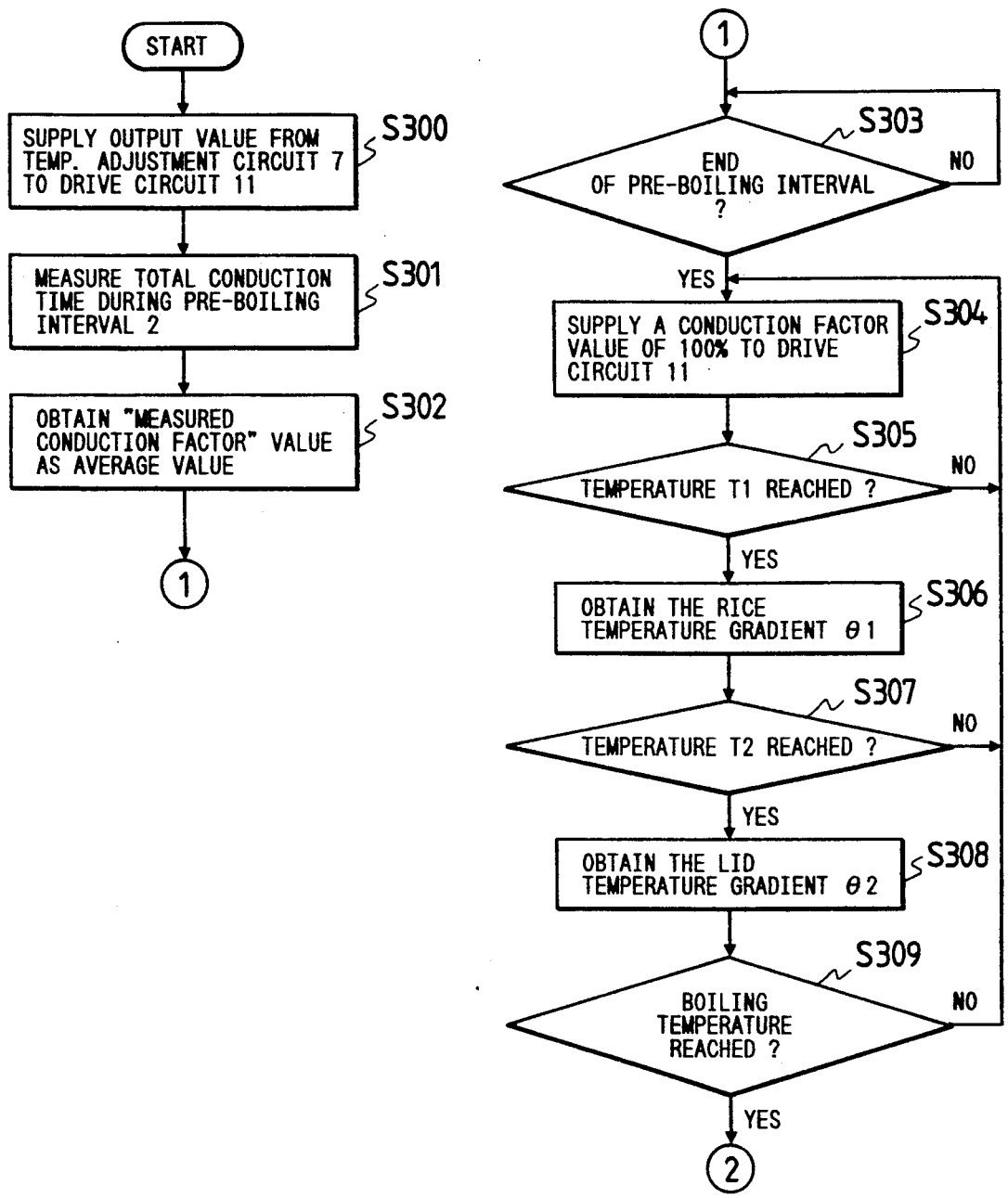
FIGS. 41A, 41B are a flow diagram for assistance in describing the operation of a cooking process controller in the sixth embodiment.
Figure 41B:
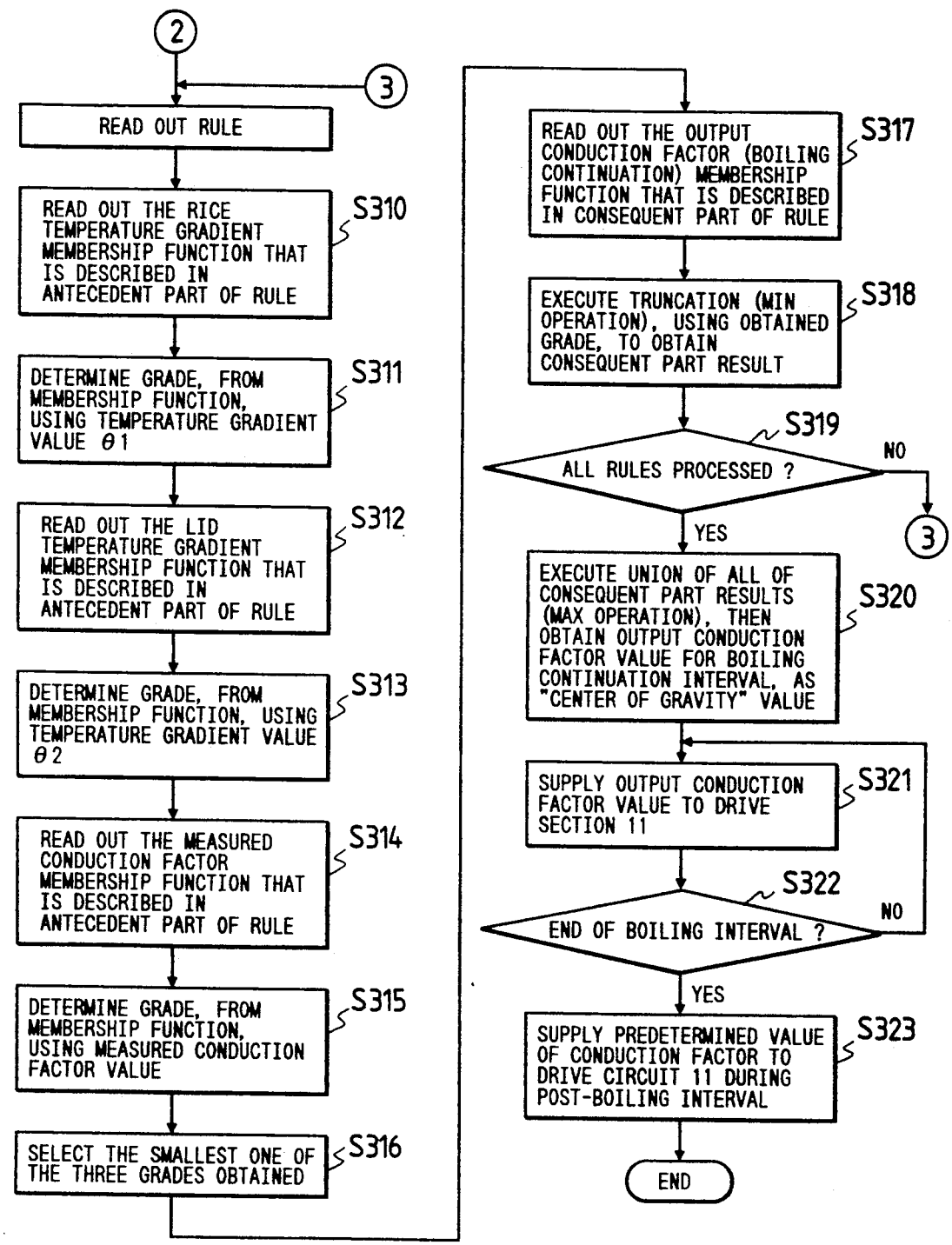

The operation of the cooking process controller 39 of this embodiment is illustrated in the flow diagram of FIGS. 41A, 41B. In steps S300 to S302, the temperature of the rice is held at a constant value during the fixed-duration pre-boiling interval 2 shown in FIG. 37, and the average conduction factor of the heater 3 during that interval is obtained as the "measured conduction factor" as described hereinabove for the first embodiment. In step S303 the end of the pre-boiling interval is detected, and thereafter a conduction factor value of 100% is supplied to the drive section 11 (step S304), during the temperature increase interval. When the predetermined temperature T1 of the rice is detected (step S305), the rice temperature gradient 91 is obtained, and subsequently the lid temperature gradient $\theta 2$ is obtained (step S308). Thereafter when the boiling temperature is detected (step S309), the sequence of steps S324, S310 to S318 is successively executed for each of the rules described above, with three grade values being obtained if a rule is applicable, and one of these grades being selected in step S136. The respective consequent part results that have thus been obtained are then combined (step S320) for obtaining a value of output conduction factor to be used during the boiling continuation interval, which is then supplied to the drive section 53. Thereafter the operation is similar to that of the embodiments described above.

With the sixth embodiment described above, since the average conduction factor during the pre-boiling interval is used in conjunction with both the temperature gradient of the lid and the temperature gradient of the rice being cooked, to determine the level of heating power generated during the boiling continuation interval by fuzzy inference control, a high accuracy of control of the cooking process can be achieved.

Although the sixth embodiment has been described for the case of a fixed value of output conduction factor of 100% being used during the temperature increase interval, it would be equally possible to determine that output conduction factor value based upon the average value of conduction factor that is obtained (in step S302) during the pre-boiling interval, as described for the first embodiment.

Figure 42:
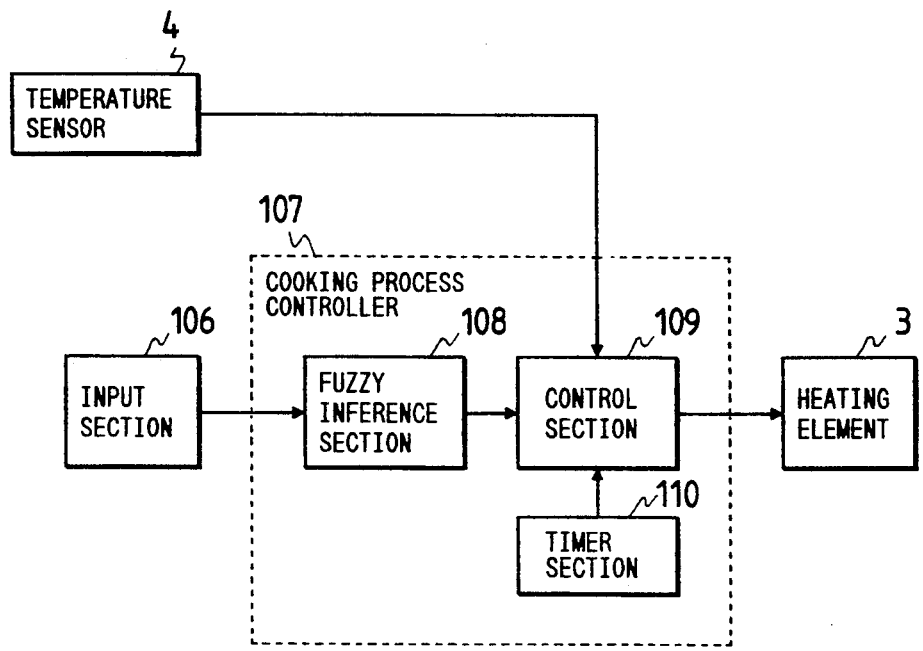
FIG. 42 is a general system block diagram of a seventh embodiment of a rice cooking apparatus according to the present invention, in which rice hardness can be selected, and values for a plurality of cooking control parameters are respectively obtained using a single set of "rice hardness" fuzzy set membership functions.
Figure 43:
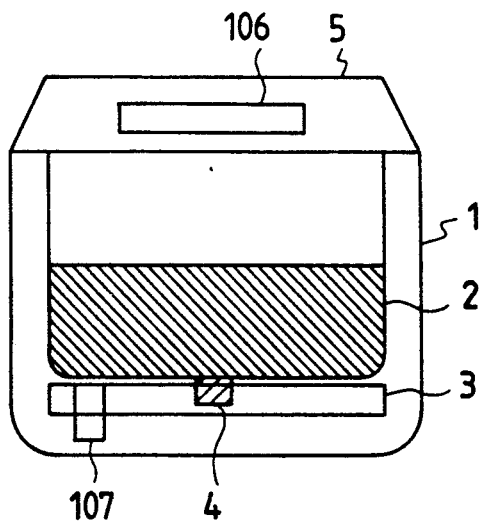
FIG. 43 shows the physical configuration of the rice cooking apparatus of the seventh embodiment.

A seventh embodiment of the present invention will be described referring first to FIGS. 42 to 44. FIG. 43 shows the physical configuration of the embodiment, while FIG. 42 shows the system for controlling the heating power level of the heater element 3. For simplicity of description, the cooking process controller 107 of this embodiment is shown as directly supplying a controlled level of electric power to the heater element 3, however in a practical apparatus the cooking process controller 107 can be formed as a combination of a microcomputer (integrated circuit) and a power control element such as a thyristor or other switching element, as for the preceding embodiments. A temperature sensor 4 such as a thyristor is mounted at the base of the vessel 2, for obtaining the temperature value of the rice which is being cooked. This embodiment basically differs from the preceding embodiments in being further provided with an input section 106, which can be mounted on the lid 5 as shown, and which includes an externally operable device (not shown in the drawings) which can be actuated by the user to set a desired value of resultant hardness of the rice that is cooked by the apparatus. The input section 106 outputs a signal value indicative of the degree of hardness that has been set by the user, which is supplied to a fuzzy inference section 108 of the cooking process controller 107. Fuzzy inference operations are then executed to obtain respective values for a plurality of control parameters of the cooking process, which are supplied to the controls section 109 of the cooking process controller 107. A timer section 110 also provides time information to the controls section 109.

Figures 44, 45:
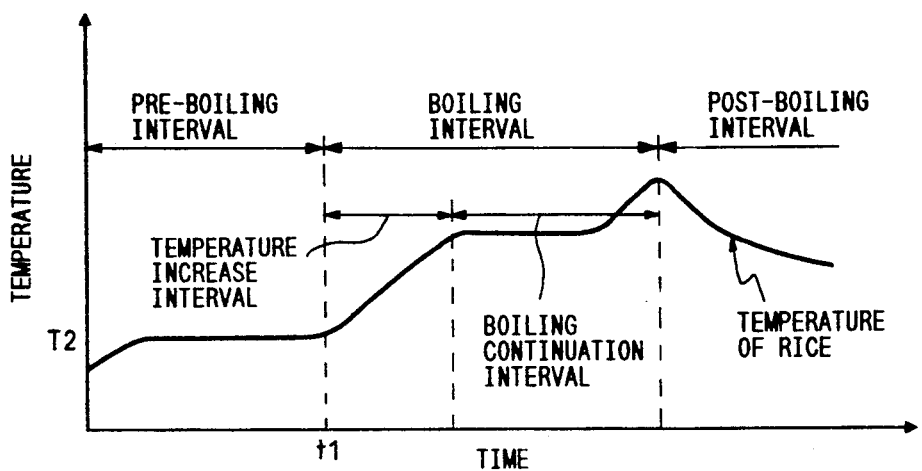
FIG. 44 shows the variation with time of the rice temperature during the cooking process.
FIG. 45 is a table showing the fuzzy inference rules for the seventh embodiment.

FIG. 44 shows the temperature variation with time of the rice during the cooking process. FIG. 45 is a table showing fuzzy inference rules. There are four sets of rules for the respective cooking parameters, these parameters being the temperature of the rice during the pre-boiling interval (referred to simply as the pre-boiling temperature), the duration of the pre-boiling interval, the power level that is supplied by the controls section 109 to the heater element 3 during the temperature increase interval, and the power level that is supplied during the boiling continuation interval.

Thus for example, according to the first rule of the first set in FIG. 45, if the desired degree of hardness of the rice is a value that conforms to the "soft" fuzzy set membership function, then a pre-boiling temperature grade will be obtained from the "low" pre-boiling temperature membership function. Similarly, from the second sat of rules, if the hardness degree conforms to the "normal" membership function, then a pre-boiling interval duration grade will be obtained from the "normal" one of the pre-boiling interval duration membership functions. These four sets of rules are utilized mutually independently.

Figure 46:
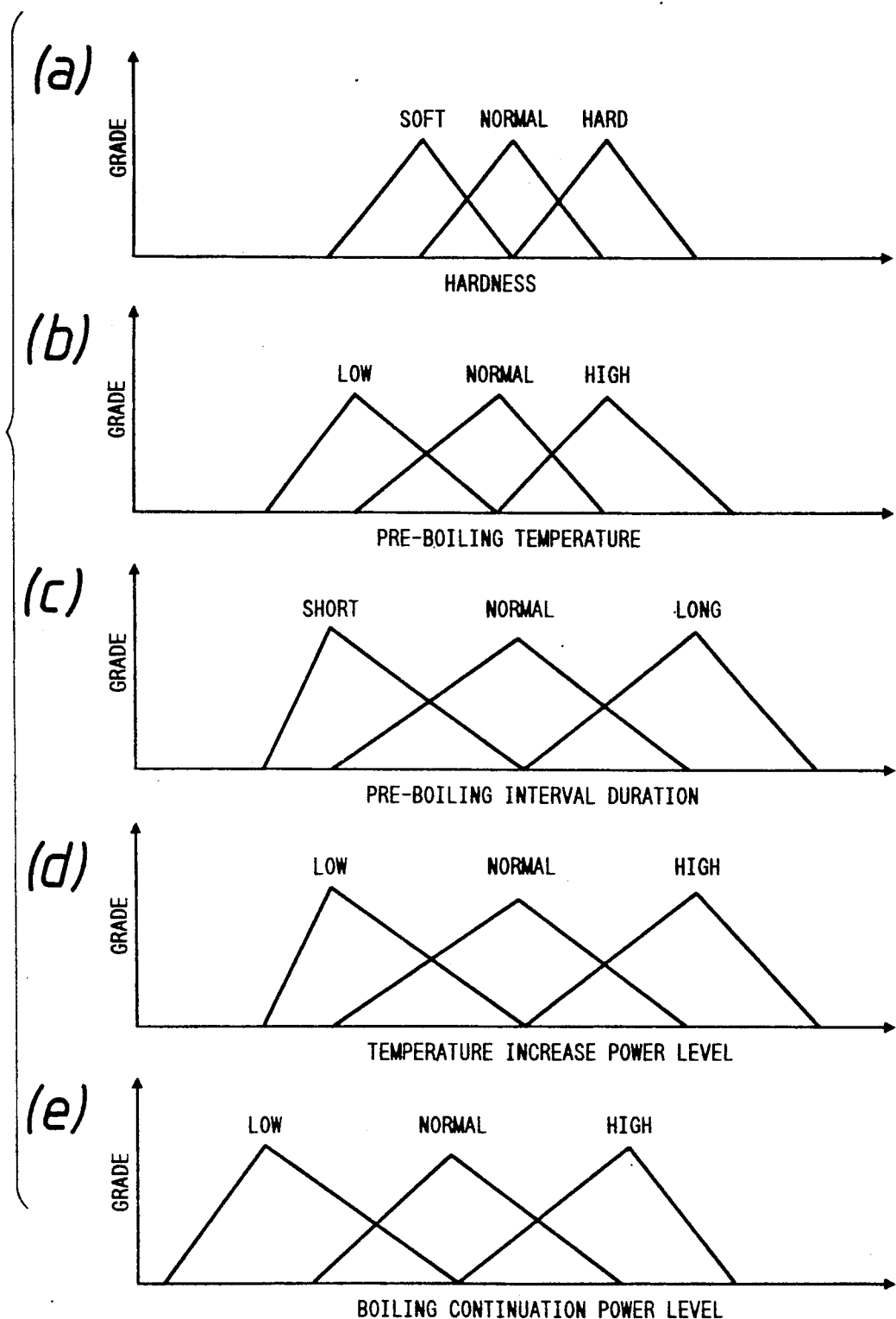
FIG. 46 shows the fuzzy set membership functions corresponding to the rules of FIG. 45.

FIG. 46 shows the fuzzy set membership functions for the cooking parameter that is the input variable (i.e. desired degree of hardness of the finally cooked rice) and the four output variables. A single set of membership functions, labelled "soft", "normal" and "hard" is used in common for all of the four sets of fuzzy inference rules.

Figure 47:
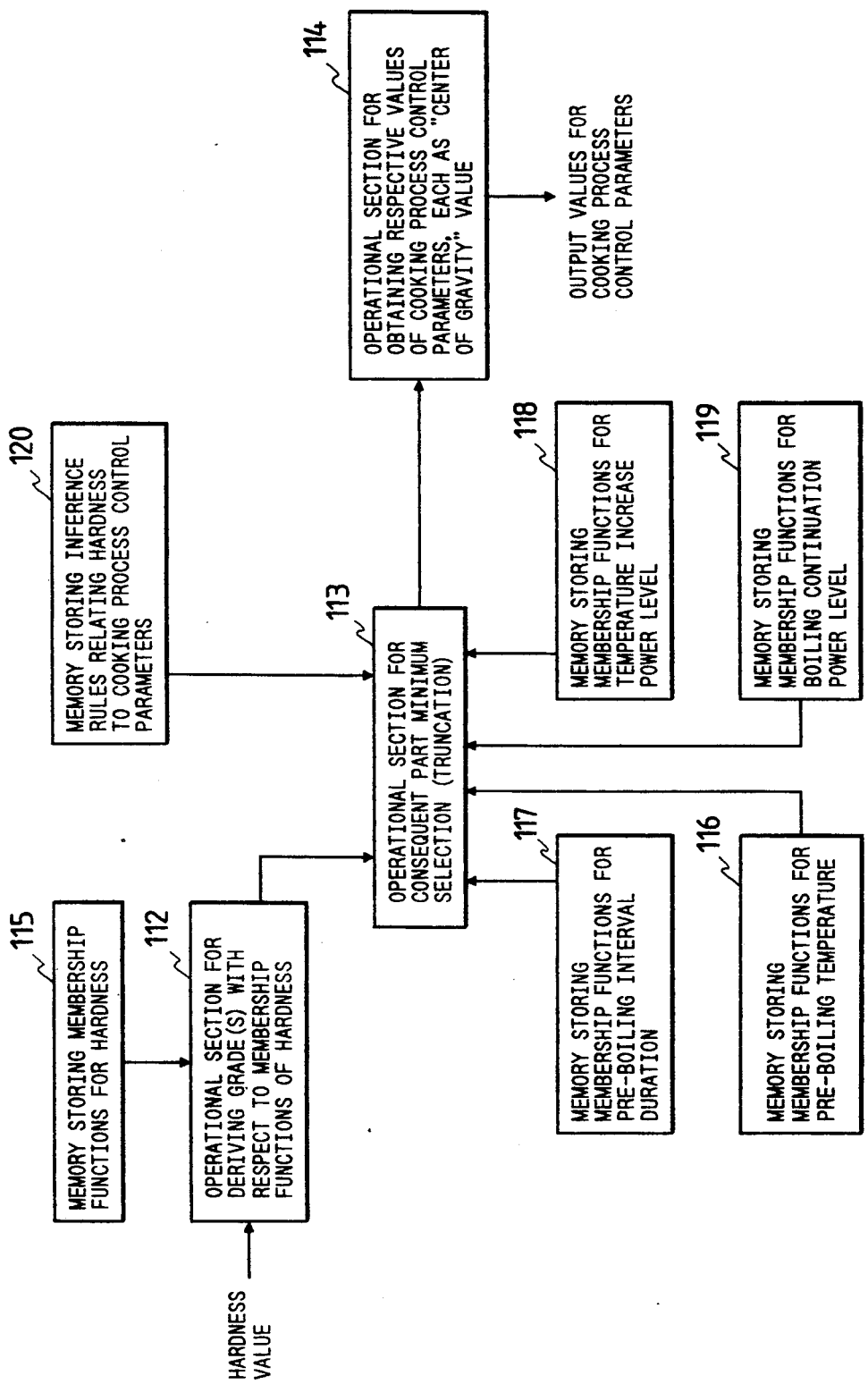
FIG. 47 is a block diagram for assistance in describing the operation of a fuzzy inference section in the seventh embodiment.

FIG. 47 illustrates the functions executed by the fuzzy inference section 108 of this embodiment, shown as respective "operational sections". A memory 115 stores the membership functions for the specified degree of hardness of the cooked rice. A memory 117 stores the membership functions for the pre-boiling interval duration, a memory 167 stores the membership functions for the pre-boiling temperature, a memory 118 stores the membership functions for the power level to be applied during the temperature increase interval, and a memory 119 stores the membership functions for the power level to be applied during the boiling continuation interval. A An operational section 112 derives the grades of the specified hardness value with respect to the aforementioned "hardness" membership functions. A memory 120 stores the fuzzy inference rules described above. An operational section 113 successively executes truncation (MIN) operations on the membership functions stored in the memories 116 to 119 respectively, using the grade values produced from the operational section 112, in accordance with successive ones of the four sets of rules that are stored in the memory 120. For each of these sets of rules, a corresponding "center of gravity" output value for the cooking parameter concerned is obtained by the operational section 114.

Figure 48A:
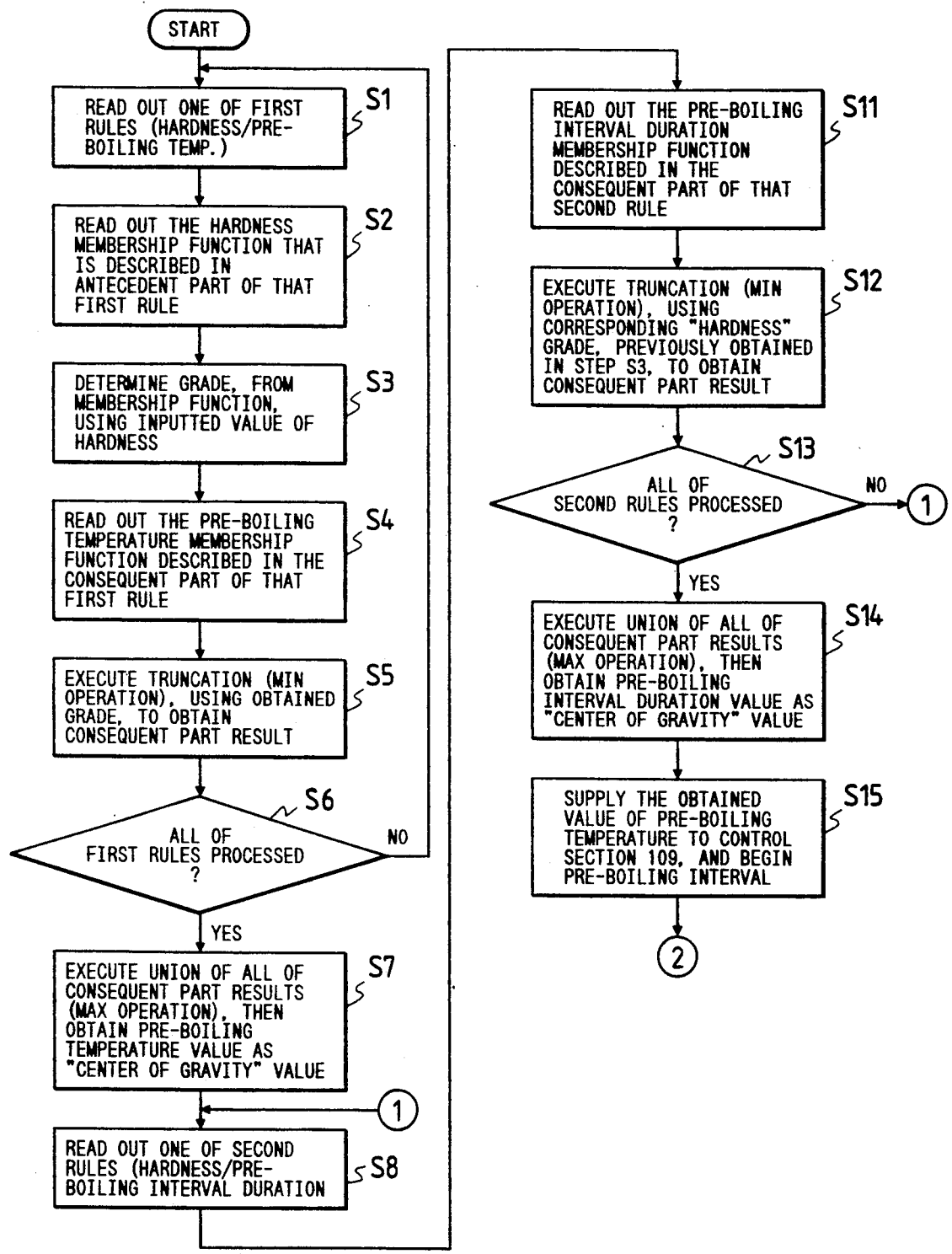
FIGS. 48A, 48B, 48C are a flow diagram for assistance in describing the operation of a cooking process controller in the seventh embodiment.
Figure 48B:
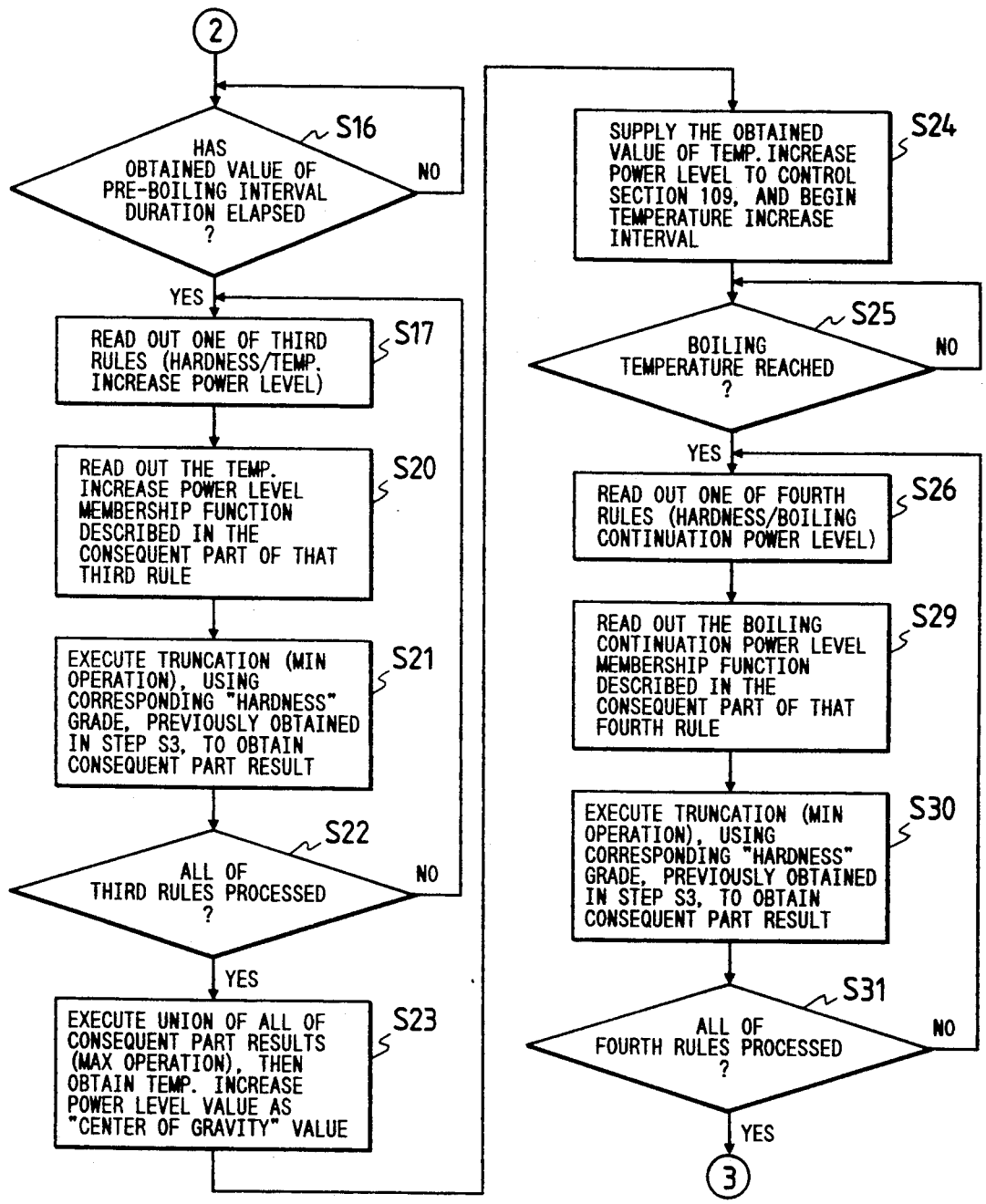
Figure 48C:
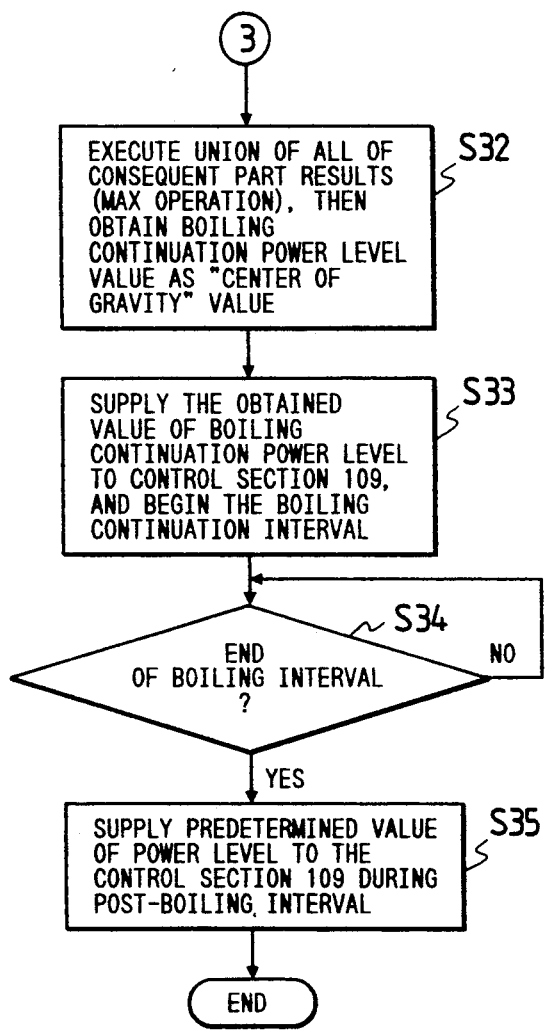

The operation of the cooking process controller 107 of this embodiment is illustrated in the flow diagram of FIGS. 48A, 48B and 48C. In these diagrams, for brevity of description, the four sets of fuzzy inference rules shown in FIG. 45, i.e. for pre-boiling temperature, pre-boiling interval duration, temperature increase power level, and boiling continuation power level respectively, are referred to simply as the first rules, second rules, third rules and fourth rules respectively. In successive repetitions of the loop of steps S1 to S6 in FIG. 48A, a grade (or two grades) with respect to the "hardness" membership functions is obtained for the inputted value of hardness, by using the first rules, and used in step S7 to obtain an output value of pre-boiling temperature by the "center of gravity" method described hereinabove. That grade or grades is also temporarily stored, for subsequent use.

Next, the loop of steps S7 to S13 is similarly repetitively executed using the second rules. However in this case, the previously obtained "hardness" grade(s) are used again in the respective antecedent parts of the rules, since the same set of "hardness" membership functions are used for all of the sets of rules. An output value of pre-boiling interval duration is thereby obtained in step S14.

The control section 109 includes circuits responsive to the temperature values supplied from the temperature sensor 4 for controlling the level of power supplied to the heater element 3 such as to maintain the rice at the temperature value that was obtained in step S7. That temperature control operation is now initiated, to begin the pre-boiling interval shown in FIG. 44 (step S15). Subsequently, when it is detected that the previously obtained value of duration for the pre-boiling interval has elapsed, a loop of steps S17 to S22 begins to be executed for successive ones of the third set of rules, to obtain consequent part results that are processed in step S23 to obtain a value of power level to be supplied to the heater element 3 during the temperature increase interval. Here again, the previously obtained "hardness" grade(s) are again used. That power level is then supplied by the controls section 109 to the heater element 3, causing the temperature of the rice to rise to the boiling temperature. When that temperature value is detected, the loop of steps S26 to S31 is executed in succession for each of the fourth set of fuzzy inference rules, (with the previously obtained "hardness" grade(s) again being used) and the consequent part results that are thereby obtained are then used in step S32 to obtain a value of power level that is to be supplied to the heater element 3 during the boiling continuation interval. Thereafter, the operation is as described for the preceding embodiments.

It would be further possible with this embodiment to use the specified degree of rice hardness to also determine the power level supplied to the heater element 3 during the post-boiling interval, by fuzzy inference control, in a similar manner to that described for the boiling continuation interval.

With the above embodiment, in which a desired degree of hardness for the cooked rice is inputted by the user and is used to control various stages of the cooking process by fuzzy inference operation, highly accurate control of hardness is achieved. Since it becomes unnecessary for the user to determine the degree of hardness by altering the proportion of rice to water prior to the start of cooking, the embodiment has the advantages of convenience and ease of use by comparison with a prior art rice cooking apparatus.

An eighth embodiment of the present invention will be described, referring first to FIG. 49, which shows the overall control system,. This embodiment is similar to the seventh embodiment described above, enabling the user to specify a desired degree of hardness for the cooked rice that is produced by the apparatus, by using an input section 106, but differs from the seventh embodiment in that respectively different sets of fuzzy set membership functions are utilized in conjunction with the four sets of fuzzy inference rules which are used in obtaining values of a plurality of cooking process parameters, i.e. the temperature of the rice during the pre-boiling interval (the pre-boiling temperature), the duration of the pre-boiling interval, the power level that is supplied to the heater element 3 during the temperature increase interval, and the power level that is supplied to the heater element 3 during the boiling continuation interval.

Figure 49:
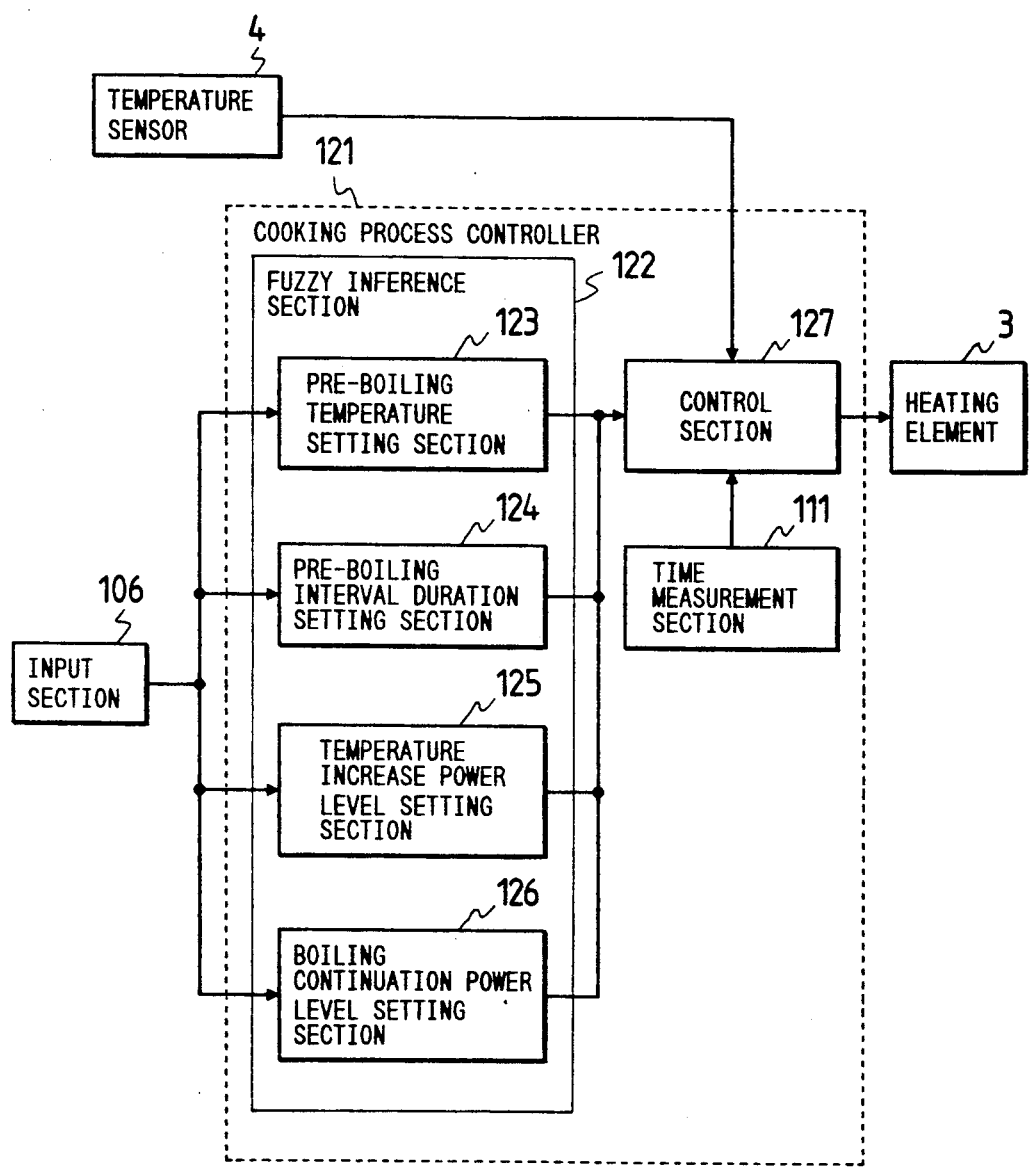
FIG. 49 is a general system block diagram of an eighth embodiment of a rice cooking apparatus according to the present invention, in which rice hardness can be selected, and values for a plurality of cooking control parameters are obtained using respectively different sets of "rice hardness" fuzzy set membership functions.

As shown in FIG. 49, the cooking process controller 121 of this embodiment includes a fuzzy inference section 122, a control section 127 and a time measurement section ill. The fuzzy inference section 122 can be considered to consist of a pre-boiling temperature setting section 123, a pre-boiling interval duration setting section 124, a temperature increase power level setting section 125, and a boiling continuation power level setting section 126. An input section 106 supplies a value of desired hardness for the finally cooked rice, specified by the user as described for the seventh embodiment above.

Figure 51:
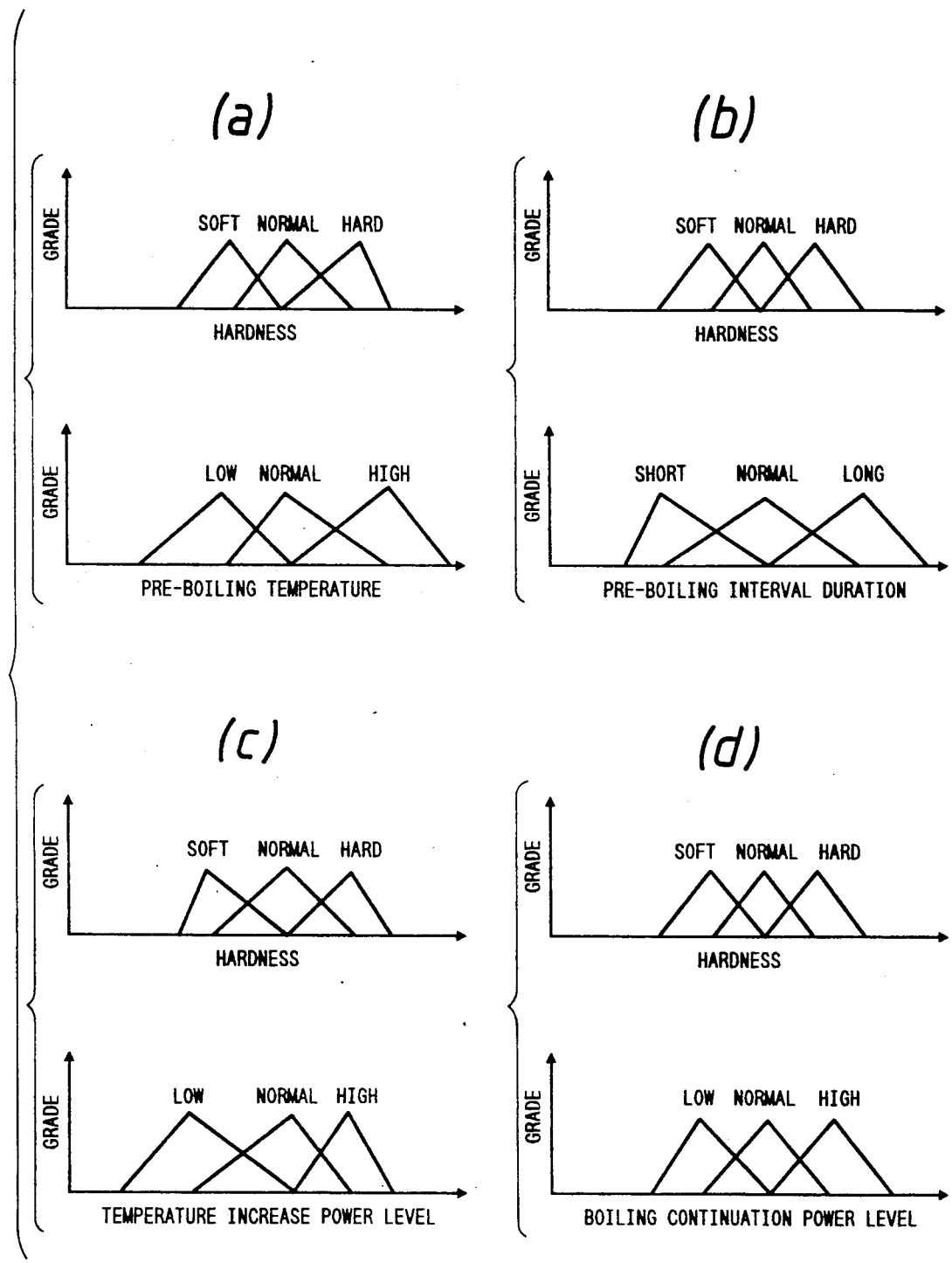
FIG. 51 shows the fuzzy set membership functions corresponding to the rules of FIG. 50.

The tables designated (a), (b), (c) and (d) in FIG. 50 show the four sets of fuzzy inference rules for this embodiment, used to obtain values of pre-boiling temperature, pre-boiling interval duration, temperature increase power level, and boiling continuation power level, respectively. The diagrams (a), (b), (c) and (d) of FIG. 51 show the four corresponding sets of fuzzy set membership functions corresponding to these four sets of rules, i.e. for use in obtaining a temperature value at which the rice is to be set during the pre-boiling interval, the duration of the pre-boiling interval, the power level that is supplied to the heater element 3 during the temperature increase interval, and the power level that is supplied to the heater element 3 during the boiling continuation interval. As shown in FIG. 51, the "hardness" membership functions that are used in the antecedent part of each rule have respectively different shapes for each of these four sets of rules.

Figure 52:
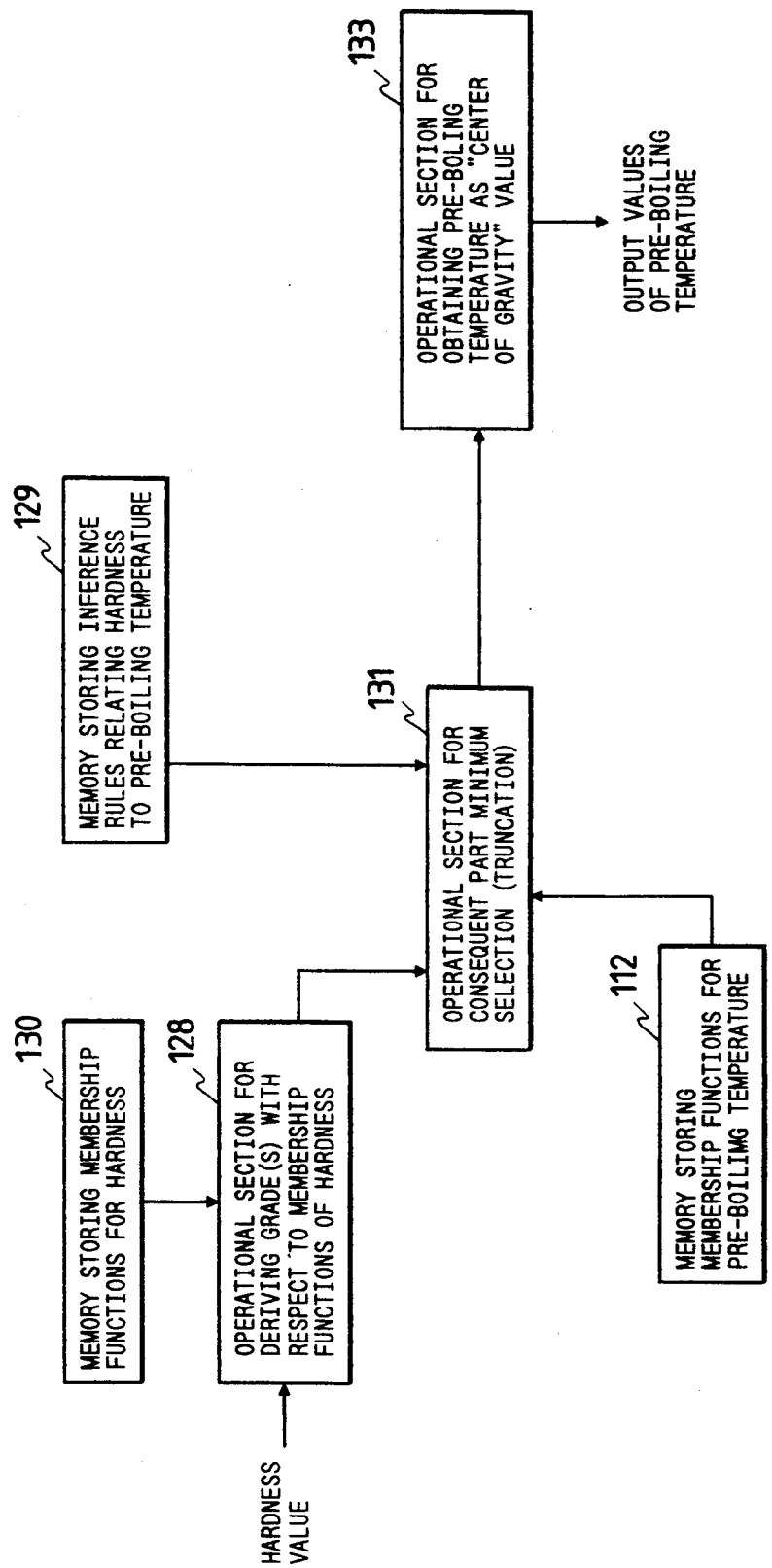
FIGS. 52 to 55 are block diagrams for assistance in describing the operation of a fuzzy inference section in the eighth embodiment.

FIG. 52 illustrates the functions executed by the pre-boiling temperature setting section 123 of the fuzzy inference section 122 of this embodiment, shown as respective "operational sections". A memory 130 stores the membership functions for the specified degree of hardness of the cooked rice corresponding to the first set of rules (i.e. the "hardness" membership functions shown in diagram (a) of FIG. 51). An operational section 128 derives the grades of the specified hardness value with respect to these "hardness" membership functions. A memory 112 stores the membership functions for the pre-boiling temperature, and a memory 129 stores the first set of fuzzy inference rules. An operational section 131 executes truncation (MIN) operations on the membership functions stored in the memory 112, using the grade values produced from the operational section 128, in accordance with the first set of rules. A corresponding "center of gravity" output value for the pre-boiling temperature is thereby obtained by the operational section 133.

Figure 53:
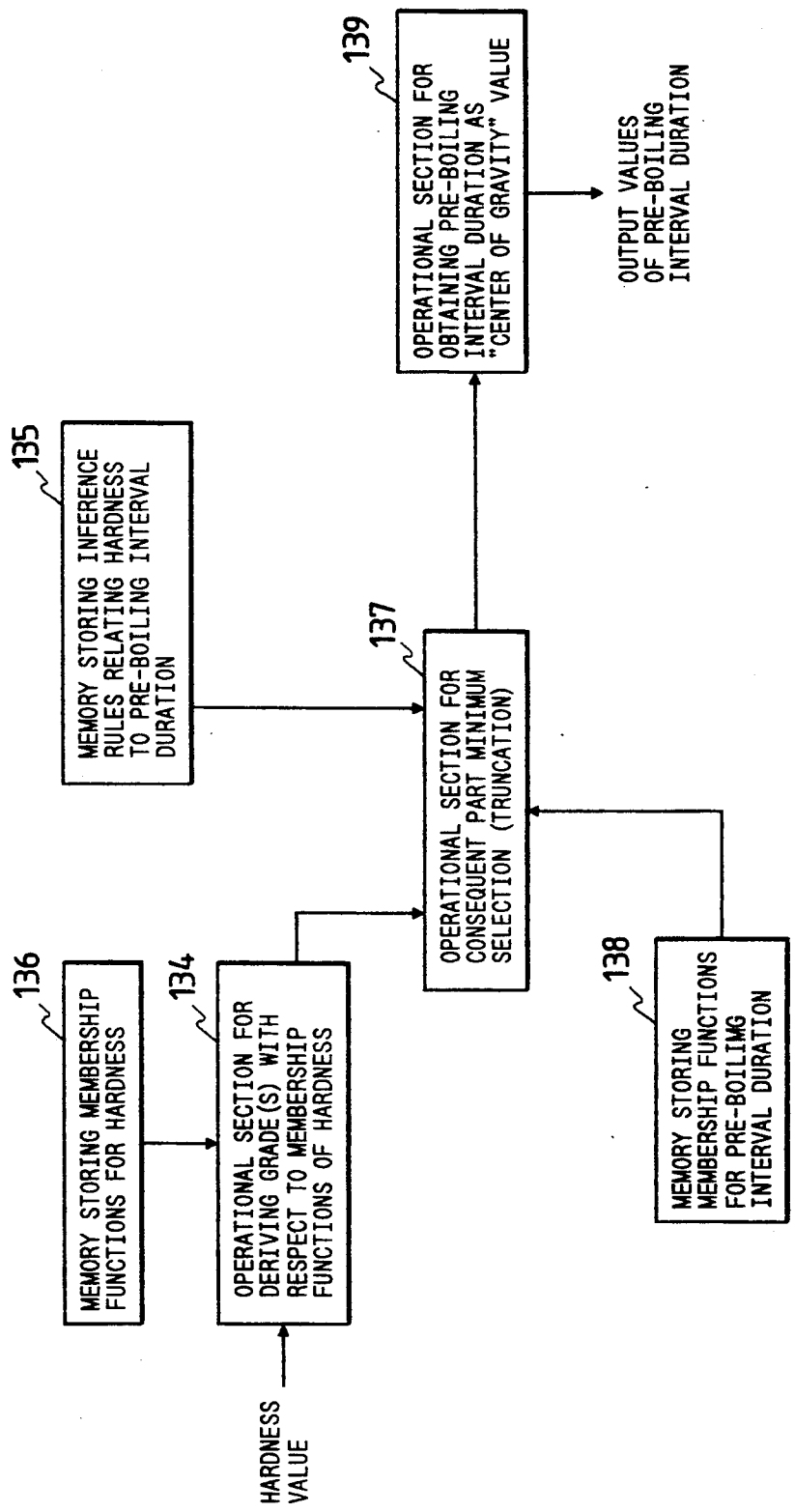

FIG. 53 similarly illustrates the functions executed by the pre-boiling interval duration setting section 124 of the fuzzy inference section 122. A memory 136 stores the membership functions for the specified degree of hardness of the cooked rice corresponding to the second set of rules. An operational section 134 derives the grades of the specified hardness value with respect to these membership functions, A memory 138 stores the membership functions for the pre-boiling interval duration, and a memory 135 stores the second set of fuzzy inference rules. An operational section 137 executes truncation (MIN) operations on the membership functions stored in the memory 138, using the grade values produced from the operational section 134, in accordance with the second set of rules. A corresponding "center of gravity" output value for the pre-boiling interval duration is thereby obtained by the operational section 139.

Figure 54:
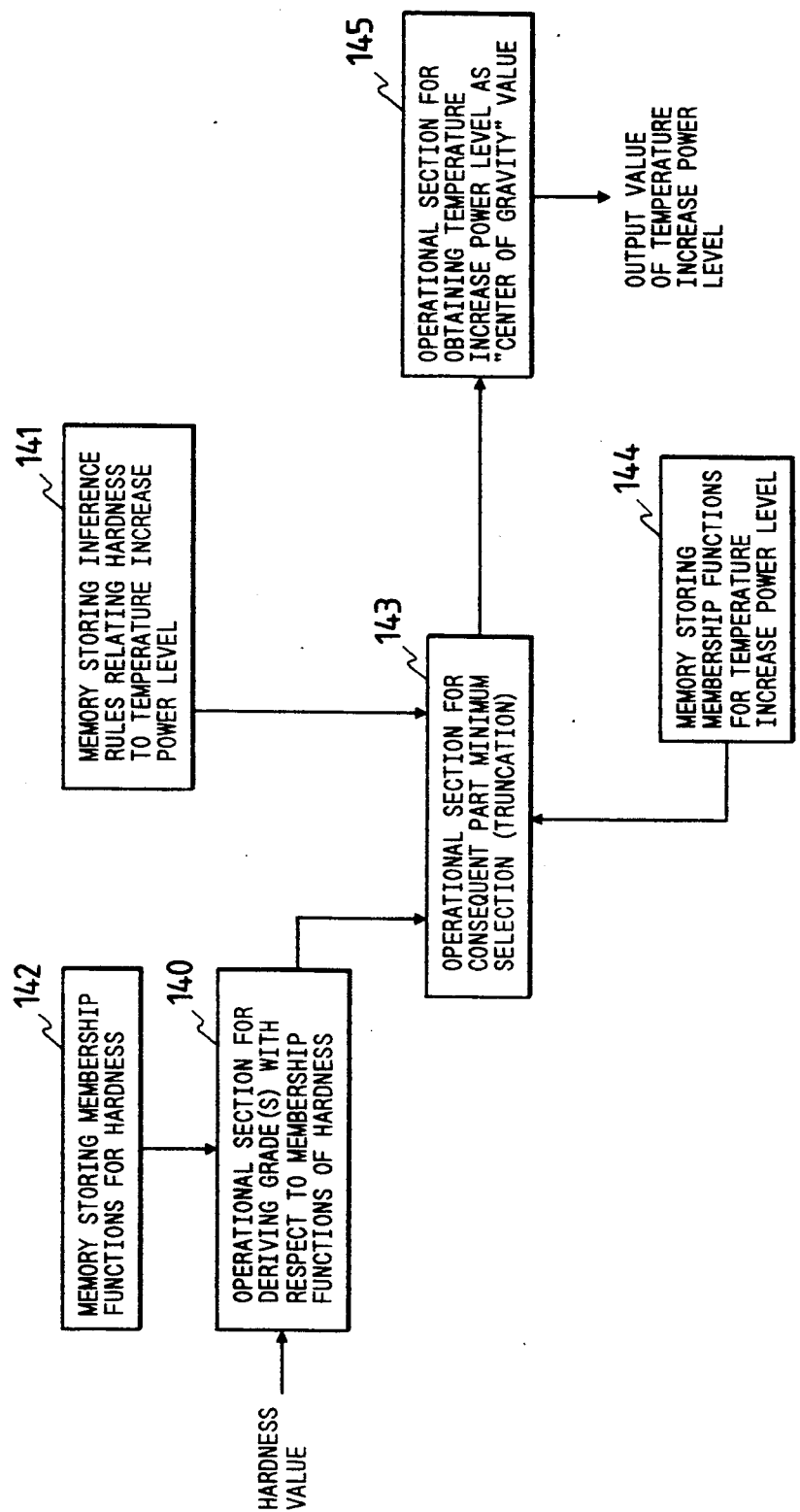

FIG. 54 similarly illustrates the functions executed by the temperature increase power level setting section 125 of the fuzzy inference section 122. A memory 142 stores the membership functions for the specified degree of hardness of the cooked rice corresponding to the third set of rules. An operational section 140 derives the grades of the specified hardness value with respect to these membership functions. A memory 144 stores the membership functions for the temperature increase power level, and a memory 141 stores the third set of fuzzy inference rules. An operational section 143 executes truncation (MIN) operations on the membership functions stored in the memory 144, using the grade values produced from the operational section 140, in accordance with the third set of rules. A corresponding "center of gravity" output value for the temperature increase power level is thereby obtained by the operational section 145.

Figure 55:
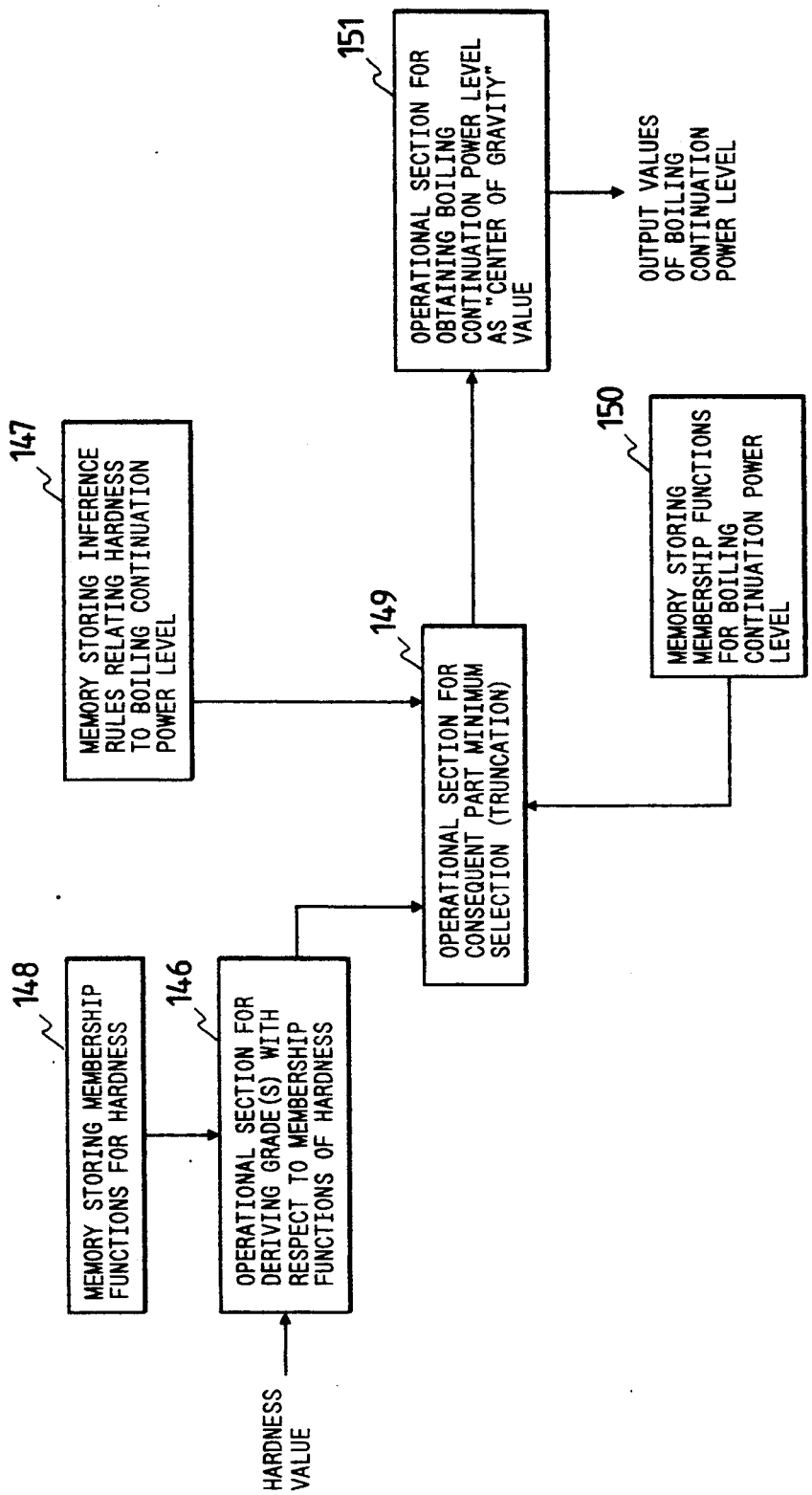
Figure 56A:
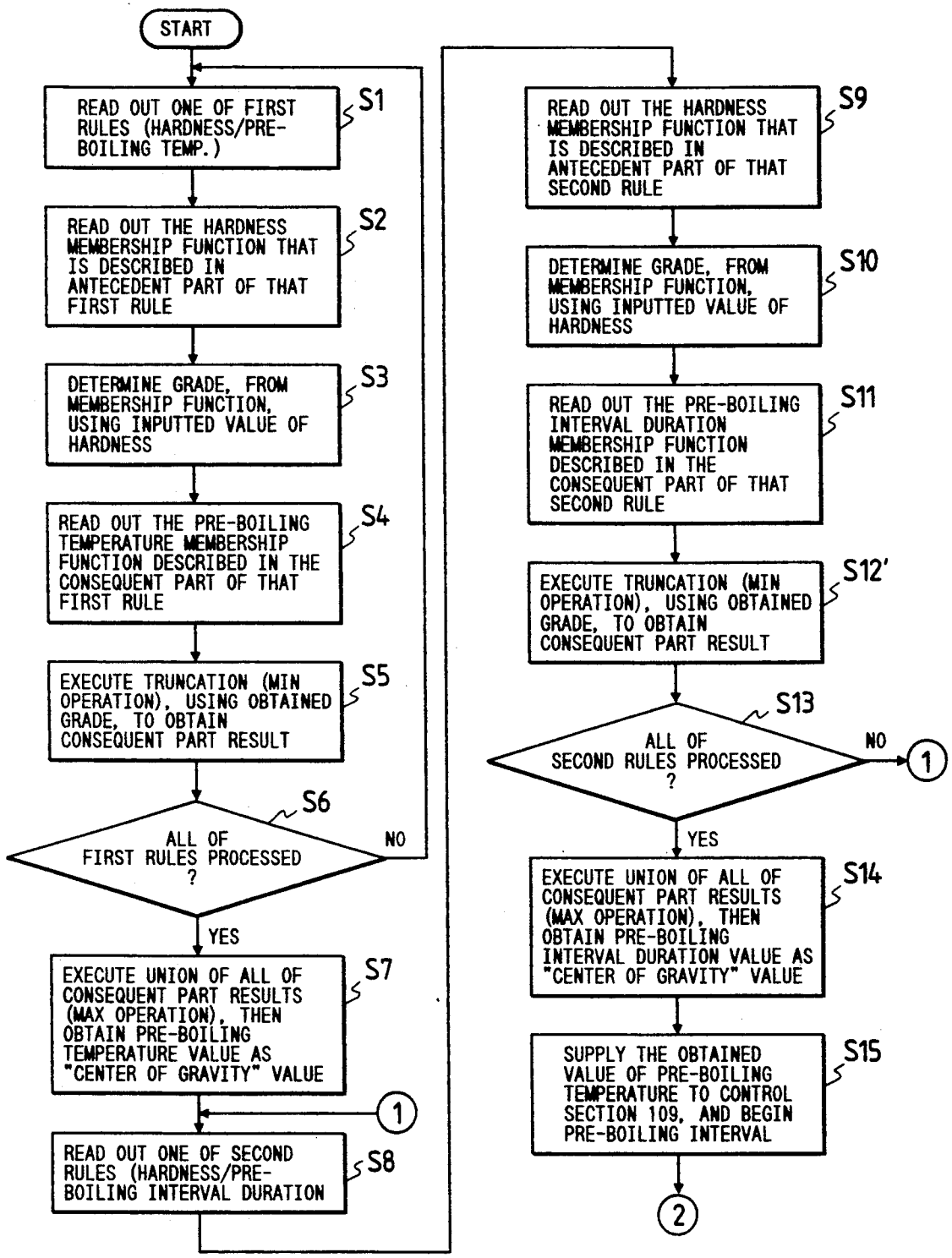
FIGS. 56A to 56C are a flow diagram for assistance in describing the operation of a cooking process controller in the eighth embodiment.
Figure 56B:
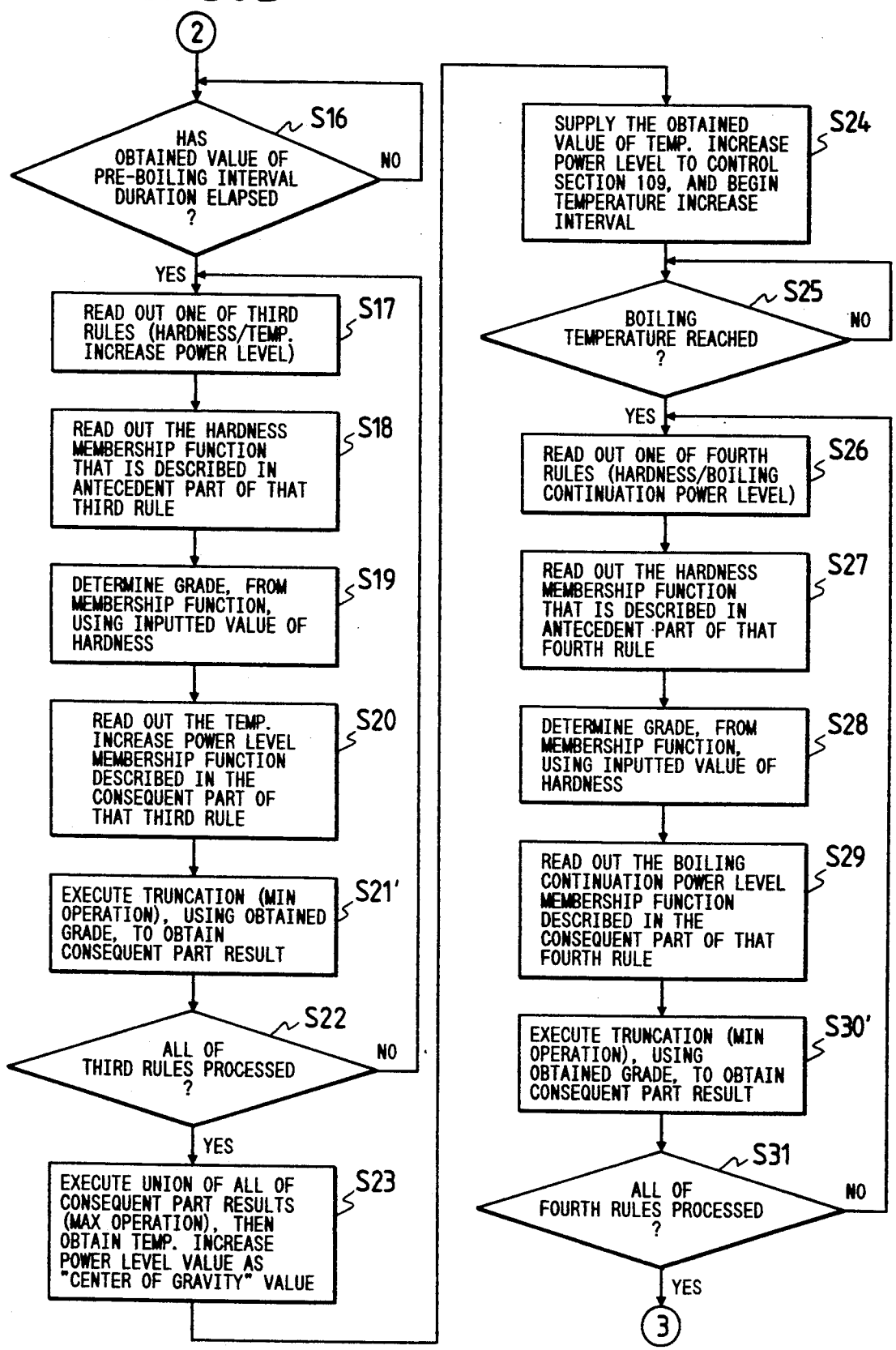
Figure 56C:
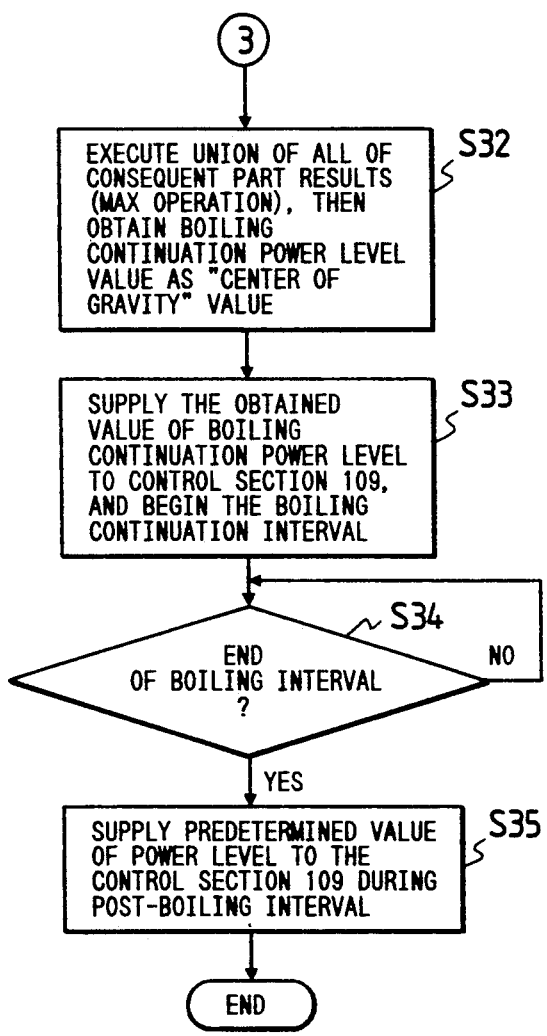

FIG. 55 similarly illustrates the functions executed by the boiling continuation power level setting section 126 of the fuzzy inference section 122. A memory 148 stores the membership functions for the specified degree of hardness of the cooked rice corresponding to the fourth set of fuzzy inference rules, i.e. the "hardness" membership functions shown in diagram (d) of FIG. 51. An operational section 146 derives the grades of the specified hardness value with respect to these membership functions. A memory 150 stores the membership functions for the boiling continuation power level, and a memory 147 stores the fourth set of rules. An operational section 149 executes truncation (MIN) operations on the membership functions stored in the memory 150, using the grade values produced from the operational section 146, in accordance with the fourth set of rules. A corresponding "center of gravity" output value for the boiling continuation power level is thereby obtained by the operational section 151. FIGS. 56A to 56C constitute a flow diagram for describing the operation of this embodiment. As shown, the operation is similar to that of the seventh embodiment described hereinabove. However due to the fact that respectively different sets of fuzzy set membership functions are used for each of the four sets of rules in this case, it is necessary to insert the steps S9, S10 to obtain "hardness" grade value(s) corresponding to the second set of rules, within the loop of steps S8 to S13 that are executed to obtain a consequent part result for deriving the pre-boiling interval value. Each grade value thus obtained is used in the step S12'. For the same reason, it is similarly necessary to insert the steps S18, S19 to obtain "hardness" grade values in accordance with the third set of rules, for use in step S21', in the process of obtaining a temperature increase power level value, and to insert the steps S27, S28 to obtain grade values for use in step S30' in accordance with the fourth set of rules, in the process of obtaining a boiling continuation power level value.

In all other respects, the operation of this embodiment is identical to that of the seventh embodiment described above.

With the eighth embodiment due to the fact that respectively different fuzzy set membership functions are used in obtaining values for the four different cooking process parameters, a greater precision of control can be achieved, to set the degree of hardness of the cooked rice in accordance with the value that has been selected by the user, using the input section 106.

Figure 57:
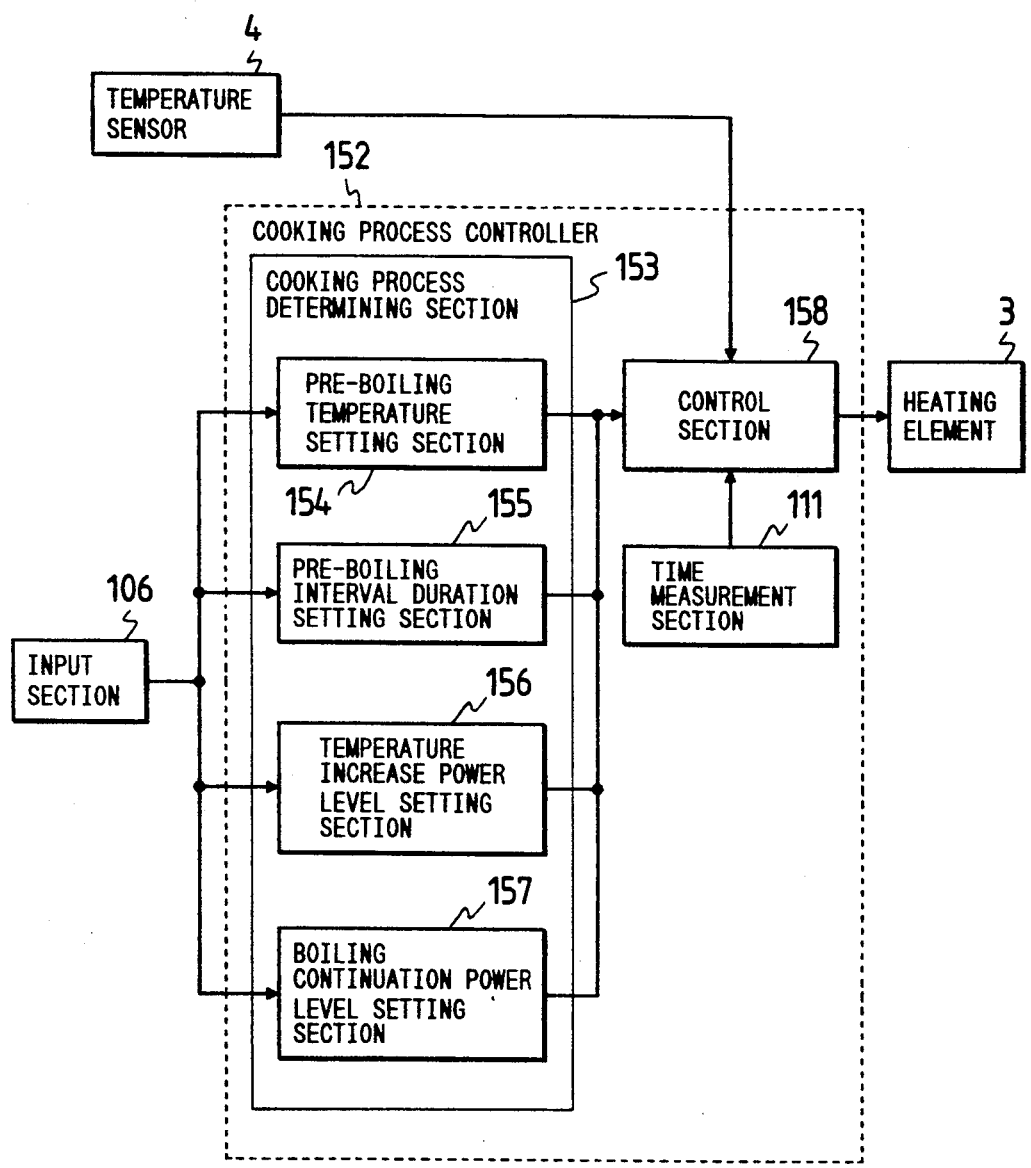
FIG. 57 is a general system block diagram of a ninth embodiment of a rice cooking apparatus according to the present invention, which is a second modification of the eighth embodiment.
Figure 58:
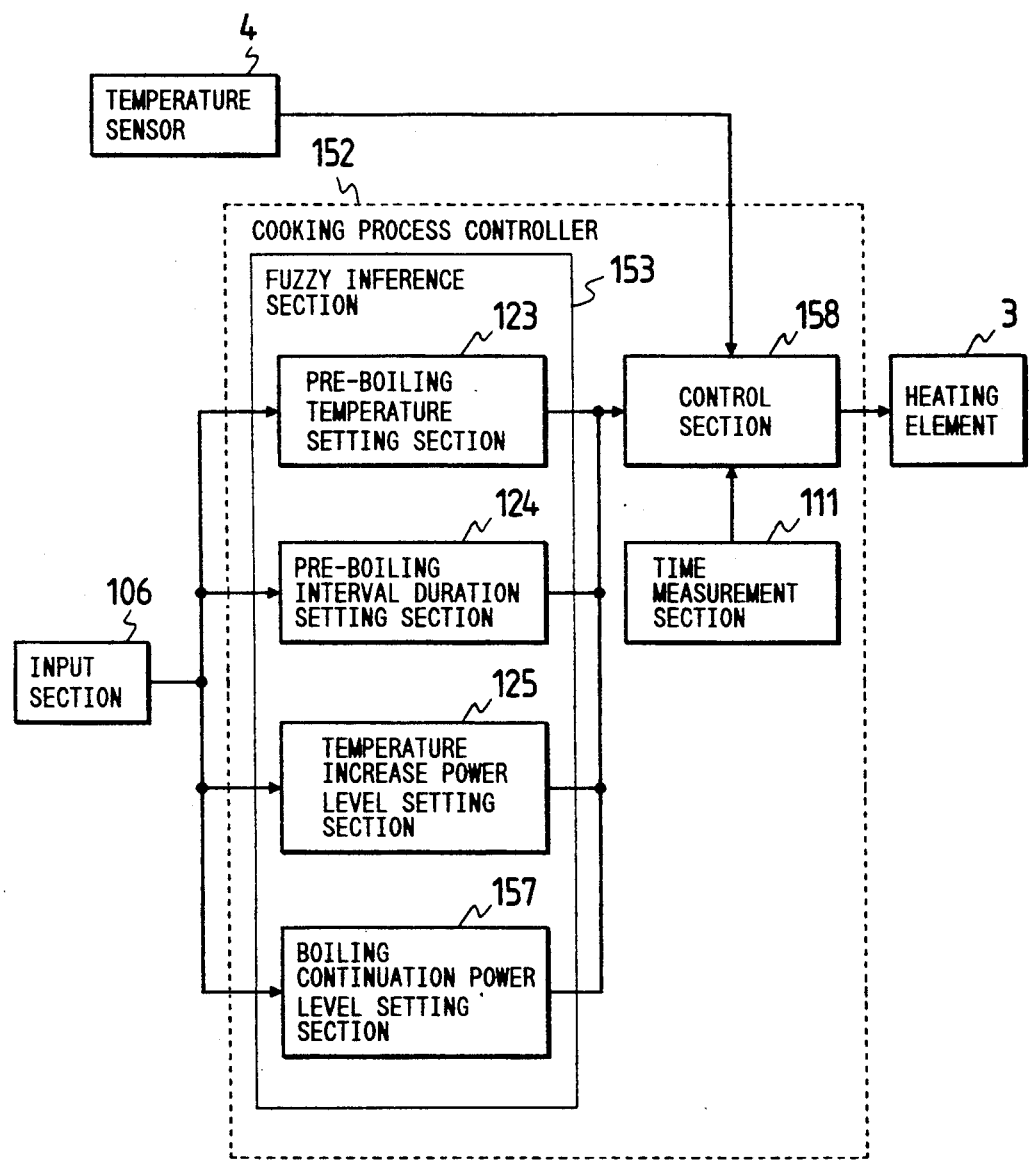
FIG. 58 shows the variation with time of rice temperature during the cooking process.

A ninth embodiment of a rice cooking apparatus according to the present invention will be described, referring first to FIG. 57 which shows the control system configuration, and FIG. 58 which shows the temperature variations of the rice during the cooking process. As shown in FIG. 57, this embodiment is similar to the eighth embodiment described above, enabling a user to specify a desired degree of rice hardness by operation of an input section 106, and only the points of difference will be described in detail. Specifically, with the ninth embodiment, the fourth set of fuzzy inference rules (for use in deriving boiling continuation power level) differ from those of the eighth embodiment (shown in diagram (d) of FIG. 50), in that a value of temperature gradient of the rice during the temperature increase interval shown in FIG. 58 is derived and is used in that fourth set of rules. That is to say, the antecedent part of each of the fourth set of rules has "rice temperature gradient" and "specified value of hardness" as input variables, while the consequent part has "power level during boiling continuation interval" as the variable. Thus only the boiling continuation power level setting section 157 in the cooking process controller 152 FIG. 57 is different from the corresponding section 126 of FIG. 49, while the pre-boiling temperature setting section 123, pre-boiling interval duration setting section 124, and temperature increase power level setting section 125 can be respectively identical to the corresponding sections 123, 124 and 125 in the eighth embodiment. During the pre-boiling interval, as for the eighth embodiment, the temperature of the rice is held at a value T2 shown in FIG. 59, that has been determined by the pre-boiling temperature section 123, with the duration of the pre-boiling interval extending to a point t1 which is determined by the setting section 124.

However with the ninth embodiment, when the control section 158 detects from the output values produced by the temperature sensor 4 that the temperature of the rice has reached a predetermined value T1 during the temperature increase interval, the temperature gradient of the rice (e.g. from the start of the temperature increase interval up to that point) is computed by the control section 158. That value of temperature gradient is then used in conjunction with the specified value of hardness supplied from the input section 106, in the fourth set of fuzzy inference rules, for obtaining the appropriate value of power level during the boiling continuation interval.

Figures 59, 60:
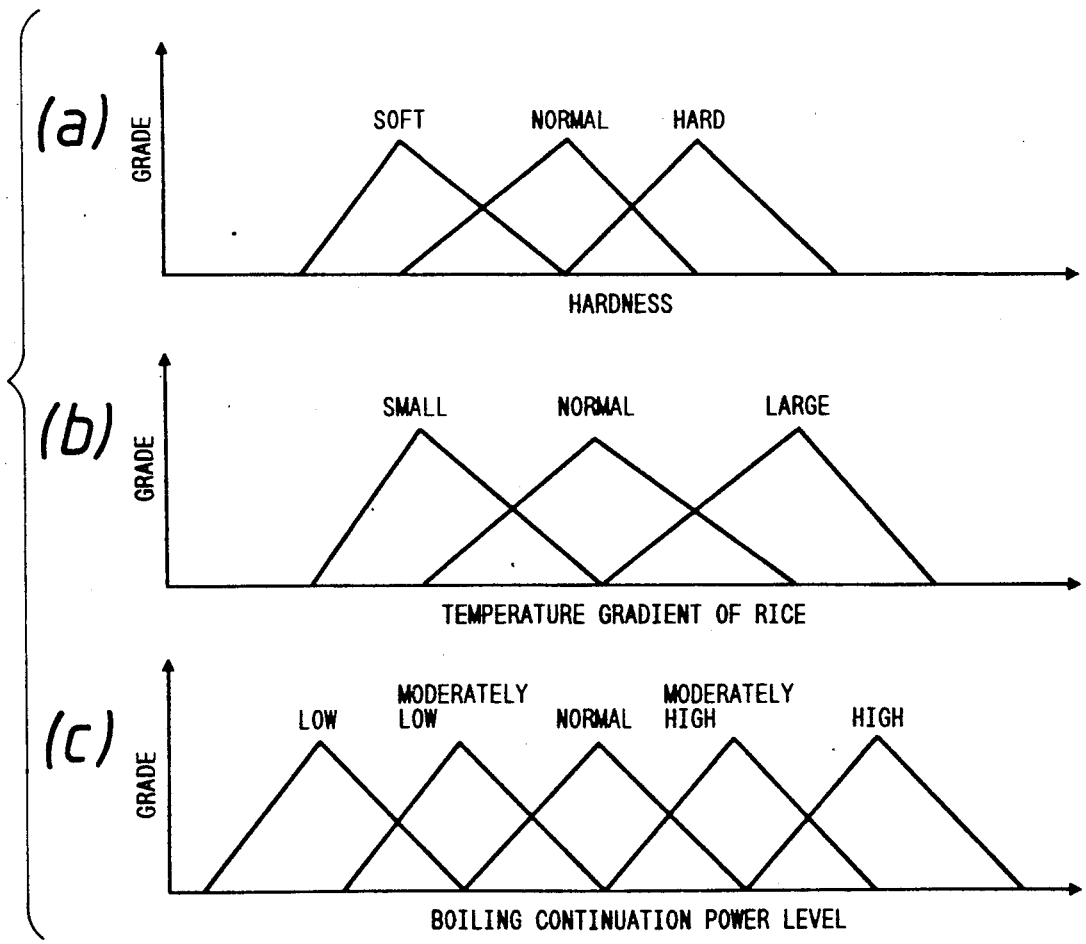
FIG. 59 is a table showing the fuzzy inference rules for the ninth embodiment.
FIG. 60 shows the fuzzy set membership functions corresponding to the rules of FIG. 59.

FIG. 59 is a table showing the fourth set of fuzzy inference rules in this case. According to these, for example, when the specified hardness is "soft" and the rice temperature gradient is "high", then the boiling continuation power level is "high". The corresponding fuzzy set membership functions are shown in FIG. 60.

This embodiment further differs from the eighth embodiment in that a greater number of fuzzy set membership functions are used for the boiling continuation power level, as shown in diagram (c) of FIG. 60. That is to say, the fuzzy sets labelled "moderately high" and "moderately low" are added as shown, thereby enabling the accuracy of control of the cooking process to be further improved.

Figure 61:
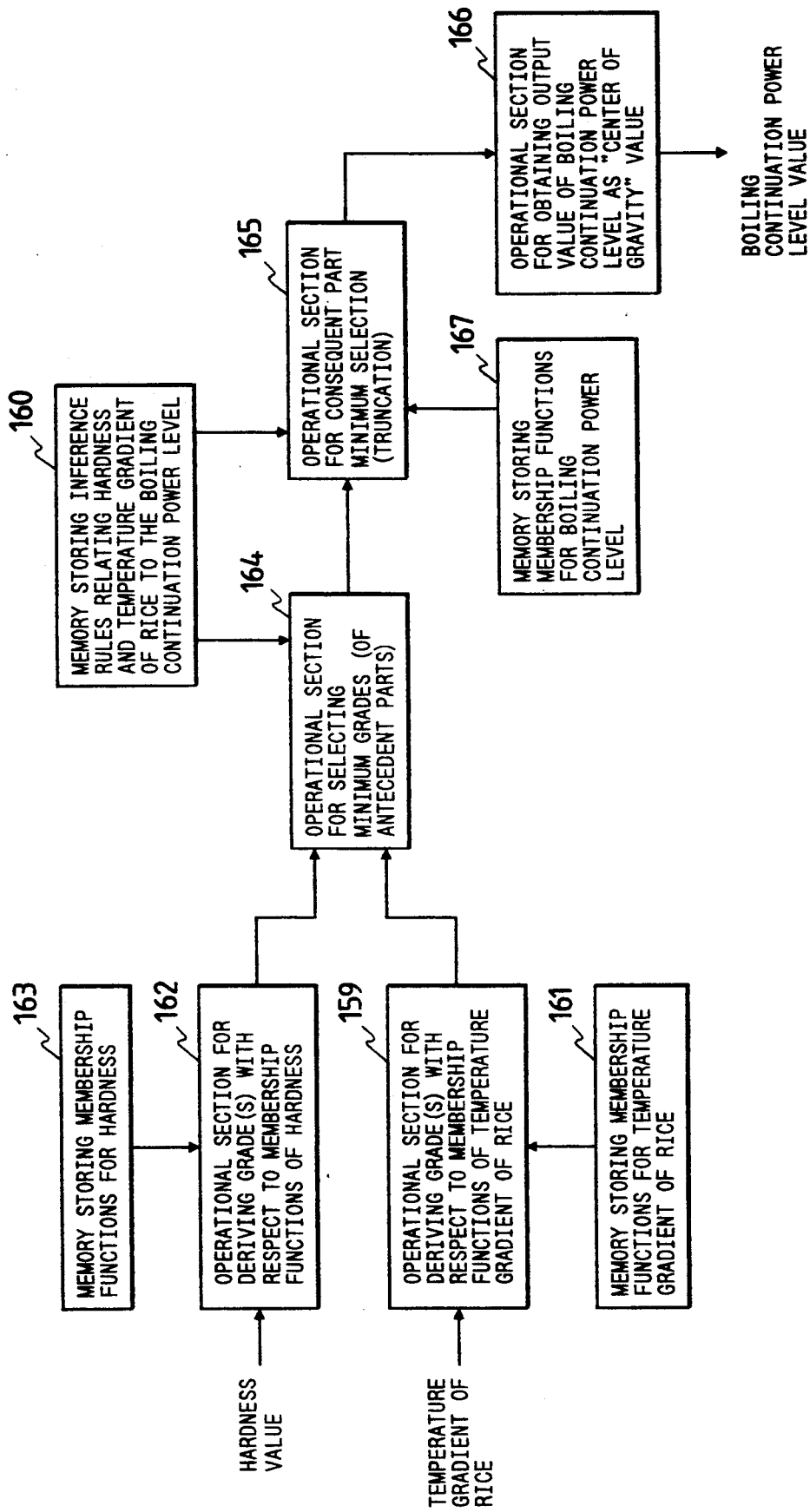
FIG. 61 is a block diagram for assistance in describing the operation of a fuzzy inference section in the ninth embodiment.

FIG. 61 illustrates the functions executed by the boiling continuation power level setting section 157 of the fuzzy inference section 153 of this embodiment, shown as respective "operational sections". A memory 163 stores the membership functions for the specified degree of hardness of the cooked rice. An operational section 162 derives the grades of the specified hardness value with respect to these "hardness" membership functions. A memory 161 stores the membership functions for the rice temperature gradient, and an operational section 159 derives the grades of the obtained temperature gradient with respect to the membership functions. An operational section 164 selects, for each of the rules, the smaller of the grades obtained by the section 159 and 162. A memory 167 stores the membership functions for the boiling continuation power level, and a memory 160 stores the fourth set of fuzzy inference rules, shown in FIG. 59. An operational section 165 executes truncation (MIN) operations on the membership functions stored in the memory 167, using the grade values produced from the operational section 164, in accordance with these rules. A corresponding "center of gravity" output value for the boiling continuation power level is thereby obtained by the operational section 166.

Figure 62:
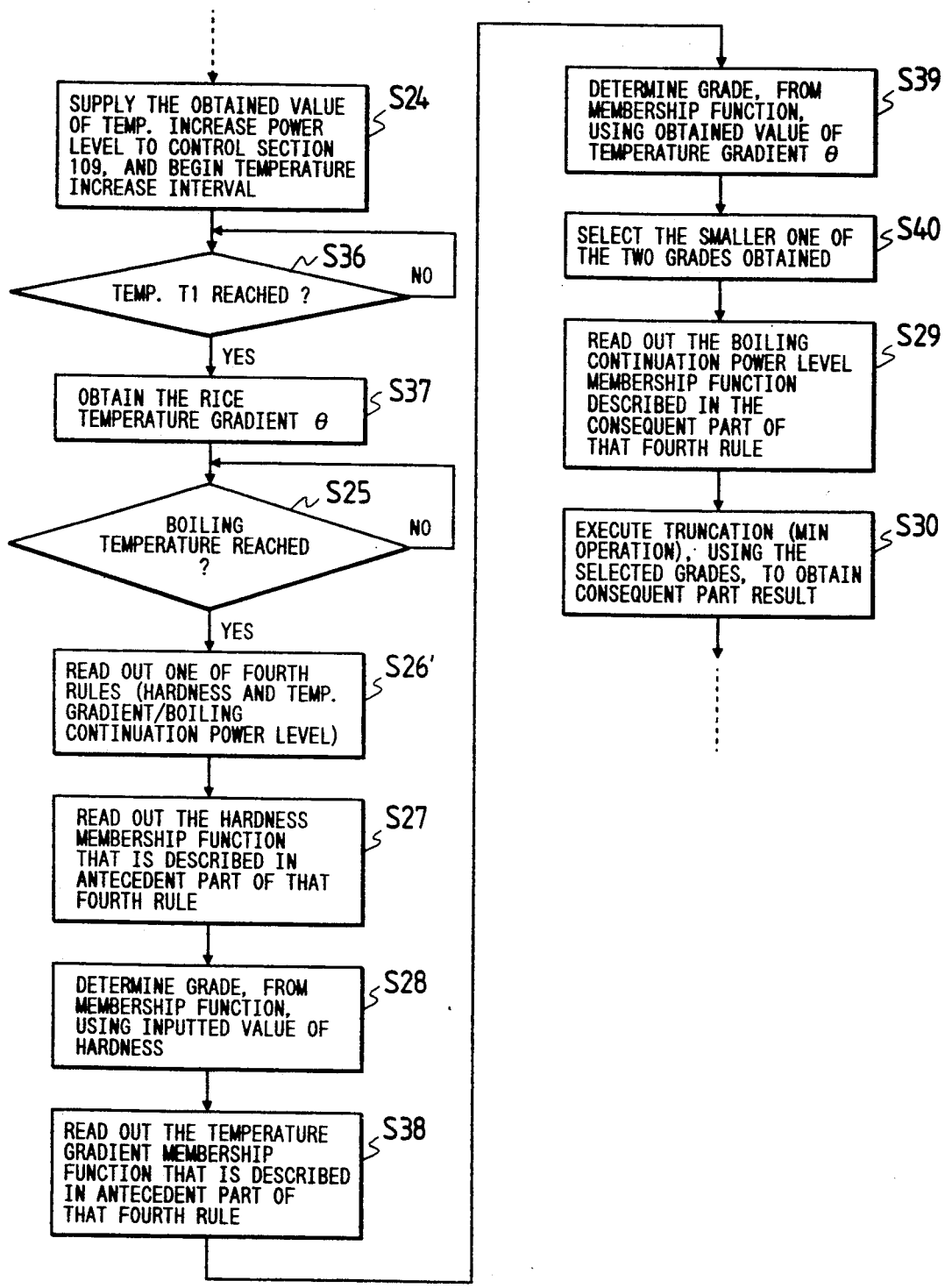
FIG. 62 is a partial flow diagram, for assistance in describing how the ninth embodiment differs from the eighth embodiment.

The operating flow diagram for this embodiment differs from that of the eighth embodiment only with regard to the sequence of steps from S24 to S29, and so only that different portion will be described. This is shown in FIG. 62. After the temperature increase interval has commenced the temperature gradient of the rice that is being cooked is obtained by steps S36, S37. Subsequently, that value is used to obtain grades with respect to the temperature gradient membership functions, in successive executions of step 39. During each execution of the set of steps S26' to S30', if two grades are obtained from steps S28 and S39, the smaller of these is selected in step S40, and used to obtain a consequent part result in step S30'. The subsequent operation is identical to that of the eighth embodiment.

Figure 63:
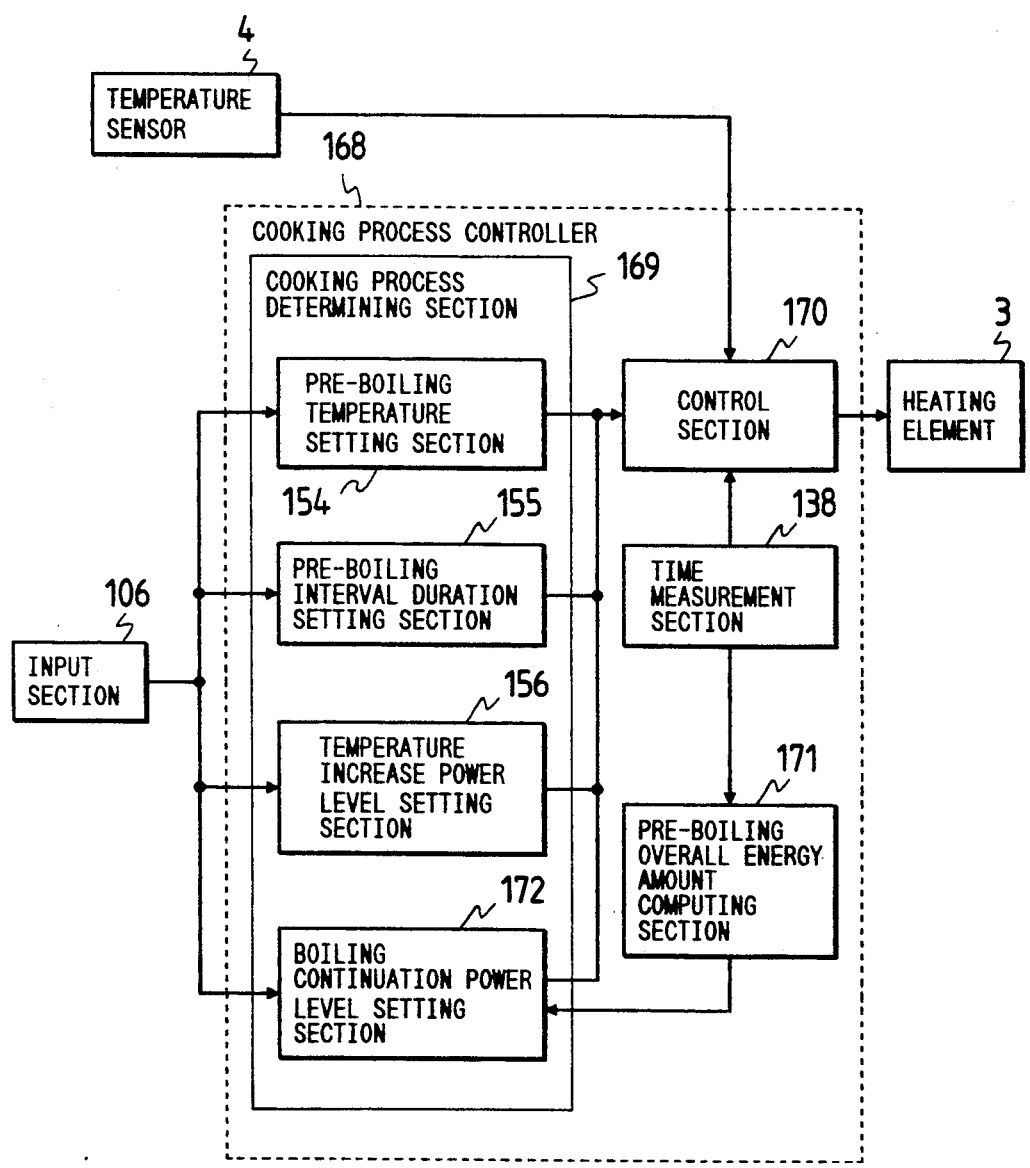
FIG. 63 is a general system block diagram of a tenth embodiment of a rice cooking apparatus according to the present invention, which is a second modification of the eighth embodiment.
Figure 64:
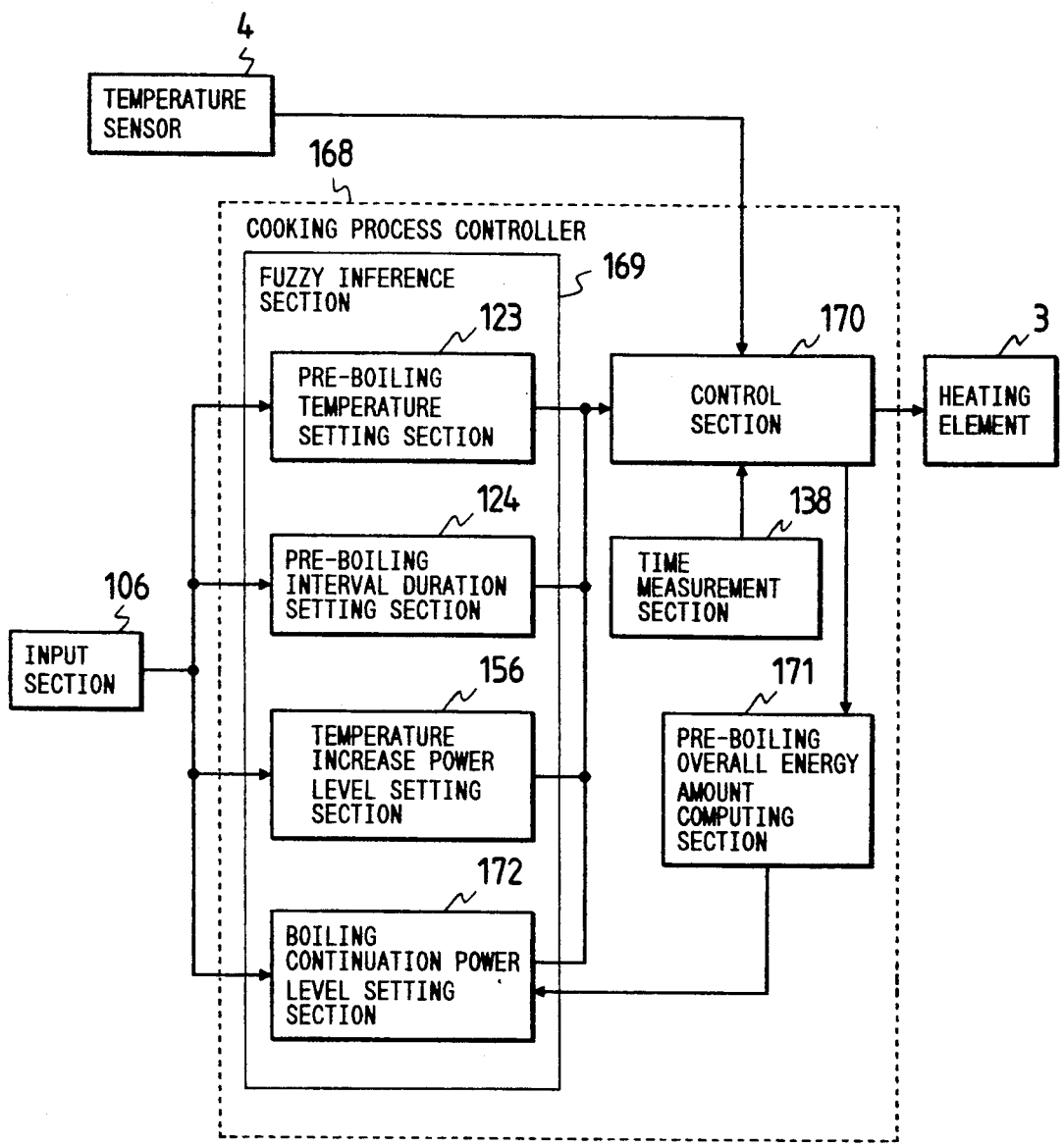
FIG. 64 is a table showing the fuzzy inference rules for the tenth embodiment.
Figure 65:
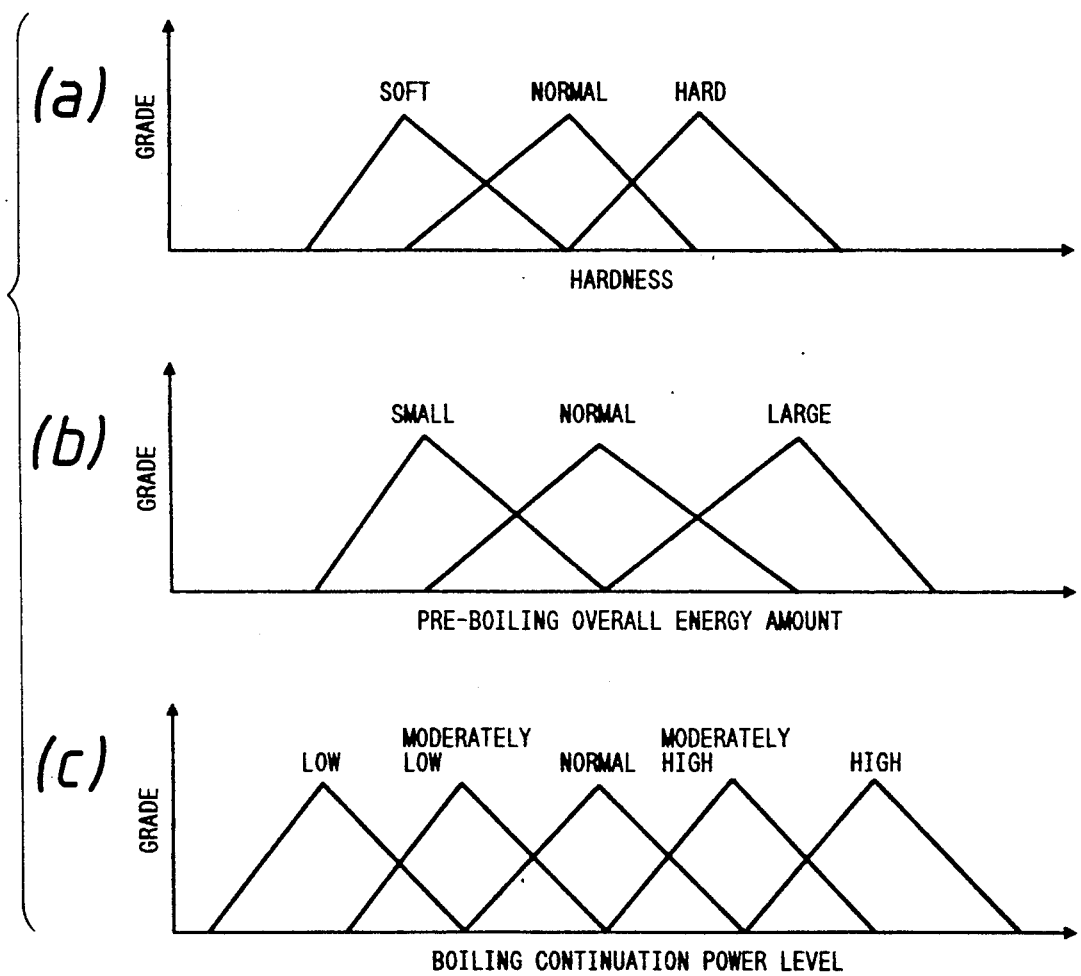
FIG. 65 shows the fuzzy set membership functions corresponding to the rules of FIG. 64.

A tenth embodiment of a rice cooking apparatus according to the present invention will be described, referring first to the control system diagram of FIG. 63. This embodiment is similar to the ninth embodiment described above, but differs in that the cooking process controller 168 further includes a pre-boiling overall energy amount computing section 171, which functions to integrate with respect to time the power that is supplied to the heater element 3 during the pre-boiling interval, to thereby obtain the overall heat energy that is generated during that interval. That value of overall energy amount is subsequently used in conjunction with the specified degree of rice hardness supplied from the input section 106, to obtain the value of power level to be supplied in the boiling continuation interval. FIG. 64 is a table showing the fourth set of fuzzy inference rules in this case, used to obtain the appropriate boiling continuation power level. According to these rules, for example, when the specified hardness is "soft" and obtained value of pre-boiling overall energy amount is "high", then the boiling continuation power level is "high". The corresponding fuzzy set membership functions are shown in FIG. 65.

Figure 66:
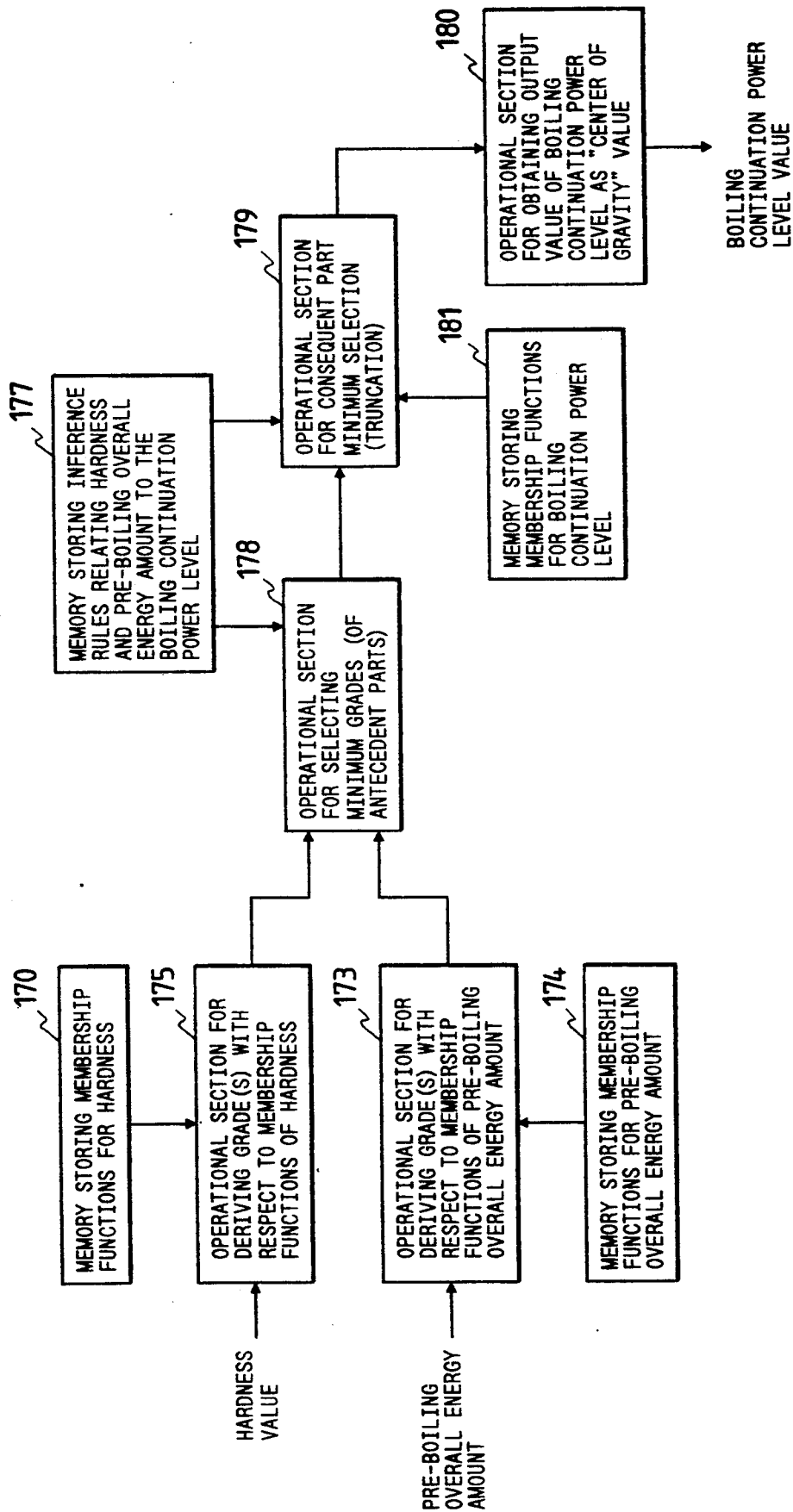
FIG. 66 is a block diagram for assistance in describing the operation of a fuzzy inference section in the tenth embodiment.

FIG. 66 illustrates the functions executed by the boiling continuation power level setting section 172 of the fuzzy inference section 169 of this embodiment, shown as respective "operational sections". A memory 170 stores the membership functions for the specified degree of hardness of the cooked rice. An operational section 175 derives the grades of the specified hardness value with respect to these "hardness" membership functions. A memory 174 stores the membership functions for the overall amount of energy generated in the pre-boiling interval, and an operational section 173 derives the grades of the obtained overall amount of energy in the pre-boiling interval, with respect to these membership functions. An operational, section 178 selects, for each of the rules, the smaller of the grades obtained by the section 173 and 175. A memory 181 stores the membership functions for the boiling continuation power level, and a memory 171 stores the fourth set of fuzzy inference rules, shown in FIG. 64. An operational section 179 executes truncation (MIN) operations on the membership functions stored in the memory 181, using the grade values produced from the operational section 178, in accordance with these rules. A corresponding "center of gravity" output value for the boiling continuation power level is thereby obtained by the operational section 180.

Figure 67A:
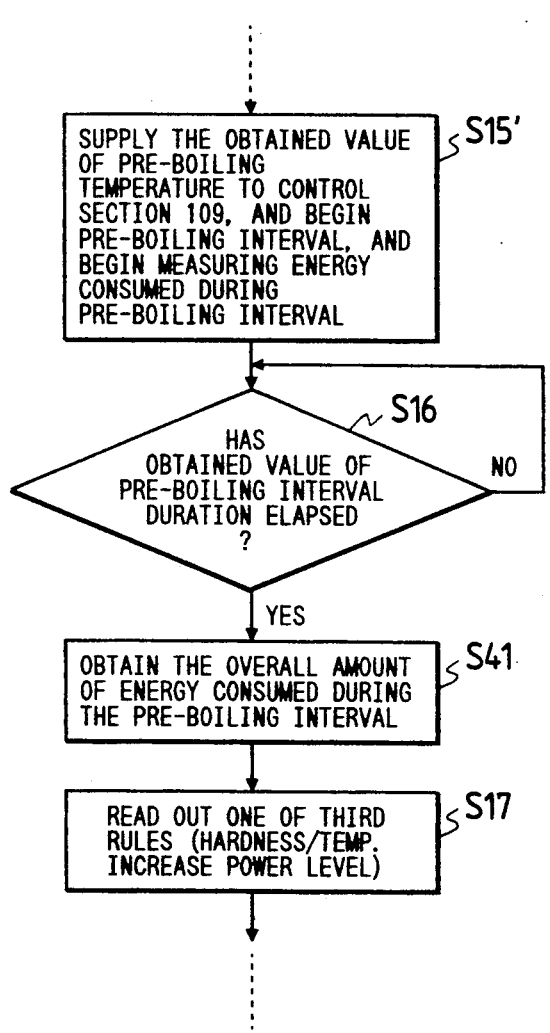

The operating flow diagram for this embodiment differs from that of the eighth embodiment only with regard to the sequence of steps from S15 to S17 and the sequence from step S25 to S29, and so only these different portions will be described. These are shown in FIGS. 67A and 67B respectively. As shown in FIG. 67A, during the pre-boiling interval, while the previously obtained value of power level is being supplied to the heater element 3, the power generated in that interval is integrated (step S15'), and a value of overall amount of energy is finally obtained in step S41 at the end of the pre-boiling interval, and is temporarily stored. As shown in FIG. 67B, each time that the sequence of steps S2611 to S30 is executed, to obtain a consequent part result for one of the fourth set of rules, the previously obtained value of pre-boiling overall energy amount is read out (step S42) and a corresponding grade is obtained, with either that grade or the "hardness" grade obtained in step S28 being selected in step S44, and used to obtain the consequent part result.

The remaining operation of this embodiment is similar to that of the eighth embodiment described above.

Figure 68:
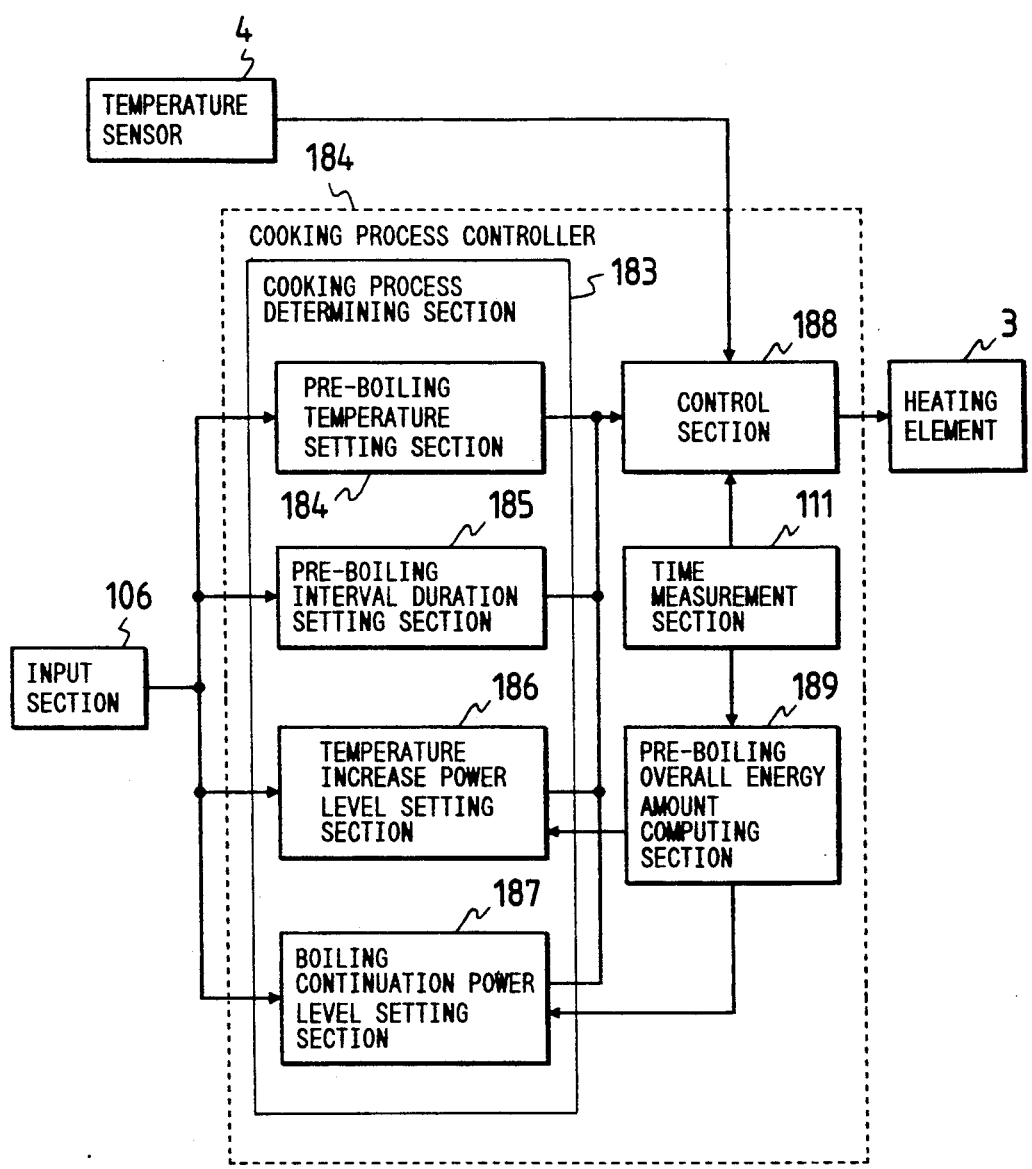
FIG. 68 is a general system block diagram of an eleventh embodiment of a rice cooking apparatus according to the present invention, which is a third modification of the eighth embodiment.

An eleventh embodiment of a rice cooking apparatus according to the present invention will be described, referring first to the control system diagram of FIG. 68. This embodiment is similar to the tenth embodiment described above, but differs in that the pre-boiling overall energy amount computing section 171 of the cooking process controller 184 supplies the obtained value of overall energy generated in the pre-boiling interval to a temperature increase power level setting section 186, as well as to a boiling continuation power level setting section 187. With the eleventh embodiment, the specified value of rice hardness supplied by the user is used in conjunction with the obtained value of overall energy generated in the pre-boiling interval, to establish the power level that will be supplied to the heater element 3 during the temperature increase interval, by fuzzy inference control. Moreover the value of power level supplied during the boiling continuation interval is determined based upon the specified degree of hardness in conjunction with the temperature gradient during the temperature increase interval and also the overall energy that was supplied in the pre-boiling interval.

Figure 69:
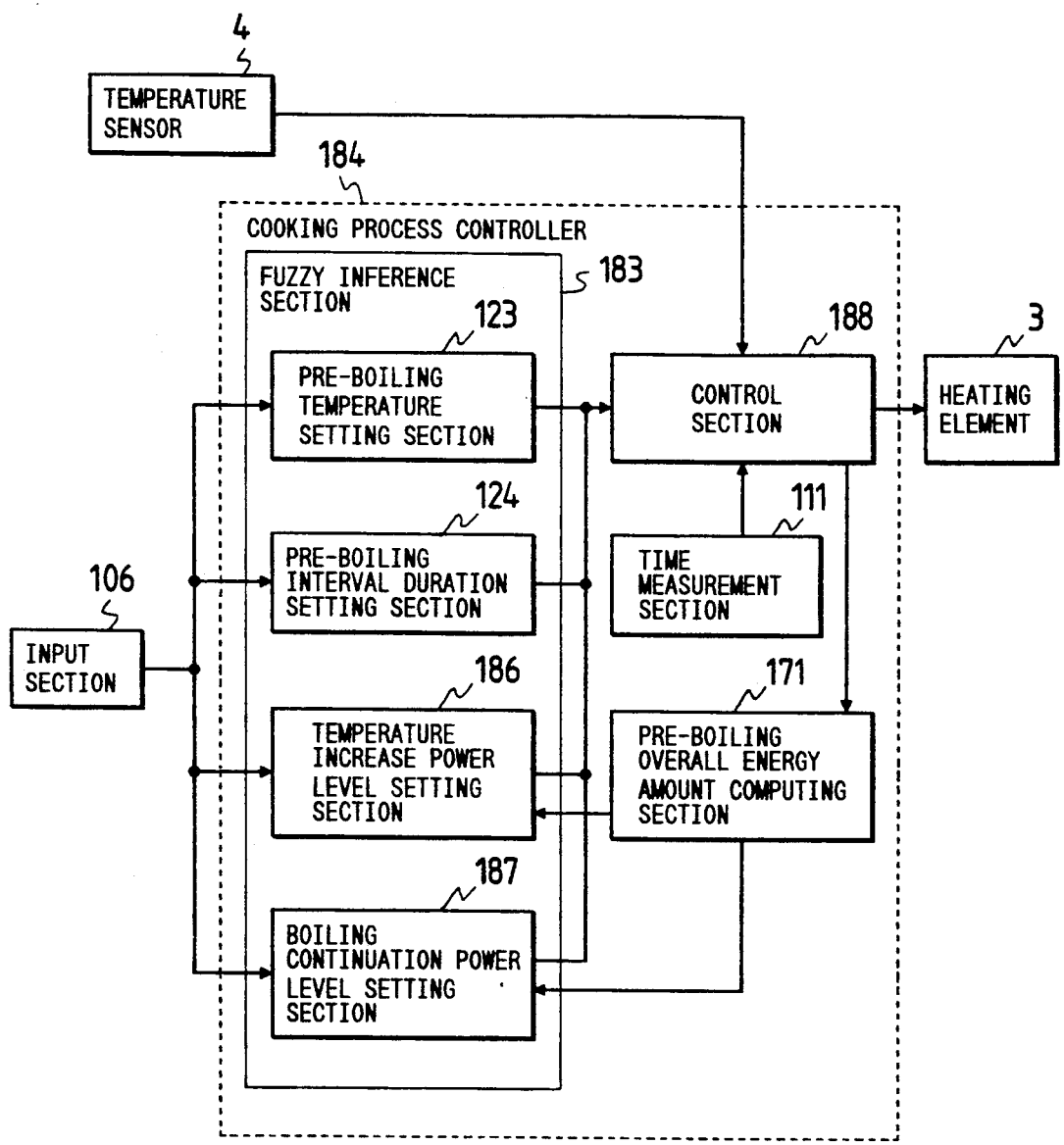
Figure 71:
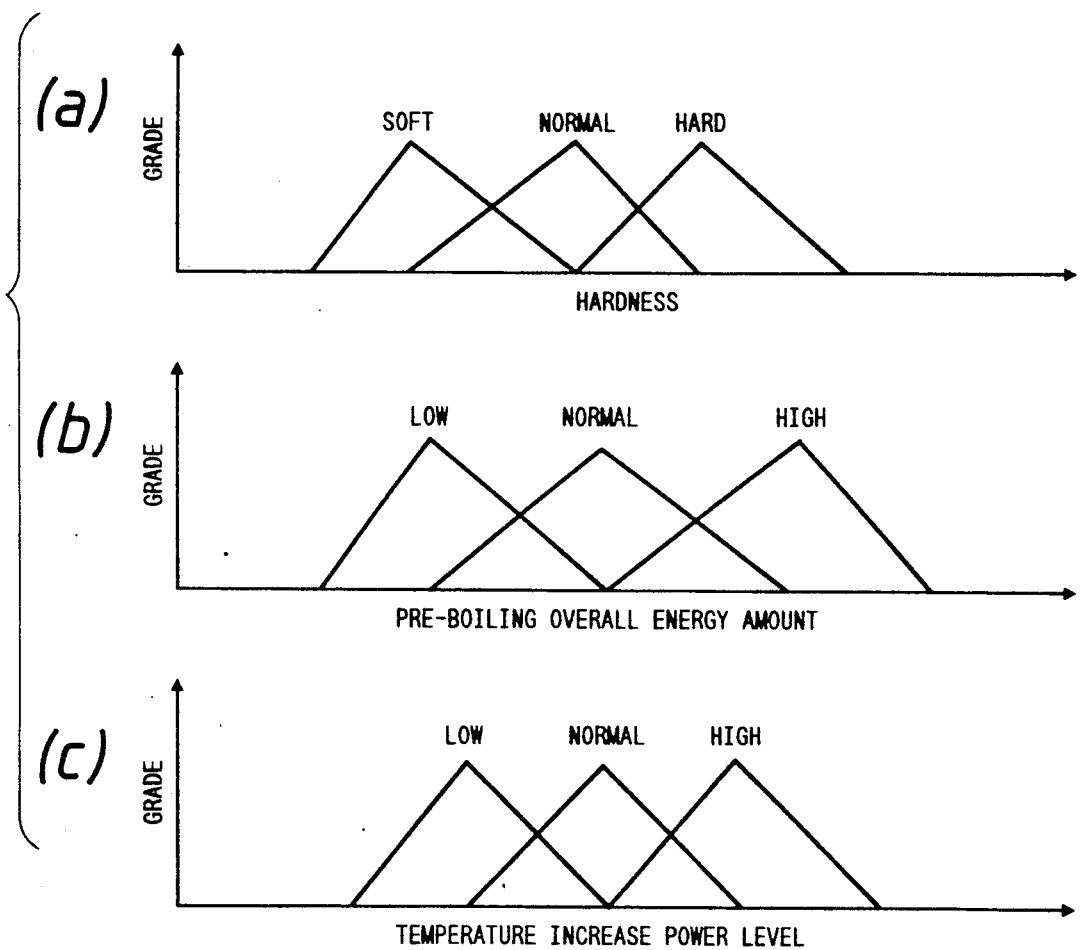
FIGS. 71 and 72 show the fuzzy set membership functions corresponding to the rules of FIGS. 69 and 70.

FIG. 69 is a table showing the third set of fuzzy inference rules in this case, used to obtain the appropriate power level for the temperature increase interval, while FIG. 69 is a set of three tables showing the fourth set of fuzzy inference rules, used to obtain the appropriate boiling continuation power level. According to these third set of rules, in FIG. 69, for example when the specified hardness is "hard" and obtained value of pre-boiling overall energy amount is "normal", then the temperature increase power level is "high". The corresponding fuzzy set membership functions are shown in FIG. 71. Similarly, according to the fourth set of rules, in the table of diagram (a) of FIG. 70, if the pre-boiling overall energy amount is "high", the rice temperature gradient is "normal" and the specified degree of rice hardness is "soft", then the boiling continuation power level will be "moderately high".

Figure 72:
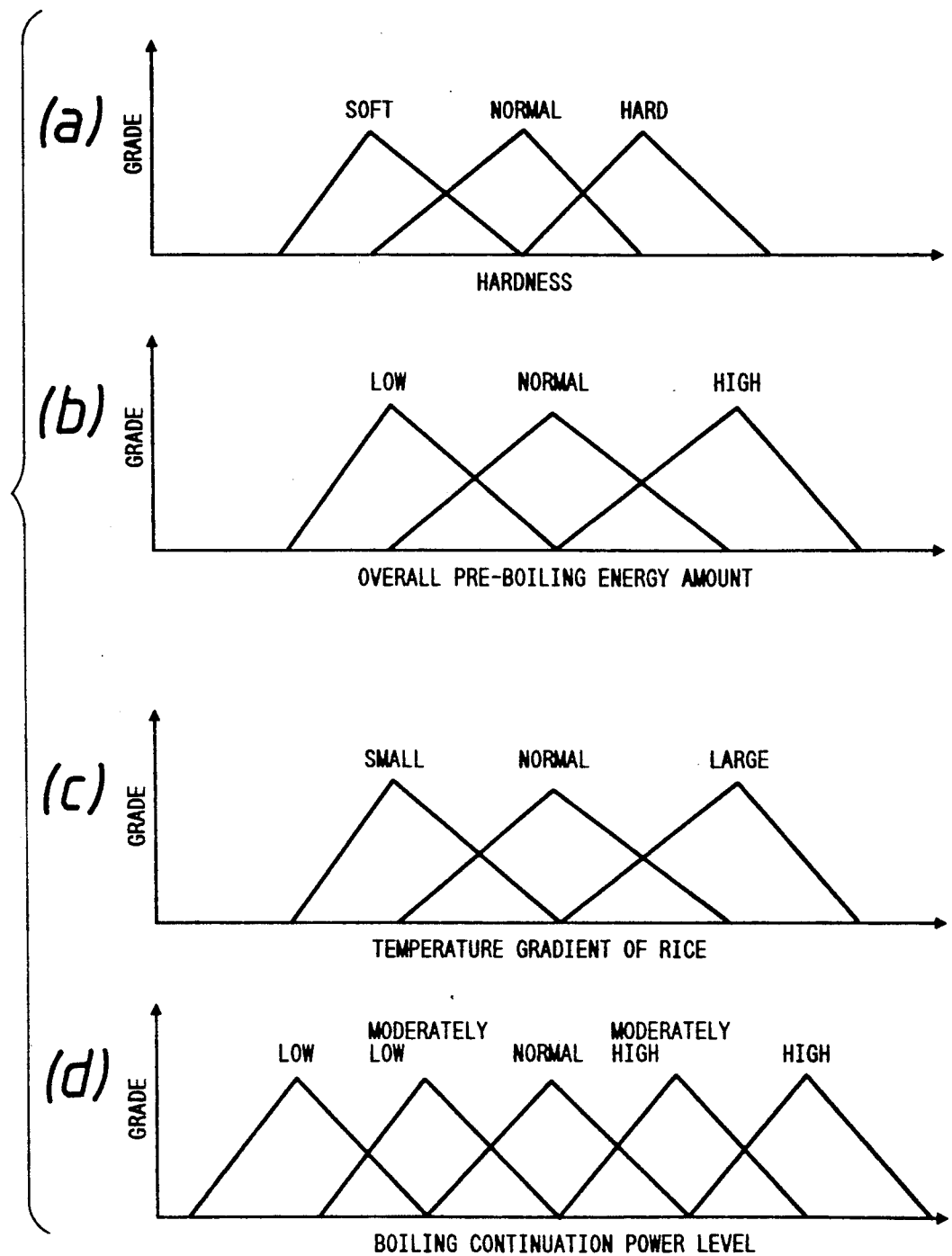

The fuzzy set membership functions corresponding to the rules of FIG. 70 are shown in FIG. 72.

Figure 73:
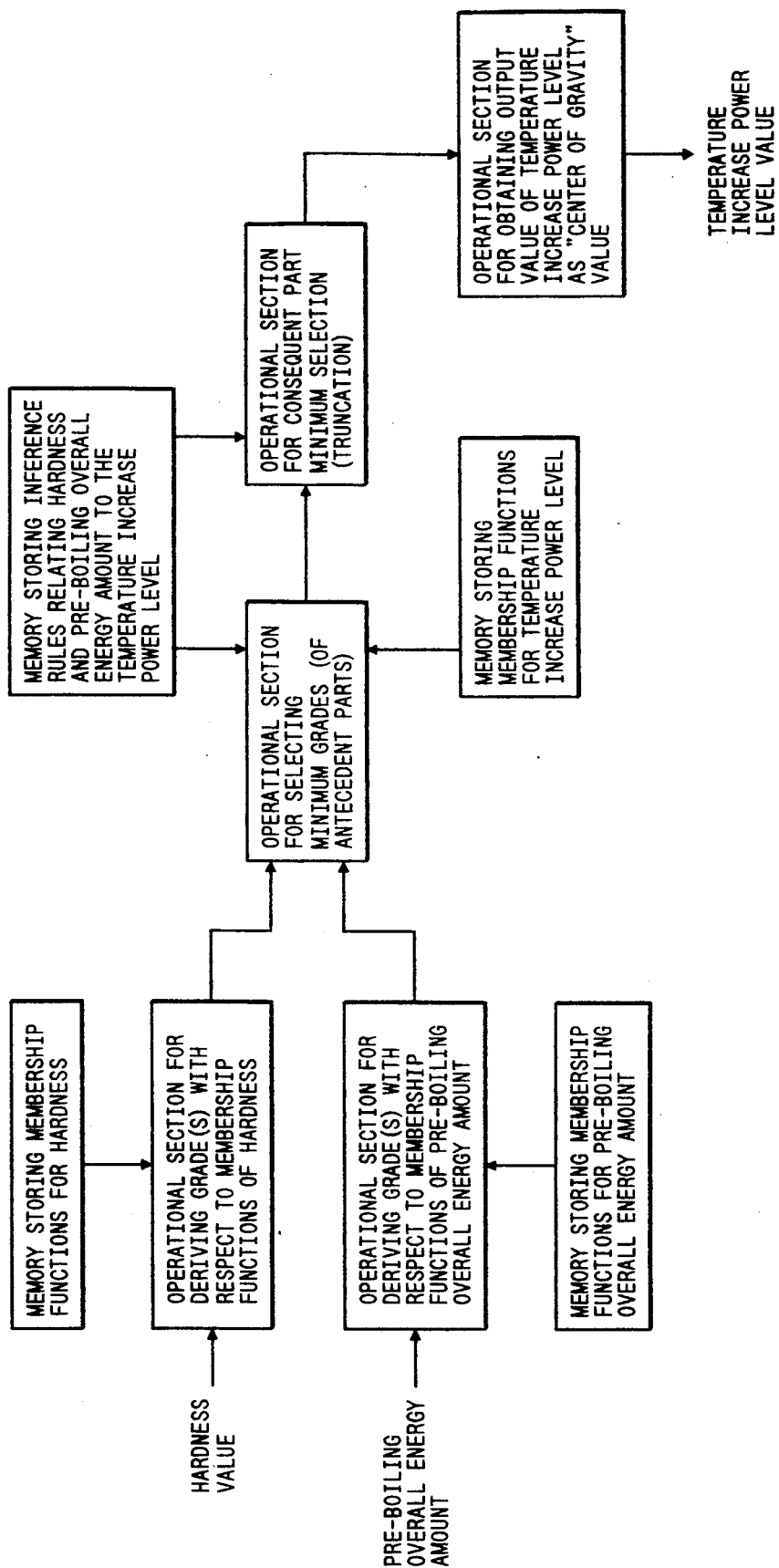
FIGS. 73 and 74 are block diagrams for assistance in describing the operation of a fuzzy inference section in the eleventh embodiment.

FIG. 73 illustrates the functions executed by the temperature increase power level setting section 186 of the fuzzy inference section 183 of this embodiment, shown as respective "operational sections". A memory 170 stores the membership functions for the specified degree of hardness of the cooked rice. An operational section 175 derives the grades of the specified hardness value with respect to these "hardness" membership functions. A memory 174 stores the membership functions for the overall amount of energy generated in the pre-boiling interval, and an operational section 173 derives the grades of the obtained overall amount of energy in the pre-boiling interval, with respect to these membership functions. An operational section 178 selects, for each of the rules, the smaller of the grades obtained by the section 173 and 175. A memory 197 stores the membership functions for the temperature increase power level, and a memory 191 stores the third set of fuzzy inference rules, shown in FIG. 69. An operational section 196 executes truncation (MIN) operations on the membership functions stored in the memory 197, using the grade values produced from the operational section 178, in accordance with these rules. A corresponding "center of gravity" output value for the power level in the temperature increase interval is thereby obtained by the operational section 198, i.e. after executing a MAX operation as described hereinabove.

Figure 74:
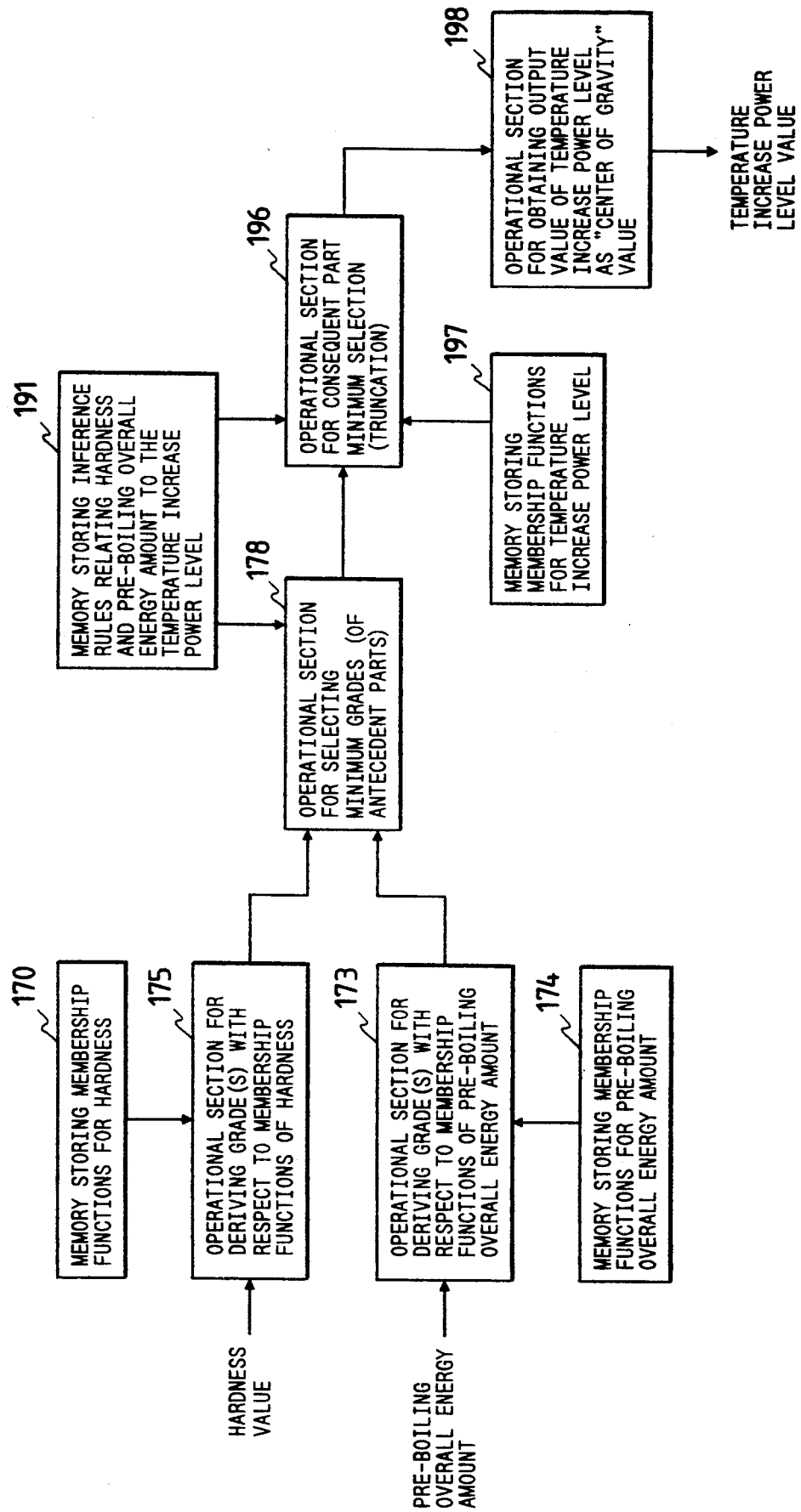

FIG. 74 illustrates the functions executed by the boiling continuation power level setting section 187 of the fuzzy inference section 183 of this embodiment, shown as respective "operational sections". A memory 205 stores the membership functions for the specified degree of hardness of the cooked rice. An operational section 204 derives the grades of the specified hardness value with respect to these "hardness" membership functions. A memory 203 stores the membership functions for the overall amount of energy that was supplied in the pre-boiling interval, and an operational section 202 derives the grades of the obtained overall energy amount with respect to the membership functions. A memory 201 stores the membership functions for the rice temperature gradient, and an operational section 199 derives the grades of the obtained rice temperature gradient with respect to these membership functions. An operational section 206 selects, for each of the rules, the smallest one of the grades obtained by the sections 199, 202 and 204 respectively. A memory 208 stores the membership functions for the boiling continuation power level, and a memory 200 stores the fourth set of fuzzy inference rules, shown in FIG. 70. An operational section 207 executes truncation (MIN) operations on the membership functions stored in the memory 208, using the grade values produced from the operational section 206, in accordance with these rules. A corresponding "center of gravity" output value for the power level in the boiling continuation interval is thereby obtained by the operational section 209.

Figure 75A:
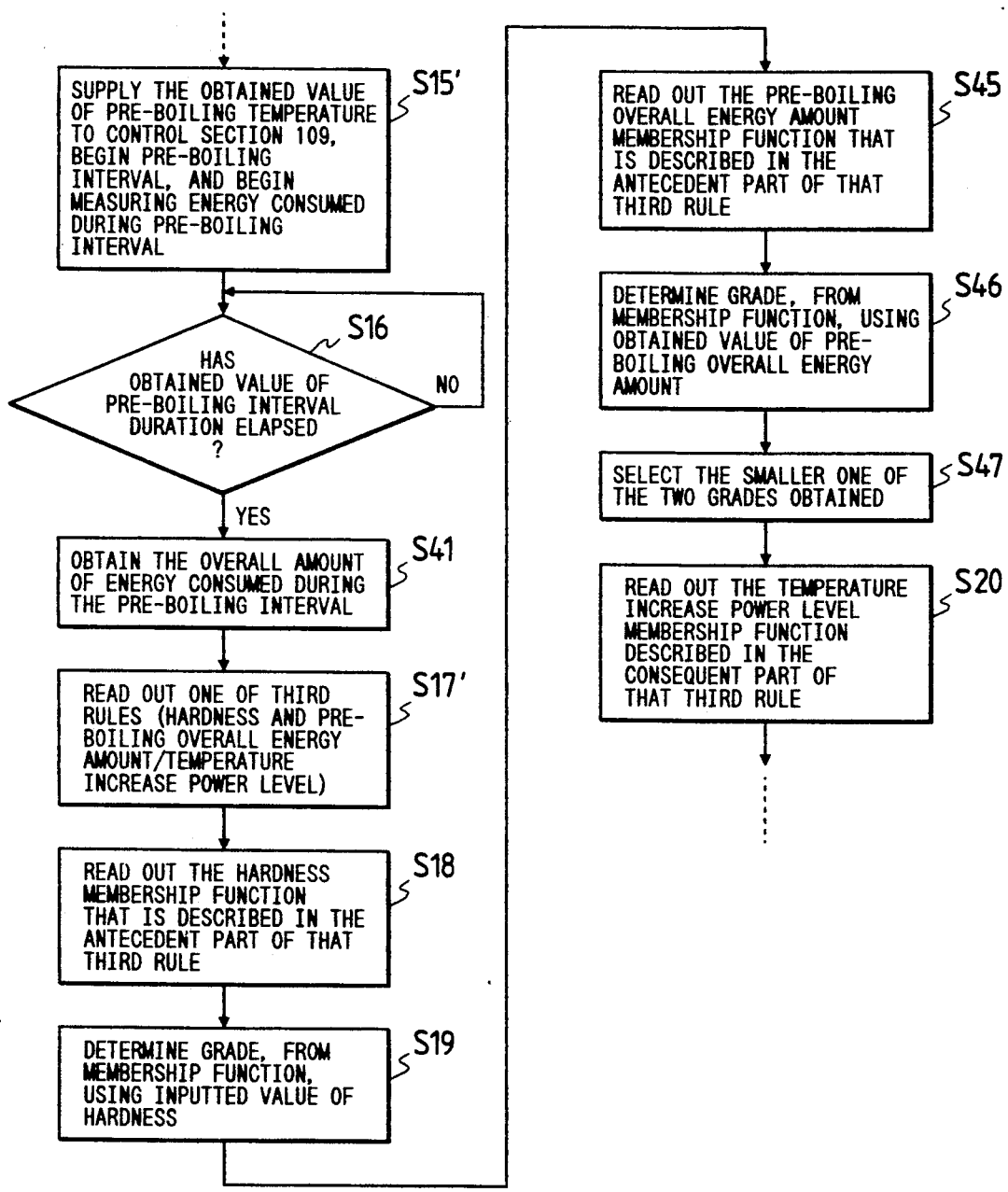
FIGS. 75A, 75b are partial flow diagrams, for assistance in describing how the eleventh embodiment differs from the eighth embodiment.
Figure 75B:
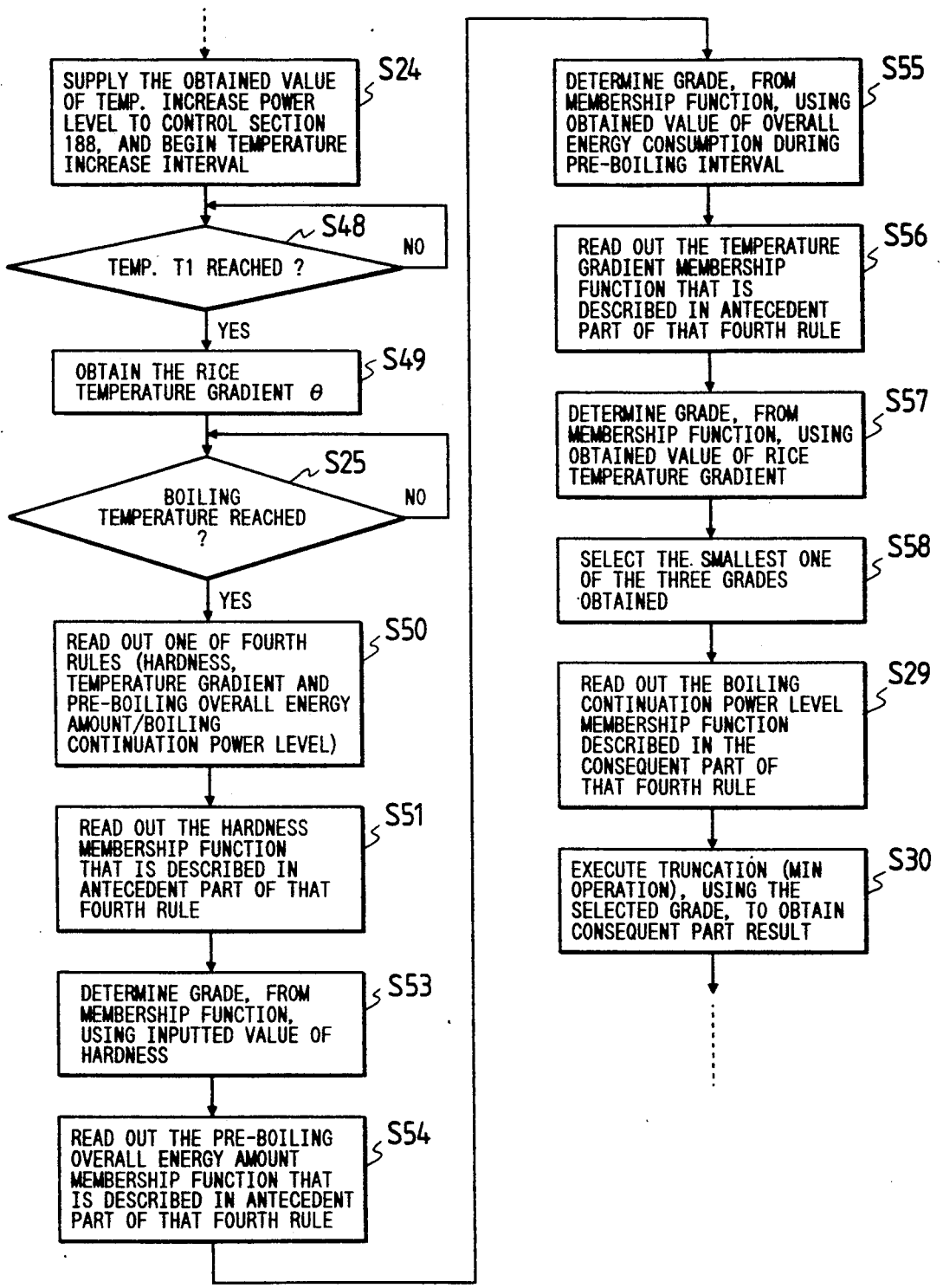

The operating flow diagram for this embodiment differs from that of the eighth embodiment only with regard to the sequence of steps from S15 to S20 and the sequence from step S24 to S29, and so only these different portions will be described. These are shown in FIGS. 75A and 75B respectively. As shown in FIG. 75A, during the pre-boiling interval, while the previously obtained value of power level is being supplied to the heater element 3, the power generated in that interval is integrated (step S15'), and a value of overall amount of energy is finally obtained in step S41 at the end of the pre-boiling interval, and is temporarily stored. Subsequently, each time that the set of steps S17' to S20 is executed to obtain a consequent part result for use in deriving the value of power level for the temperature increase interval (as described hereinabove referring to FIG. 56A), the previously obtained value of pre-boiling overall energy amount is read out (step S45) and a corresponding grade is obtained, with either that grade or the "hardness" grade obtained in step S19 being selected in step S47, and used to obtain the consequent part result.

As shown in FIG. 75B, the rice temperature gradient during the temperature increase interval is obtained in steps S48, S49. When the boiling continuation interval begins, then each time processing is executed in accordance with one of the fourth set of rules, steps S50 to S53 are executed to obtain a "hardness" grade, then steps S54, S55 are executed to obtain a "overall energy amount in pre-boiling interval" grade, followed by steps S56, S57 to obtain a "rice temperature gradient" grade. The smallest of these three grades is then selected, in step S58, to be used in obtaining a consequent part result in step S30. A value of power level to be supplied in the boiling continuation interval can thereby be obtained, by repeating the above series of steps for each of the fourth set of rules and then executing a MAX combining operation on the consequent part results obtained, then deriving an output "center of gravity" value as described hereinabove.

In the description of the above embodiments, it has been assumed that each fuzzy set membership function is of triangular shape. However it would be equally possible to use various other shapes of membership function, such as a trapezoid. Furthermore, to simplify the system configuration, it may be preferable to use a single value (i.e. each having the maximum grade of 1) in place of each consequent part membership function, as described hereinabove referring to FIG. 1C. As described, it is also possible to vary each of these single values (e.g. the values z1, z2 in FIG. 1C) in accordance with the magnitude of the input variable or variables used in the consequent part of a fuzzy inference rule, e.g. with that variation being in accord with a predetermined linear equation, and with it being possible to use respectively different linear equations for each of these single values.

If such a method of using single values is utilized, then the process of obtaining each output value as a "center of gravity" value is simplified, since it is no longer necessary to execute the MAX operation shown in FIG. 1B prior to obtaining the output value derived from a fuzzy inference operation, and the output value can be derived directly as illustrated in FIG. 1C.

It will be further apparent that various modifications or combinations of the described embodiments would be possible. For example in each of the ninth through eleventh embodiments, it would be possible to use a common set of "rice hardness" fuzzy set membership functions, with each of the first through fourth sets of rules, rather than respectively different sets of membership functions.

It should also be noted although each of the embodiments described above utilizes fuzzy inference operation to obtain suitable values for control parameters of the cooking process, it would also be possible to use a neural network to obtain similar results. In particular, a neural network could be used having an "automatic tuning" capability, whereby the "learning" operations necessary for establishing suitable values for the coefficients in the neural network can be executed automatically.

It would also be possible to obtain values for all or some of the cooking control parameters by using suitable equations. For example in the case of a rice cooking apparatus in which the hardness of the finally cooked rice is to be specified by the user, the power level to be supplied during the temperature increase interval and the duration of the pre-boiling interval could be respectively obtained as follows, designating that power level and interval duration as Pt and T respectively:

$$P_t = a \times k^2 + b \times k + c \quad (1)$$

$$T = d \times k + e \quad (2)$$

Where a, b, c and d are constants that have been determined on the basis of experiments, and k is the specified degree of hardness for the finally cooked rice.

Figure 76:
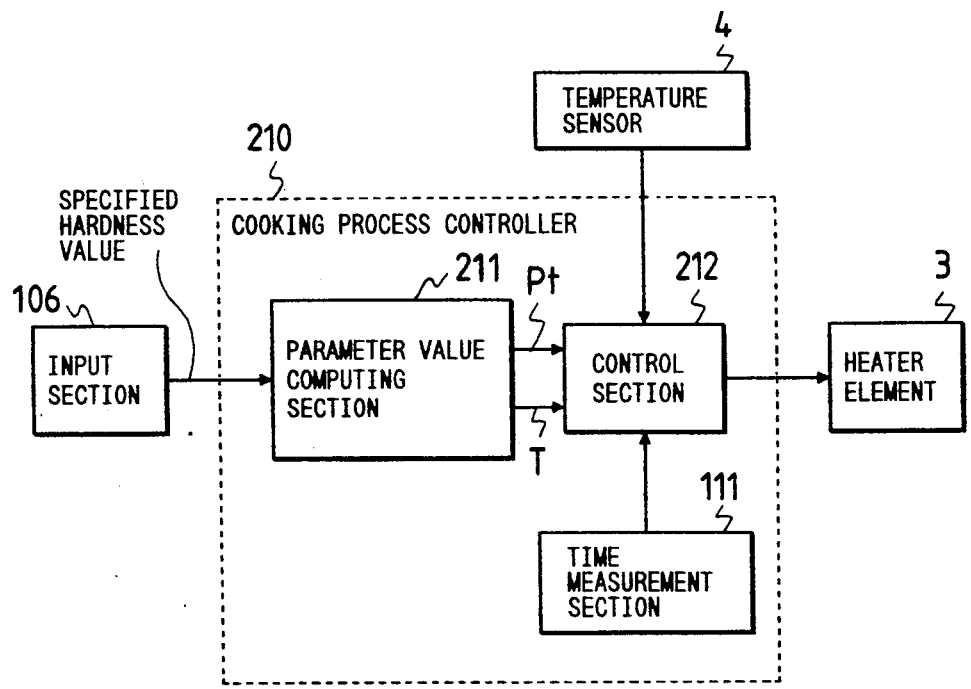
FIG. 76 is a system block diagram of a twelfth embodiment of a rice cooking apparatus according to the present invention, in which cooking control parameter values are computed based on a specified value of rice hardness, using mathematical equations.

FIG. 76 is a system block diagram of a twelfth embodiment of a rice cooking apparatus according to the present invention, in which the above method is used. The appropriate values of duration T for the pre-boiling interval and the power level Pt for the temperature increase interval are computed, based in a specified hardness value k that is inputted by the user through an input section 106, by a parameter computing section 211. These parameter values T and Pt are then supplied to a control section 212, which controls the level of power generated by the heater element 3, as for the preceding embodiments. As in the first embodiment, the control section 212 maintains the temperature of the rice at a predetermined value during the pre-boiling interval, using temperature values produced from the rice temperature sensor 4, with the pre-boiling interval continuing for the computed duration T as measured by the time measurement section ill. The power supplied to the heater element 3 is then held at the value Pt during the temperature increase interval which follows the pre-boiling interval.

It would also be possible to combine the method of operation described for the twelfth embodiment with fuzzy inference control for determining values for one or more other cooking control parameters.

As stated hereinabove, the present invention is not limited in application to a rice cooking apparatus, but could be also applied to various other types of cooking apparatus, for example for cooking stewed meat, etc.

What is claimed is:

1. A cooking apparatus for executing cooking processing of a quantity of a food material, comprising:
   means for applying power for heating Bald food material;
   control means for controlling a level of said heating power;
   quantity indication means for producing a value indicative of said quantity of the food material;
   fuzzy inference means for deriving a requisite level of said heating power, based upon said quantity indicating value, and for producing an output value indicative of said requisite level and supplying said output value to said control means for thereby determining a subsequent level of said heating power.

2. A cooking apparatus according to claim 1, wherein said cooking apparatus includes means for applying heating power to maintain said food material at a predetermined temperature during an interval of predetermined duration in an initial part of said cooking process, and wherein said quantity indication means comprises means for obtaining an average level of heating power applied to said food material during said interval, with said average level of heating power providing said quantity indication value.

3. A cooking apparatus according to claim 1, wherein said cooking apparatus includes a lid for covering said food material, and wherein said quantity indication means comprises means for obtaining a value of temperature gradient of said lid during an initial part of said cooking process wherein said food material is rapidly increased in temperature, and wherein said temperature gradient of the lid provides said quantity indication value.

4. A cooking apparatus according to claim 1, wherein said cooking apparatus includes means for applying heating power to maintain said food material at a predetermined temperature during an interval of predetermined duration in an initial part of said cooking process, and wherein said quantity indication means comprises means for obtaining an average level of heating power applied to said food material during said interval, and means for obtaining a value of temperature gradient of said food material during an initial part of said cooking process wherein said food material is rapidly increased in temperature, and wherein said average level of heating power and said temperature gradient in combination are indicative of said quantity and are supplied to said fuzzy inference means.

5. A cooking apparatus according to claim 1, wherein said cooking apparatus includes a lid for covering said food material, and wherein said quantity indication means comprises means for obtaining a value of temperature gradient of said food material and a value of temperature gradient of said lid during an initial part of said cooking process wherein said food material is rapidly increased in temperature, and wherein said temperature gradient of the food material and temperature gradient of the lid in combination are indicative of said quantity and are supplied to said fuzzy inference means.

6. A cooking apparatus according to claim 1, wherein. said cooking apparatus includes a lid for covering said food material, and includes means for supplying heating power to maintain said food material at a predetermined temperature during an interval of predetermined duration in an initial part of said cooking process, and wherein said quantity indication means comprises means for obtaining an average level of heating power applied to said food material during said interval, and means for obtaining a value of temperature gradient of said food material and a value of temperature gradient of said lid during a subsequent part of said cooking process in which said food material is rapidly increased in temperature, and wherein said average level of heating power, said lid temperature gradient and said food material temperature gradient, in combination are indicative of said quantity and are supplied to said fuzzy inference means.

7. A cooking apparatus for cooking a food material, comprising:
   heater means for heating said food material;
   heating power control means for controlling a level of heating power generated by said heater means;
   temperature sensor means for detecting a level of temperature of said food material;
   temperature adjustment means responsive to detection values produced from said temperature sensor means for producing heating power control values suitable for maintaining said food material at a predetermined temperature, and for supplying said heating power control values to said heating power control means during an initial cooking interval of fixed duration;
   computing means for computing a value representing an average value of heating power supplied to said heater means during said initial interval; and
   fuzzy inference means responsive to said average heating power value for deriving a value representing a suitable level of heating power for a cooking interval subsequent to said initial interval, and for supplying said level-representing value to said heating power control means.

8. A cooking apparatus for cooking a food material, comprising:
   a lid for covering said food material;
   heater means for heating said food material;
   heating power control means for controlling a level of heating power generated by said heater means;
   temperature sensor means for detecting a level of temperature of said lid;
   temperature gradient computing means responsive to temperature detection values produced from said temperature sensor means during a temperature increase cooking interval wherein a fixed level heating power is applied to rapidly heat said food material, for obtaining a value of temperature gradient of said lid; and
   fuzzy inference means responsive to said temperature gradient value for deriving a value representing a suitable level of heating power for a cooking interval subsequent to said temperature increase interval, and for supplying said level-representing value to said heating power control means.

9. A cooking apparatus for cooking a food material, comprising:
   heater means for heating said food material;
   heating power control means for controlling a level of heating power generated by said heater means;

temperature sensor means for detecting a level of temperature of said food material;

temperature adjustment means responsive to detection values produced from said temperature sensor means for producing heating power control values suitable for maintaining said food material at a predetermined temperature, and for supplying said heating power control values to said heating power control means during an initial cooking interval of fixed duration, and for supplying a predetermined fixed value to said heating power control means during a temperature increase interval immediately subsequent to said initial interval;

computing means for computing a value representing an average level of heating power supplied to said heater means during said initial interval;

temperature gradient computing means responsive to detection values produced from said temperature sensor means during said temperature increase interval for obtaining a value of temperature gradient of said food material during said temperature increase interval;

fuzzy inference means responsive to said average heating power value and temperature gradient value in combination, for deriving a value representing a suitable level of heating power for a cooking interval subsequent to said temperature increase interval, and for supplying said level-representing value to said heating power control means.

10. A cooking apparatus for cooking a food material, comprising:

a lid for covering said food material;

heater means for heating said food material;

heating power control means for controlling a level of heating power generated by said heater means;

food material temperature sensor means for detecting a level of temperature of said food material;

temperature adjustment means responsive to detection values produced from said food material temperature sensor means for producing heating power control values suitable for maintaining said food material at a predetermined temperature, and for supplying said heating power control values to said heating power control means during an initial cooking interval of fixed duration, and for supplying a predetermined fixed value to said heating power control means during a temperature increase interval immediately subsequent to said initial interval;

computing means for computing a value representing an average value of heating power supplied to said heating means during said initial interval;

lid temperature sensor means for detecting a level of temperature of said lid;

lid temperature gradient computing means responsive to detection values produced from said lid temperature sensor means during said temperature increase interval for obtaining a value of temperature gradient of said lid during said temperature increase interval;

fuzzy inference means responsive to said average heating power value and lid temperature gradient value in combination, for deriving a value representing a suitable level of heating power for a cooking interval subsequent to said temperature increase interval, and for supplying said level-representing value to said heating power control means.

11. A cooking apparatus for cooking a food material, comprising:

a lid for covering said food material;

heater means for heating said food material;

heating power control means for controlling a level of heating power generated by said heater means;

food material temperature sensor means for detecting a level of temperature of said food materials;

food material temperature gradient computing means responsive to detection values produced from said food material temperature sensor means during a temperature increase cooking interval wherein a fixed level heating power is applied to rapidly heat said food material, for obtaining a value of temperature gradient of said food material in said temperature increase interval;

lid temperature sensor means for detecting a level of temperature of said lid;

lid temperature gradient computing means responsive to detection values produced from said lid temperature sensor means during said temperature increase interval for obtaining a value of temperature gradient of said lid during said temperature increase interval;

fuzzy inference means responsive to said food material temperature gradient and lid temperature gradient value in combination, for deriving a value representing a suitable level of heating power for a cooking interval subsequent to said temperature increase interval, and for supplying said level-representing value to said heating power control means.

12. A cooking apparatus for cooking a food material, comprising:

a lid for covering said food material;

heater means for heating said food material;

heating power control means for controlling a level of heating power generated by said heater means;

food material temperature sensor means for detecting a level of temperature of said food material;

temperature adjustment means responsive to detection values produced from said temperature sensor means for producing heating power control values suitable for maintaining said food material at a predetermined temperature, and for supplying said heating power control values to said heating power control means during an initial cooking interval of fixed duration;

computing means for computing a value representing an average value of heating power supplied to said heater means during said initial interval; and food material temperature gradient computing means responsive to detection values produced from said food material temperature sensor means during said temperature increase interval, for obtaining a value of temperature gradient of said food material in said temperature increase interval;

lid temperature sensor means for detecting a level of temperature of said lid;

lid temperature gradient computing means responsive to detection values produced from said lid temperature sensor means for obtaining a value of temperature gradient of said lid during said temperature increase interval;

fuzzy inference means responsive to said average power value, food material temperature gradient value and lid temperature gradient value in combination, for deriving a value representing a suitable level of heating power for a cooking interval subsequent to said temperature increase interval, for supplying said level-representing value to said heating power control means.

13. A cooking apparatus for cooking a food material, comprising:
   heater means for heating said food material;
   control means for controlling said heater means in accordance with a plurality of cooking control parameters, during a cooking process executed by said apparatus;
   temperature sensor means for detecting a level of temperature of said food material;
   input means operable for inputting a hardness specifying value, specifying a desired degree of hardness of said food material resulting from said cooking process;
   fuzzy inference means responsive to said hardness specifying value for deriving respective values for determining said control parameters, and for supplying said values to said control means.

14. A cooking apparatus according to claim 13, wherein said control means functions to maintain said food material at a specific pre-boiling temperature which is lower than a boiling temperature, during a pre-boiling interval of specific duration, and wherein said control parameters include said pre-boiling temperature and said pre-boiling interval duration.

15. A cooking apparatus according to claim 13, wherein said control means further functions to produce rapid heating of said food material to a boiling temperature, during a temperature increase interval which immediately follows said pre-boiling interval, and wherein said control parameters further include a level of power that is supplied to said heater means during said temperature increase interval.

16. A cooking apparatus according to claim 13, wherein said control means further functions to maintain said food material in a boiling condition, during a boiling continuation interval which immediately follows said temperature increase interval, and wherein said control parameters further include a level of power that is supplied to said heater means during said boiling continuation interval.

17. A cooking apparatus according to claim 13, wherein said fuzzy inference means operates based upon respective predetermined sets of fuzzy set membership functions for said control parameters and a single set of predetermined fuzzy set membership functions for said hardness specifying value, which are applied in common to all of said control parameters.

18. A cooking apparatus according to claim 13, wherein said fuzzy inference means operates based upon respective predetermined sets of fuzzy set membership functions for said control parameters and a plurality of sets of fuzzy set membership functions for said hardness specifying value, which are separately applied to respective ones of said control parameters.

19. A cooking apparatus according to claim 16, wherein said control means functions to derive a value of temperature gradient of said food material during said temperature increase interval, based upon detected temperature values obtained by said temperature sensor means, and wherein said fuzzy inference means derives a value for determining said boiling continuation power level parameter based upon a combination of said hardness specifying value and said temperature gradient value.

20. A cooking apparatus according to claim 16, wherein said control means functions to derive a value of temperature gradient of said food material during said temperature increase interval, based upon detected temperature values obtained by said temperature sensor means, and wherein said fuzzy inference means derives a value for determining said temperature increase interval power level parameter based upon a combination of said hardness specifying value and said temperature gradient value.

21. A cooking apparatus according to claim 16, wherein said control means functions to derive a value overall amount of energy supplied to said heater means during said pre-boiling interval, and to derive a value of temperature gradient of said food material during said temperature increase interval, based upon detected temperature values obtained by said temperature sensor means, and wherein said fuzzy inference means derives a value for determining said boiling continuation power level parameter based upon a combination of said hardness specifying value, said energy amount value, and said temperature gradient value.

22. A cooking apparatus according to claim 16, wherein said control means functions to derive a value of overall amount of energy supplied to said heater means during said pre-boiling interval, and wherein said fuzzy inference means derives a value for determining said boiling continuation power level parameter based upon a combination of said hardness specifying value and said energy amount value.

23. A cooking apparatus for executing cooking processing of a quantity of a food material, comprising:
   heating means for applying power for heating said food material;
   input means operable for inputting a hardness specifying value, specifying a desired degree of hardness of said food material resulting from said cooking process;
   control means for controlling a level of said heating power generated by said heating means, and for setting a duration of an initial pre-boiling period of said cooking process wherein said food material is maintained at a temperature below boiling temperature, to a value expressed as:

$$T = d \times k + e$$

where T denotes said duration, k denotes said specified degree of hardness, and d and e are predetermined constants, and wherein said control means further sets a level of heating power supplied to said heating means during a temperature increase interval that is immediately subsequent to said pre-boiling interval in said cooking process, to a value expressed as:

$$Pt = a \times k^2 + b \times k + c$$

where Pt denotes said level of heating power, and a, b and c are predetermined constants.

* * * * *